(12) United States Patent
Chirehdast

(10) Patent No.: US 8,504,470 B1
(45) Date of Patent: Aug. 6, 2013

(54) METHODS AND SYSTEMS FOR FINANCIAL TRANSACTIONS

(75) Inventor: Mehran Chirehdast, San Antonio, TX (US)

(73) Assignee: BT Patent LLC, Potomac, MD (US)

( * ) Notice: Subject to any disclaimer, the term of this patent is extended or adjusted under 35 U.S.C. 154(b) by 48 days.

(21) Appl. No.: 13/222,123

(22) Filed: Aug. 31, 2011

(51) Int. Cl.
*G06Q 40/00* (2012.01)

(52) U.S. Cl.
CPC ................................. *G06Q 40/00* (2013.01)
USPC ............................................................. 705/38

(58) Field of Classification Search
None
See application file for complete search history.

(56) References Cited

U.S. PATENT DOCUMENTS

| | | | |
|---|---|---|---|
| 6,938,008 B1 | 8/2005 | Stokes | |
| 7,392,216 B1 | 6/2008 | Palmgren | |
| 7,870,048 B2 | 1/2011 | Bhagwat | |
| 7,899,853 B1 | 3/2011 | Fakharzadeh | |
| 7,949,176 B2 | 5/2011 | Nepomniachtchi | |
| 7,953,268 B2 | 5/2011 | Nepomniachtchi | |
| 2006/0195391 A1 * | 8/2006 | Stanelle | 705/38 |
| 2008/0015954 A1 * | 1/2008 | Huber et al. | 705/28 |
| 2008/0154791 A1 * | 6/2008 | Bannister et al. | 705/36 R |
| 2009/0299896 A1 * | 12/2009 | Zhang et al. | 705/38 |
| 2009/0299911 A1 * | 12/2009 | Abrahams et al. | 705/36 R |

* cited by examiner

*Primary Examiner* — Bruce I Ebersman
(74) *Attorney, Agent, or Firm* — Bijan Tadayon; Saied Tadayon

(57) ABSTRACT

Relationship banking and mobile banking are discussed and presented here. In Section 1, we present Pre-approval, Fulfillment, and Application Process. In Section 2, we present Financial Products for Protection of Consumers. In Section 3, we present Relationship-Based Score. In Section 4, we present Application of Credit Report for a "Binding" Pre-Approval for Lending Products. In Section 5, we present Deposit Slip Purchase. In Section 6, we present Reducing Frauds on Credit Cards. We also discuss the system and components, with different variations on system and method, or their designs.

13 Claims, 33 Drawing Sheets

| Variable | Auto | Motor Cycle | RV / Marine | Unsecured Installment | Credit Card | Mortgage | Home Equity Installment | Home Equity LOC |
|---|---|---|---|---|---|---|---|---|
| Income | x | x | x | x | x | x | x | x |
| Own or Rent (housing expenditure) | x | x | x | x | x | x | x | x |
| Collateral Type | x | x | x | | | x | x | x |
| Collateral Value | x | x | x | | | x | x | x |
| Requested Amount | x | x | x | x | | x | x | |
| Down Payment | x | x | x | | | x | x | x |
| Estimated Closing Cost | | | | | | x | x | x |
| Contact Info (e.g., e-mail, mobile device No.) | x | x | x | x | x | x | x | x |
| Identification, e.g., Name, Soc. Sec. No., Address | x | x | x | x | x | x | x | x |

FIG 5

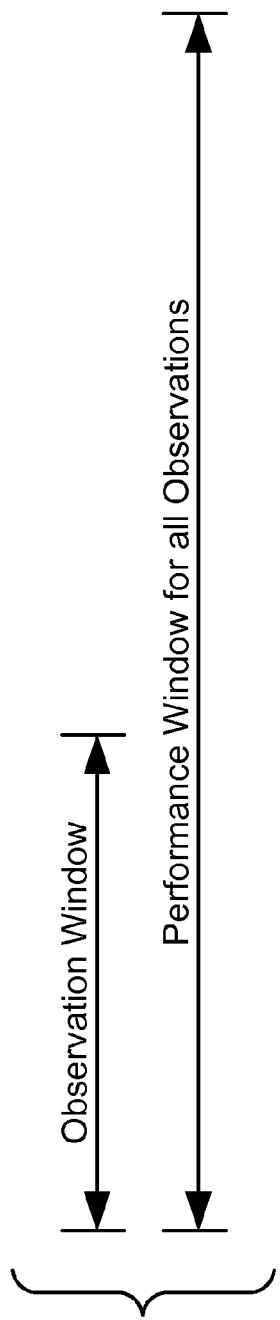
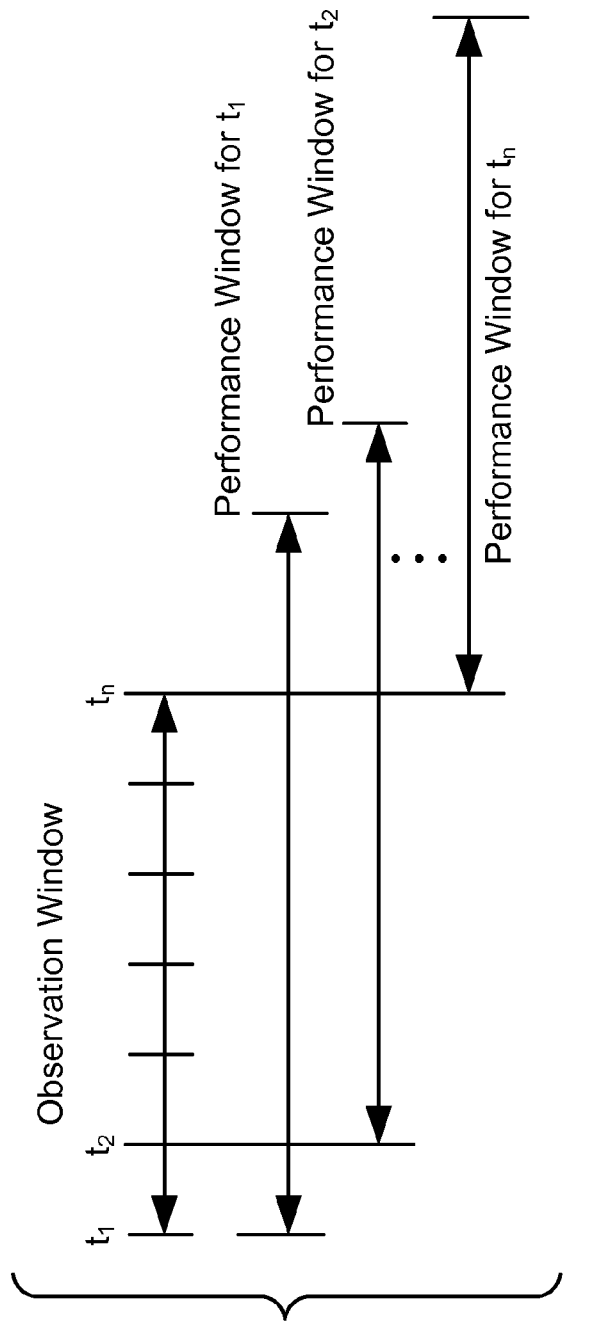
FIG 7(a)
FIG 7(b)

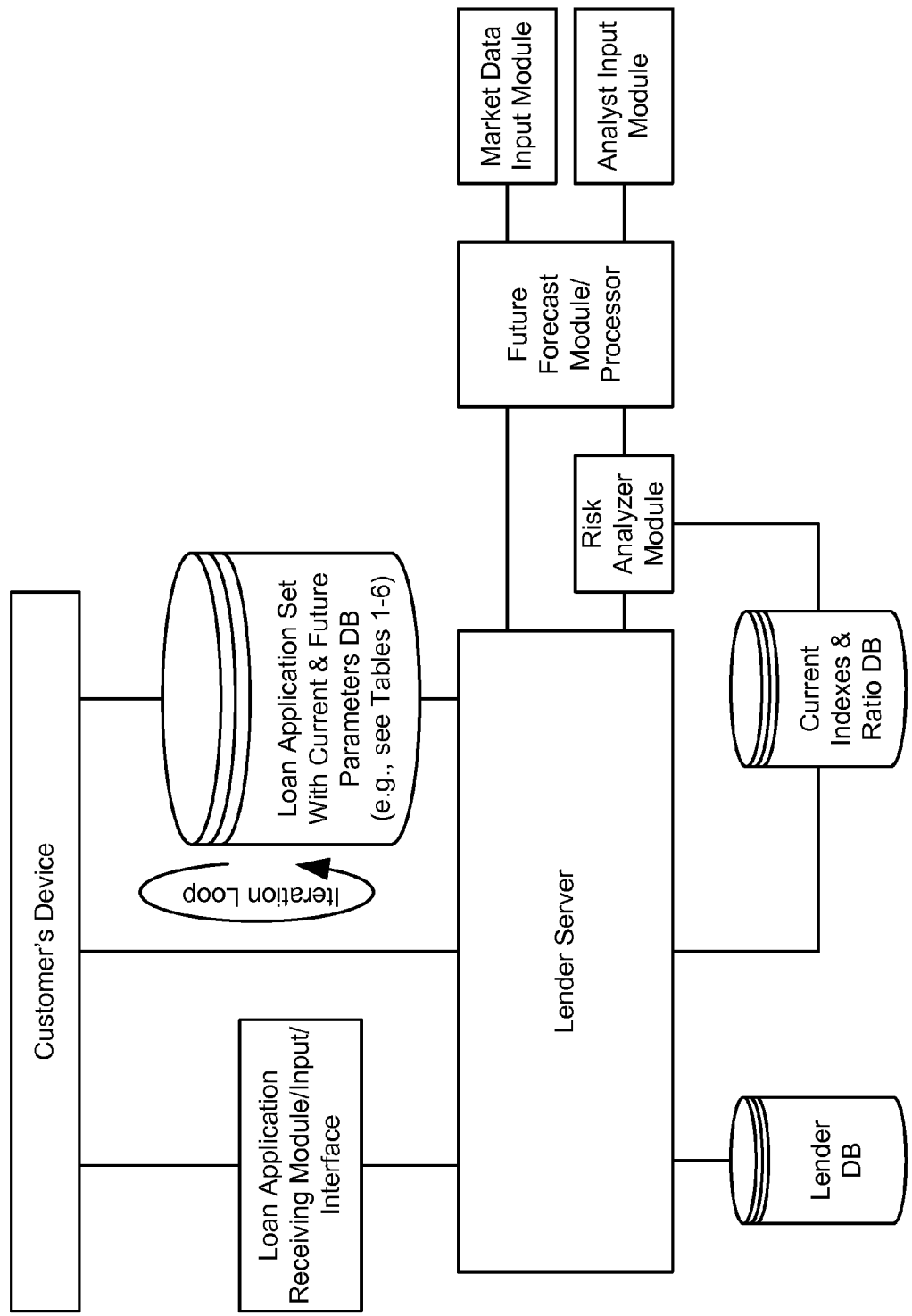

METHODS AND SYSTEMS FOR FINANCIAL TRANSACTIONS

BACKGROUND

The e-banking and e-commerce are becoming more and more integrated with our daily lives. We are introducing new concepts and teachings for relationship banking and mobile banking here, to improve on the current state of e-banking and e-commerce, with useful features for both the banks (financial institutions) and/or consumers.

Please note that U.S. Pat. Nos. 7,953,268 and 7,949,176 (assigned to Mitek Systems Inc.) teach the methods and systems for mobile image capture and processing of documents. The U.S. Pat. No. 7,899,853 teaches handheld computational device having securing elements. The U.S. Pat. No. 7,870,048 teaches method and system for flexible scheduling of repayment of a loan. The U.S. Pat. No. 7,392,216 (by Palmgren et al., from GE Capital Mortgage Corporation, filed Sep. 27, 2000, and issued Jun. 24, 2008) teaches methods and apparatus for utilizing a proportional hazards model to evaluate loan risk, with hazard rate and different variables. The U.S. Pat. No. 6,938,008 teaches loan modeler method and apparatus. However, none of the prior art teaches the features taught in this disclosure, as detailed below.

SUMMARY

Relationship banking and mobile banking are discussed and presented here. In Section 1, we present Pre-approval, Fulfillment, and Application Process. In Section 2, we present Financial Products for Protection of Consumers. In Section 3, we present Relationship-Based Score. In Section 4, we present Application of Credit Report for a "Binding" Pre-Approval for Lending Products. In Section 5, we present Deposit Slip Purchase. In Section 6, we present Reducing Frauds on Credit Cards. We also discuss the system and components, with different variations on system and method, or their designs.

The systems and methods taught here help reduce the cost of processing for financial institutions/banks, and bring more customers for the bank, as well as more convenience and more options for the customers, in addition to faster processing of applications, which generally benefit all involved, including the economy, which benefits from easier circulation of money (e.g. more loans for small businesses, for more projects and new hiring).

BRIEF DESCRIPTION OF FIGURES

Here are some examples/embodiments:

FIG. 5 is an example of a list of selected variables potentially required for specific lending products.

FIGS. 7a and 7b show observation window and performance window, for all observations and various t's, or unstaggered and staggered performance windows, respectively.

FIG. 17 shows an example of a system for Section 2.
FIG. 18b shows an example of a system for Section 3, similar to FIG. 18a.

DETAILED DESCRIPTION OF THE EMBODIMENTS

Section 1: Pre-Approval, Fulfillment, and Application Process

In this section, we are going to address the following 3 embodiments:

Mobile instantly generated credit/debit/prepaid card fulfillment and usage

Pre-approval Process on Mobile Devices for All Lending Products

Figure 1:
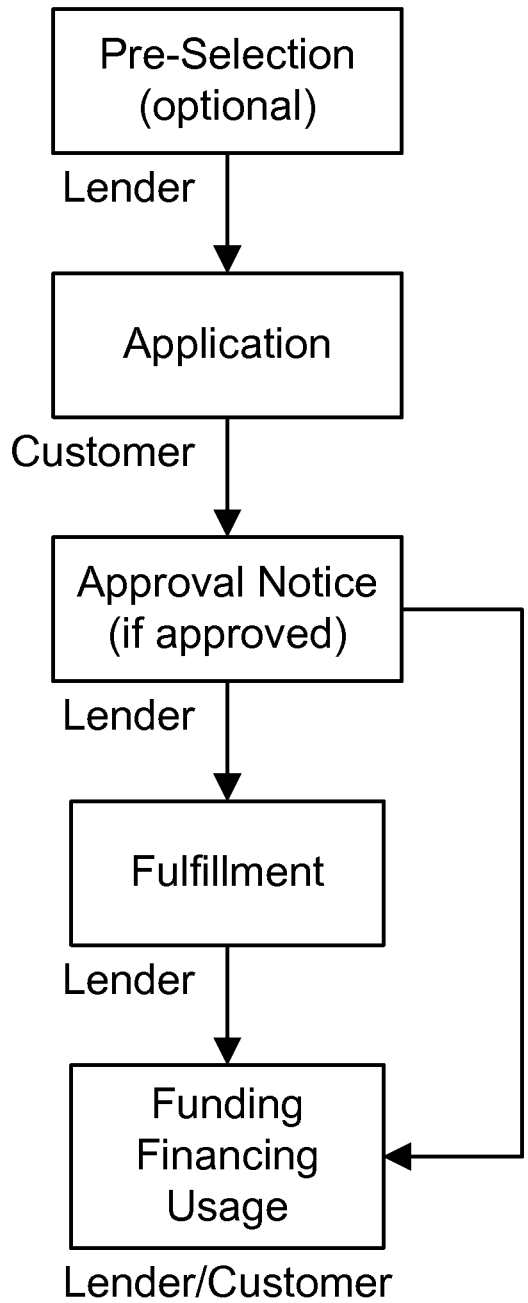
FIG. 1 shows "General Schematic for Lending in Consumer Financial Products", as an example.

Lending Product Application (LPA) Process on Mobile Devices for All Lending Products FIG. 1 shows "General Schematic for Lending in Consumer Financial Products", as an example. In general, most lenders (banks or other financial institution in the business of consumer financial services) offer a variety of consumer lending products to their customers. In all cases, as illustrated in the simplified schematic (General Schematic for Lending in Consumer Financial Products), a 3-step process of application, approval, and fulfillment, generally precedes the actual funding or issuance of the lending product, which is equivalent to the usage of the lending product by the customer.

FIG. 1 shows an optional pre-selection, followed by application, and approval notice, if approved. Then, the next stage is fulfillment and funding/financing/usage. However, it can also go to Funding stage directly from Approval Notice stage.

"Funding-Financing-Usage" can be done using a check mailed or authorization or wire transfer or email to consumer, or a check to the dealer or merchant (e.g. car dealer, selling cars, with respect to a car loan applied by a consumer).

Fulfillment, specifically in some cases, may extend beyond the issuance and financing of the lending product, especially in the case of secured lending, where collateral serves as security for the lender's interest. However, both (A) secured and (B) unsecured lending follow the same process. (See e.g. FIGS. 1-4.) (A) includes (but is not limited to) automobile, motorcycle, RV, marine, home equity line of credit or installment loan, first mortgage, lot loans, debit card, pre-paid card, and secured card, and (B) includes (but is not limited to) credit card, unsecured installment loan, and student loans.

We include pre-paid and debit cards under the same category of lending products, since the lender floats the money on behalf of the user (or customer or consumer), until the funds from the user are accessed (sometimes instantaneously) from user's source of fund. Also, both products are subject to fraud, that is typically associated with credit cards and other lending products, and in contrast to cash financing of purchases, where typically no fraud occurs.

Whereas currently, all three steps are offered through various channels (e.g., internet, branch, phone, and fax), none is offered on mobile channels. In other words, customers (1) are not provided with lenders' pre-selection offers, (2) cannot apply and (3) cannot obtain approval, or receive the lending products on their mobile devices. In general, the fulfillment of secured ending products is more complicated, as compared to that of unsecured products. For example, for auto lending, verification of the value of the vehicle, title inspection, placing a lien by the lender on the title of the financed vehicle, and the whole department of motor vehicle title application (and transfer process) are very much involved, ultimately leading to the disbursement of funds to the dealer or the seller of the vehicle on behalf of the borrower by the lender.

Similarly, for financing a first mortgage or a home equity loan or line of credit, an appraisal of the real-estate property, borrower's income verification, and placing a lender's lien on the title are a few of the numerous steps needed in the fulfillment process. Whereas fulfilling a credit card application simply and only involves mailing the cardholder a plastic card in the mail and having the cardholder activate the card with the lender.

Figure 2A:
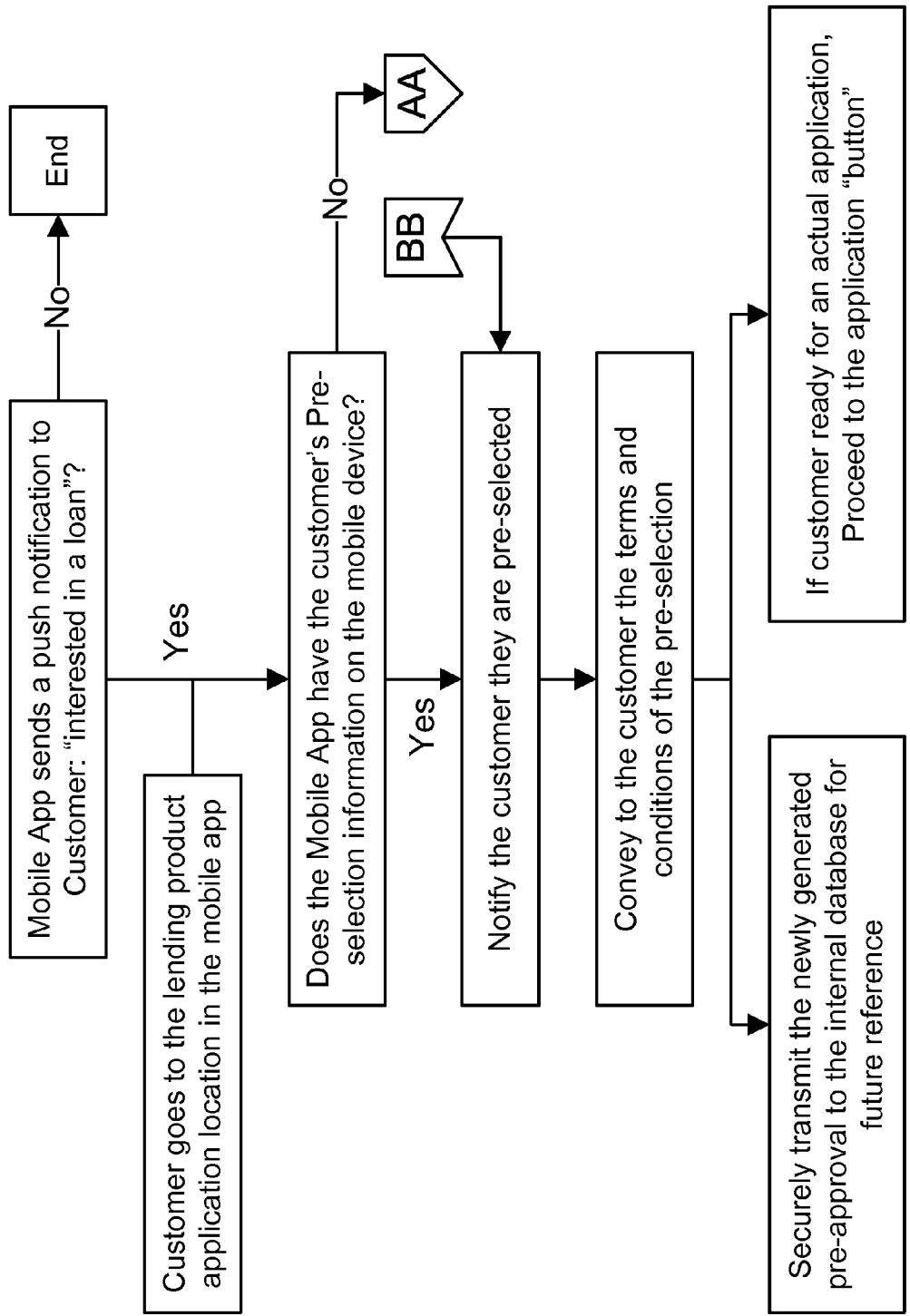
FIGS. 2a-2b show "Pre-Selection or Pre-Approval Process on Mobile Devices for All Lending Products", as an example.
Figure 2B:
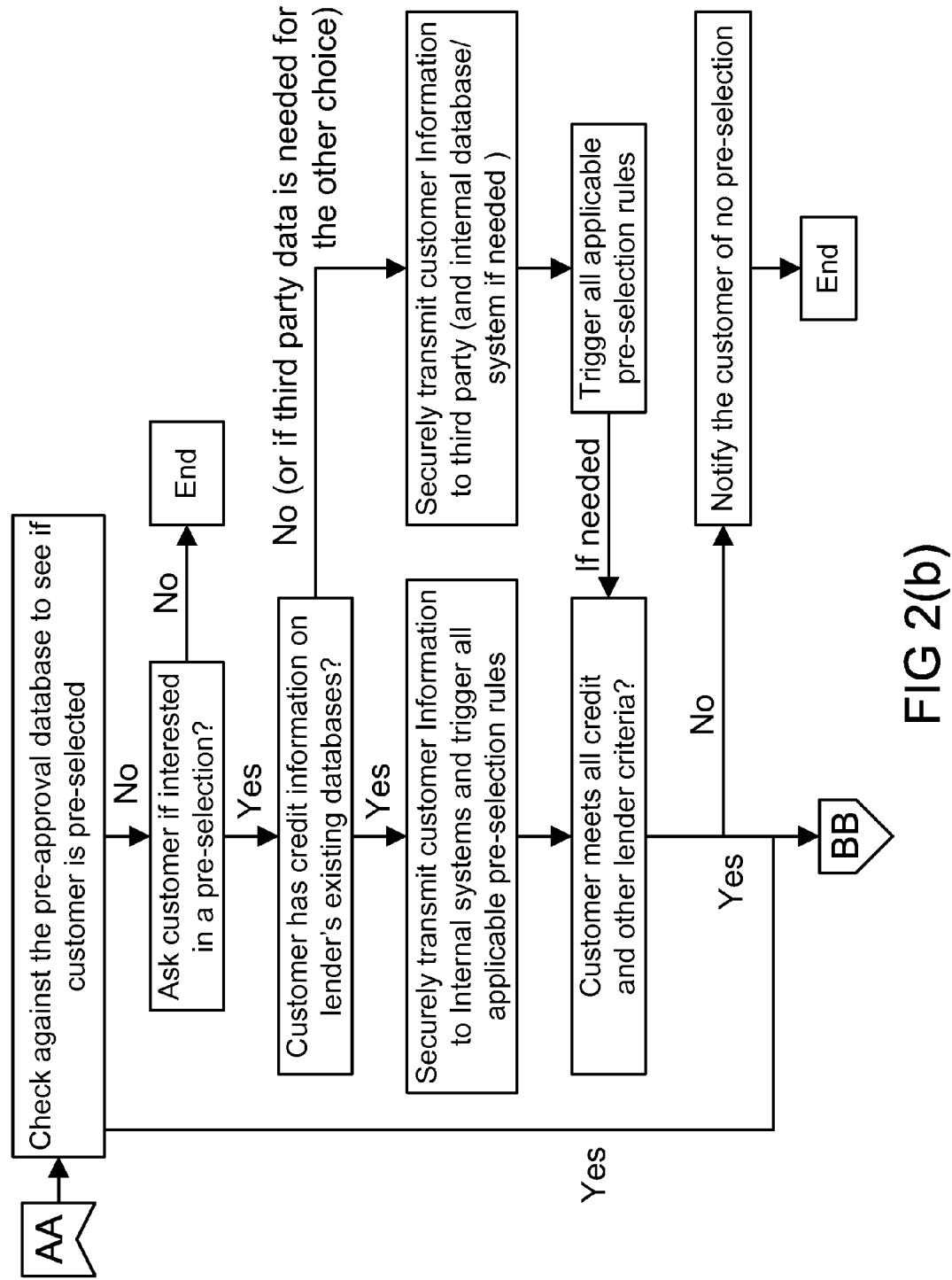

Summary for Pre-Approval Process on Mobile Devices for all Lending Products:

This is shown in FIG. 2, FIGS. 2a-b, as an example. Sometimes, the 3-step process (application-approval-fulfillment process) is preceded by lender's unconditional, or in most cases, conditional pre-approval (pre-selection) of the borrower. Other terms, such as pre-screen, pre-selection, or invitation-to-apply (ITA) are also used, in lieu of pre-approvals, but they are all marketing tools used by lenders to encourage the customer to borrow from the lender instead of other financial services providers. The lender may or may not decide to offer any favorable terms to those who have been pre-selected.

In general, the lists of targeted customers for these pre-selection routines comes from various sources, including but not limited to, existing customers of the lender or its affiliates and lists purchased or otherwise acquired from third-party suppliers. Such pre-selections may or may not involve the lender applying any kind of pre-selection criteria. These pre-selection notices are currently sent primarily through the following 3 channels: Internet (the lenders web site), email, and standard mail. Mobile channel has not been used for offering pre-approvals, pre-selections, ITAs, or pre-screenings.

Summary for Mobile Instantly Generated Credit/Debit/Prepaid Card Fulfillment and Usage Please refer to FIGS. 4a-d (FIG. 4), as an example. Lenders provide the following financial products that use a plastic card to disburse funds for typical purchases or cash withdrawals: credit card (secured or unsecured), debit card, and pre-paid cards, collectively here referred to as the "Card". The simple fulfillment process consists of printing the Card and mailing it to the customers, which usually takes at least 1 week. Once the card is activated with the issuing entity, the usage of the Card requires the customer swiping it against card readers in stores and entering various numbers and dates for online transactions. No instantaneous issuance and usage of the Card is currently practiced by any lender, which includes the use of the mobile device in lieu and instead of the plastic Card.

Please note that, generally, the credit card information comprises credit card number and expiration date, among others.

Please note that, generally, we have at least 3 situations covered here, as a few examples: first at the store/merchant; second on-line merchant; and third for cash withdrawal.

The inventions above enable mobile pre-selection, lending product application (LPA), decisioning (approval), and fulfillment and usage of various lending products offered by financial institutions. Whereas, our invention regarding fulfillment and usage by default assumes the customer is already an existing customer of the lender with varying extent in depth of relationship with the lender, the customer or applicant for the lending product may or may not be an existing customer with the lender. In such cases, the customer or applicant must be given the opportunity to establish a new account via the mobile device app (MDA). The lender may take additional appropriate and necessary steps that are usual and customary to prevent fraud in such cases.

Please note that the conventional application approval involves getting income, social security number, and name of the applicant, to be sent to credit bureaus, to get credit scores, to be evaluated later, based on the rules, for approval or decline of the application.

Summary for Pre-Approval Process on Mobile Devices for All Lending Products

This is shown in FIG. 2, FIGS. 2a-b, as an example. Pre-approvals, ITAs, pre-screens, and other types of pre-selections (collectively referred to as pre-selections) are typically offered to existing, prospective, or potential customers of lenders, and if available (stored in internal databases). Such pre-selections maybe offered to customers on mobile devices as a means of marketing the product to them and/or easing the process of lending product application (LPA), approval, and financing of the lending product.

In some embodiments, the lender's mobile device app (MDA) can send a push notification (mobile notice) about the availability of a pre-selection offer to the customer or inquire the customer about their interest in a specific product. In other embodiments, the same notice or push notification can be made visible to the customer, once the customer invokes the lender's mobile device app (MDA). In yet another embodiment, the notice can be visible once the customer touches a link (touch screen button) on the lender's mobile device app (MDA), specifically related to the lending product where a pre-selection offer is available.

Regardless of the notification method, two distinct cases arise. In the first case, the pre-selection of the customer for the lending product that has already occurred, is valid (has not expired yet), and is known or can be readily known (without information transmission from other sources) to the mobile device app (MDA), based on the information previously submitted to the mobile device app (MDA). In this case, should the customer be interested in acquiring the actual lending product, the customer can proceed to the lending product application (LPA) process (explained elsewhere in this disclosure), based on this pre-selection.

In the second case, where the pre-selection has yet to occur, or not known to, or cannot be readily determined by the mobile device app (MDA), the lender must transmit the information via secure transmission methods to their internal databases. Prior to such transmission, customer's agreement may be required or appropriate.

The lender then can follow their existing processes for pre-selection, which in some embodiments, may consist of applying internal credit or non-credit criteria (such as, recent or current past-due delinquency with the lender or its affiliates). Yet, in other embodiments, such regular pre-selection processes may include sending the information further to third-party vendors who may in turn obtain credit or other information and apply lender-provided or other criteria for pre-selecting the customer.

Finally, the information as to whether or not the customer is pre-selected becomes available to the mobile device app (MDA) and is shared with the customer, usually as a notice of conditional offer for the lending product. The customer at this point of time may use the offer by invoking the lending product application (LPA) process on the mobile device (see the related embodiments, described elsewhere in this disclosure).

Figure 11:
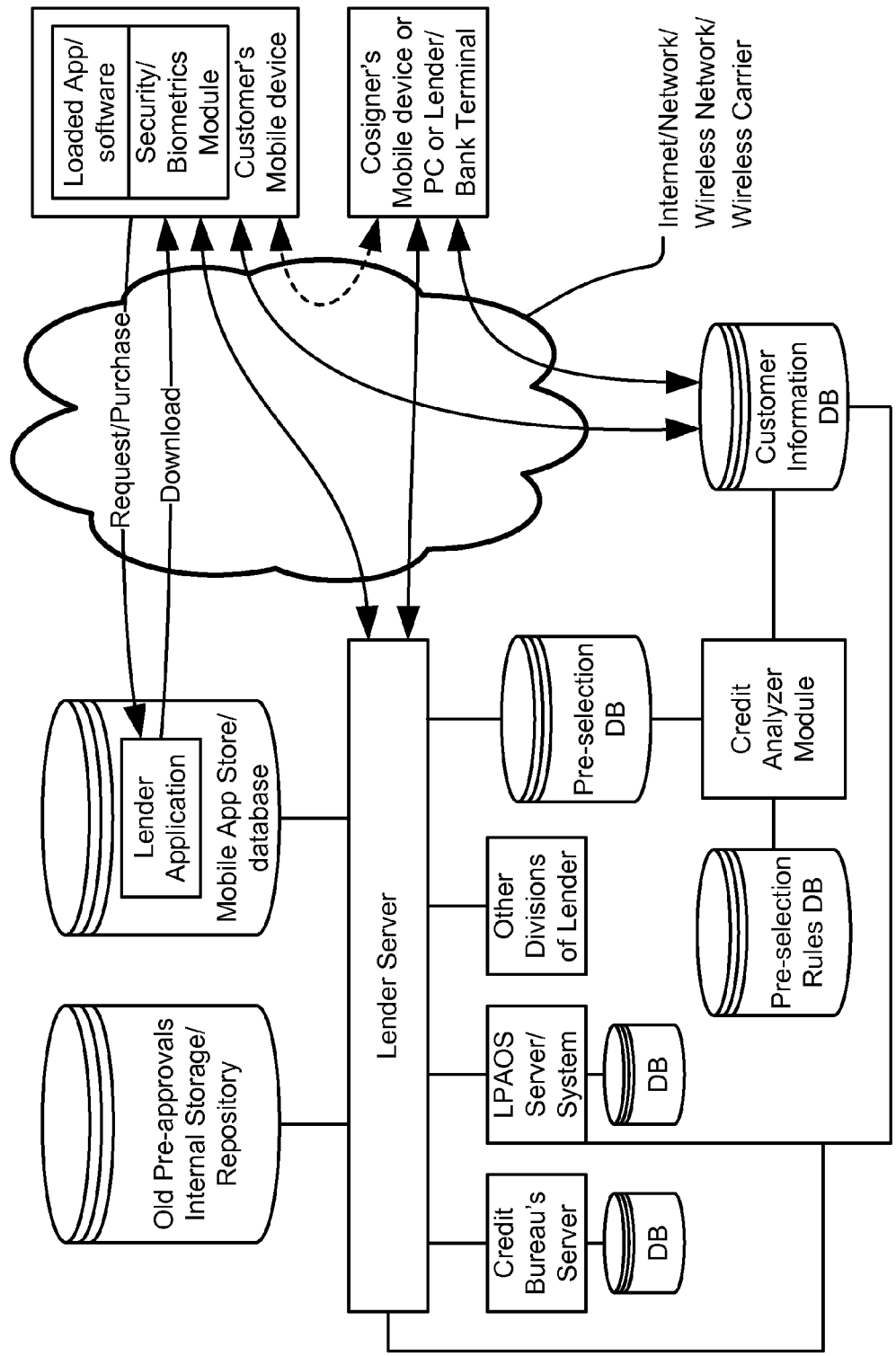
FIG. 11 shows an example of a system for Section 1.

Initially, the customer, client, consumer, user, or borrower request and purchase/download the lender software application from the on-line store, using her PC, computer, tablet, or mobile device/phone, which includes a biometrics/security module, as well, as shown in FIG. 11, as an example.

As shown in FIG. 2a, the Mobile App sends a push notification to a Customer, to see if she is interested in a loan (e.g. see lender server and mobile device in FIG. 11). Then, the Customer goes to the lending product application location in the mobile app (e.g. mobile phone software application, running on the mobile device). If the customer's pre-selection information is on the mobile device, then the mobile device or the overall system notifies the customer, with the terms and conditions. Then, it sends the pre-selection information into internal database for future use, and if the customer is ready, it proceeds to the actual application.

As shown in FIG. 11, the lender server is connected to credit bureau server (which has a database), and is also connected to other divisions and databases of the lender, e.g., to get more information about the customer. Lender server is also connected to LPAOS system/server (and its database). Multiple (2 or more) applicants, customers, or clients may apply and co-sign for the loan, with or using their devices, mobile phones, PCs, wired connections, Internet, network, tel. carrier, or wireless service/company, for which the credit histories of all people are examined, as a whole. The customer information (received from the customer) and the pre-selection rules are used to analyze the credits, and send the final result to the lender, as shown in FIG. 11. Each customer connects, signs up, and supplies to lender any needed/requested information (from the lender). In addition, LPAOS server and lender server communicate with customer information DB (database).

As shown in FIG. 2b, it checks to see if the customer was pre-selected. If not, it asks the customer if she is interested in preselection. If so, then it sees if it has information on the customer already. Then, if not, it gets the information, and it triggers all applicable preselection rules, to see if the customer meets the criteria. Then, it notifies the customer about the decision.

Summary for Lending Product Application (LPA) Process on Mobile Devices for all Lending Products As mentioned above, whereas various lending product application (LPA) channels are offered to customers by lenders, those channels do not include the mobile LPA channel. This invention/embodiment relates to the area of providing customers the means of applying for financing products via mobile devices, as a way to increase accessibility and convenience for the customers. The process (in general) starts with the customer (existing or new), being interested in applying for a loan through invoking the appropriate link in the lender's mobile device app (MDA). In some embodiments, the lender may choose to follow the pre-selection process reviewed above, or in others, the lender may decide to circumvent the process.

In general, though, the lender will need to identify the customer with certainty, in order to minimize or eliminate the risk of fraud. The customer identification is simpler, if the customer is an existing customer with the lender (has a business relationship), and if the phone number or other identifying number of the mobile device is registered with the lender. However, for the process to function as designed, the customer needs not be an existing one. In the cases where a new customer applies, the required information must be applied, via the mobile device, and the process may take longer to complete.

In one embodiment of this invention, the customer has an existing relationship with the lender. The mobile device app (MDA) prompts the customer for a few variables specific to the loan, that can vary from product to product. In FIG. 5, a list of possible fields of variables (e.g., collateral value and income) is provided for various lending products, e.g., automobile loans. Those collected fields, in addition to the identity of the customer and the customer's potential co-applicants (if any), are transmitted to the internal databases of the lender. All relevant information for completing the lending product application (LPA) is retrieved from the database. If the lender is missing any fields to proceed with the lending product application (LPA), the mobile device app (MDA) will prompt the customer to provide those. In either cases (complete or incomplete information), the mobile device app (MDA) may review a few fields that are essential to the lending product application (LPA), such as, but not limited to, name, social security number, and address, to confirm that the lender information is complete.

Once all the information is available, and possibly verified by the customer via interaction with the mobile device app (MDA), the lender may prompt the customer if the customer would like to proceed with the lending product application (LPA). This notice of intent to proceed with the lending product application (LPA) and other relevant information are then sent to the lender's internal IT systems.

The lender may decide at this point to transmit the information to the lending product application/origination system (LPAOS) specific to the lending product for which the customer is applying. The lender's LPAOS then follows the regular lending product application (LPA) processing steps to arrive at a decision. Some of such steps may be retrieving a credit bureau report for the applicants (customer and the customer's potential co-applicants) and triggering all applicable lending rules and potential incremental ones related to mobile lending product applications (LPA). (See FIG. 12.)

In case a lending product is offered, as outlined under (2), (3), or (5) below, at this point, a product may be constructed that fits the customer's needs and meets lender's applicable lending guidelines and requirements.

Ultimately, the process may or (1) may not result in a decision. A decision may be (2) a conditional or (3) an unconditional approval, (4) a denial or decline, or (5) a counter-offer (not exactly what the customer wants, but what the lender can offer based on the customer's credit and capacity profile). In either of those cases (1) through (5), the outcome is transferred to the mobile device, and the customer is notified of the outcome and the next steps for potential fulfillment and relevant terms and conditions of the lending product, should the outcome be (2), (3), or (5). In all cases, disclosures may be required to the applicants that are conveyed to the customer via the mobile device app (MDA). Some cases, such as case (1) may require the customer to contact the lender via other means (such as phone).

Sometimes, the lender requires more information from the customer, which can be either sent in person, by mail, fax, or electronically, using email, text messages, SMS, or smart phone/communication devices, computers, tablets, PDA, or laptops.

The notification may take different forms, depending on the legal requirements and lender's preferred business practices, and may involve notices on the MDA, via email or first class mail.

Another scenario that may arise is that the offered lending product does not exactly meet the customer's needs and requirements. As an example, the customer may need a 6 year auto loan, as compared to a 5 year loan that has been offered. In an embodiment, the lender may offer those various choices to the customer on the mobile device app (MDA), and have the customer decide which one to choose. In this embodiment, the functionality must be provided to the customer on the MDA. In yet another embodiment, iterations between the MDA and the internal systems of the lender (LPAOS, for example) may be required, and the MDA has to accommodate such iterations in order to finalize the lending product offering to the customer.

In such an embodiment, the MDA will prompt the customer if the offered lending product meets its needs. If not, the MDA must offer the customer a host of parameters (terms of the loan) that may be varied in order to accommodate for the customer's needs. The decision whether or not those changes are within the lender's criteria may be made locally on the MDA, or may have to be made on the lender's internal systems (such as the LPAOS), in which case transmissions between the MDA and those systems are required. In yet another embodiment of this invention, the lender may ask the customer to contact the lender via other contact channels, such as phone or internet, for any requests to change the product.

Mobile Instantly Generated Credit/Debit/Prepaid Card Fulfillment and Usage

Please refer to FIGS. 4a-d (FIG. 4), as an example. This embodiment assumes that the result of the Card application process (lending product application or LPA specific to credit card, debit card, or pre-paid card, collectively referred to here as "Card") through the mobile device process (explained under "Pre-selection Process on Mobile Devices for All Lending Products" section here in this disclosure), or otherwise, through other channels has resulted in (A) an approval or (B) a counter-offer accepted by the customer. The scope of this embodiment relates to the case where the customer decides to use or the lender decides exclusively to offer the mobile device as the means of fulfillment and usage of the Card. Note that the mobile fulfillment and usage may or may not be the exclusive method of fulfillment and usage. For example, the customer may decide to have the plastic card, in addition to the mobile device as a mode of using the Card. Furthermore, if a funding of a pre-paid card needs to take place, the assumption is that it has already occurred, by the time the customer decides to use it for the first time. (See e.g. FIG. 4b.)

The lender's host receivables system (HRS) contains the information related to the fulfillment and usage of the Card, specifically if and which mobile device or devices are used as the usage devices, if other means of usage are used in conjunction with the mobile device, and also security and verification data fields (such as, but not limited to PINS or security questions and answers). (See e.g., FIG. 4b.) The lender's mobile device app (MDA) may be enabled with the functionality of displaying a symbolic Card for usage. Furthermore, the mobile device app (MDA) is provided with the relevant Card information, including but not limited to all necessary information currently on plastic Cards (including the information on the magnetic stripes), in addition to other required card account information, such as, credit limit or available funds, APR (if applicable), current balance, and other payment and transaction data, if applicable. (See e.g. FIG. 4b.)

Please note that for security verifications, one can use the tel. number and some hardware or software ID or numbers or codes, e.g. preset by the manufacturer at the factory, to make sure that the user is the right person. Other conventional/available security/authentication/verification methods can be combined, as well, such as PKI (Public Key Infrastructure)/encryption/digital signatures, or scanning or recording or taking picture/image of face, eye, fingerprint, voice, or other biometrics, using a scanning line or camera(s) or digital recorder/microphone, on the mobile device or tel. set or cell phone.

Should the customer decide to use the Card on the mobile device, for example, to make a purchase at a merchant's store, the customer invokes the relevant mobile device app (MDA) and provides the necessary security information, as established by the lender and the customer. At this point, an embodiment may require mobile device app (MDA) to display a symbolic image depicting a Card. This image is not necessary for the completion of the transaction (may be optional), and may serve the purpose of reassuring the user and the merchant that the transaction is in progress and authentic. Other images or signs of usage may be displayed in alternative embodiments. (See e.g. FIG. 4c.)

The merchant's reader receives the Card information transmitted from the mobile device, via secured wireless communication channels—near-field communications (NFC) or otherwise. Merchant's reader transmits the transaction information (i.e., transaction amount) to the mobile device for the customer's (purchaser or Card holder) approval. (See e.g. FIG. 4c.) The customer reviews the details and approves the transaction. One or more iterations may be required between the mobile device and the merchant's reader, should the details not be accurate. The reader then transmits the information through the standard transaction clearing processes for Cards. If the transaction is approved, the transaction may be complete at this point, or in other scenarios, may require incremental steps, such as adding a tip in restaurants or other service providers to the transaction amount. The lender's mobile device app (MDA) may accommodate this step electronically within the MDA. Furthermore, upon completion of the transaction, an electronic receipt may be saved on the mobile device app (MDA) for future reference and verification. If the transaction is denied, the merchant informs the customer, as is customary in ordinary Card transactions, or alternatively, and in addition, the MDA informs the Cardholder of the decline and discloses potential reasons for declining the transaction. (See e.g. FIG. 4d.)

Figure 14:
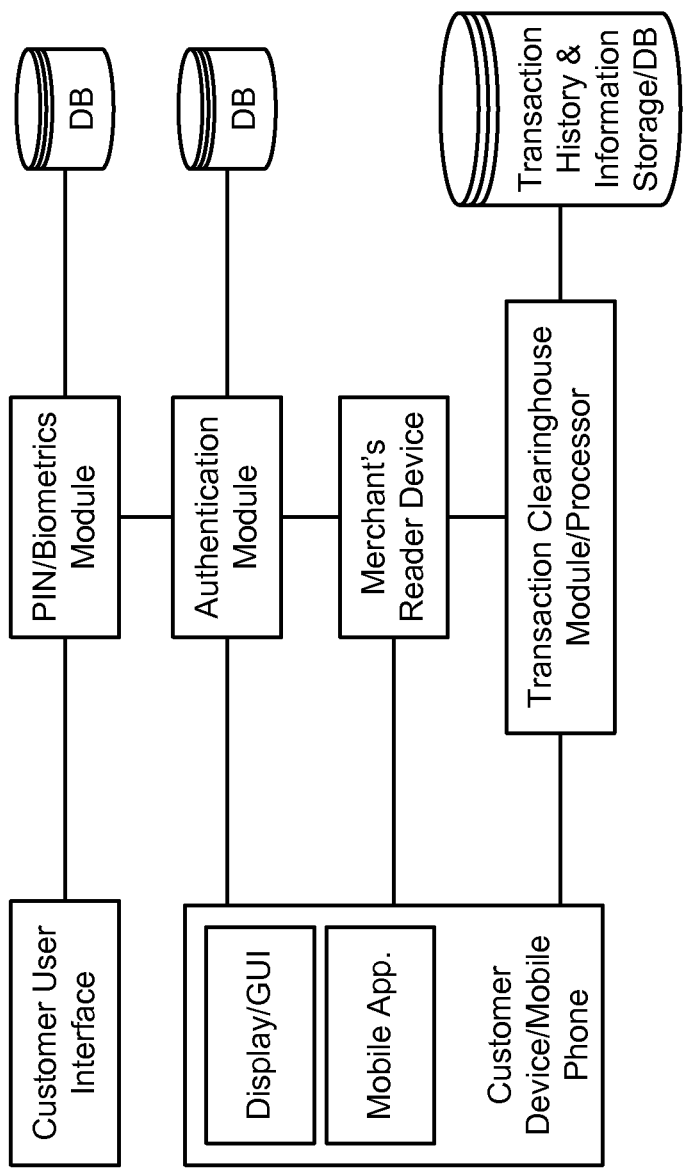
FIG. 14 shows an example of a system for Section 1.

As can be seen from FIG. 14, customer gets authenticated, using PIN, password, PKI (public/private key/digital signature), biometrics (eye, iris, voice, face, hand, knuckles, fingerprint, palm print, DNA, or the like), handwriting, signature, smartcard, RFID, badge, chip embedded in/on body or on a card, tel or hardware ID, manufacturer's ID, tel number, cell phone ID, or the like. The authentication apparatus is linked to the customer device, e.g. mobile phone, wirelessly, which has a display, and contains the mobile app. The customer device is connected to the merchant's reader device/scanner (e.g. via wireless communication), which is connected further to the transaction clearinghouse/processor/module, which stores the transaction history and other related information.

In other embodiments, no merchant reader may be involved, and an online merchant requires the Card information which is provided by the mobile device app (MDA) to be manually entered by the customer in the online vendor's appropriate fields.

In yet another embodiment, an integrated shopping environment is facilitated by the mobile device, whereby the mobile shopping environment of a mobile vendor invokes (with approval and possible interaction from the customer) the Card mobile device app (MDA) and ultimately completes the transaction, as outlined above, for the in-store reader. Except that in this case, the vendor's mobile store (shopping environment) serves as the merchant and the merchant's reader, and all data transmission is (A) within the mobile device between the mobile vendor's mobile device app (MDA) and the lender's mobile device app (MDA) and (B) possible transaction clearing transmissions required by the vendor's mobile device app (MDA).

Another type of transaction typically associated with credit cards is cash withdrawal, which is typically conducted with a plastic card and a PIN on ATMs or in bank branches. This invention and its various embodiments accommodate for this type of transaction by linking the credit card on the mobile device app with the customer's checking or savings account, where the funds can be withdrawn from the credit card account and transferred to the customer's checking or savings account. An interactive menu in the MDA lets the customer set up such links by providing the selected or linked account's number and the bank's routing number. Another set of interactive steps let the customer perform the actual cash transaction once the appropriate security requirements are met.

Figure 4A:
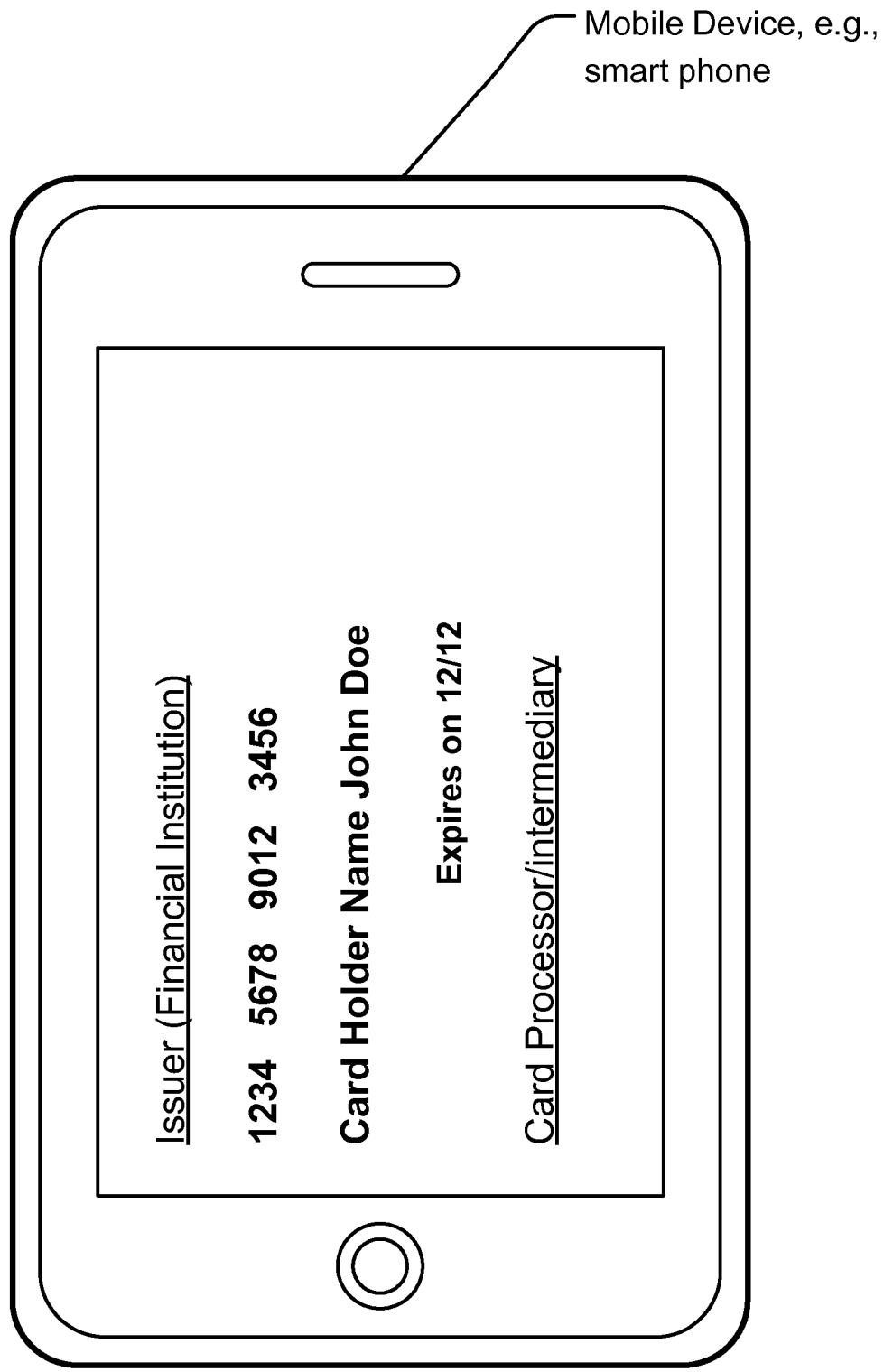
FIGS. 4a-4d refer to "Fulfillment and Usage Process on Mobile Devices for Credit/Debit/Pre-Paid Cards (collectively referred to as Cards)" process, as an example.
Figure 4B:
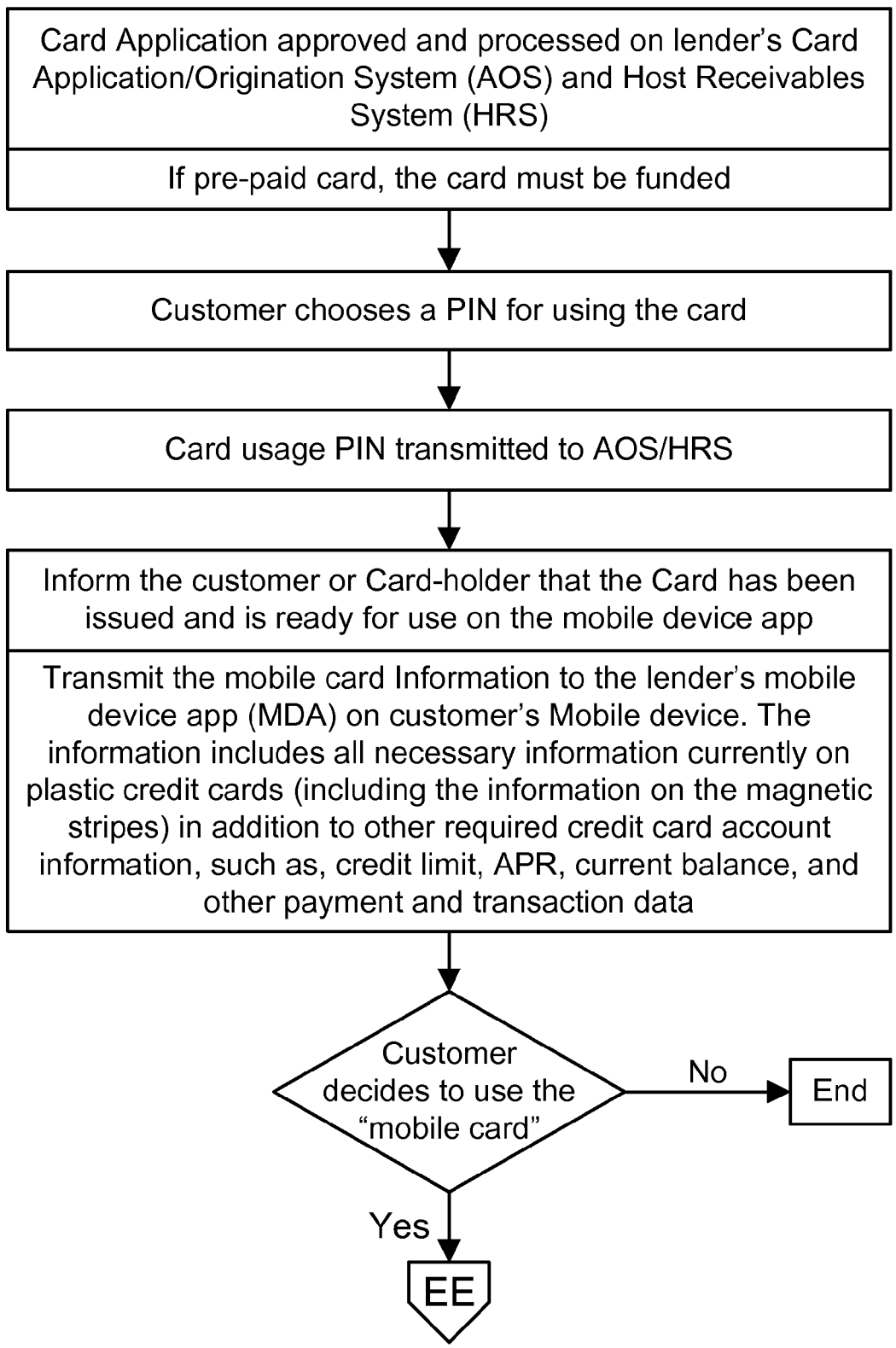
Figure 4C:
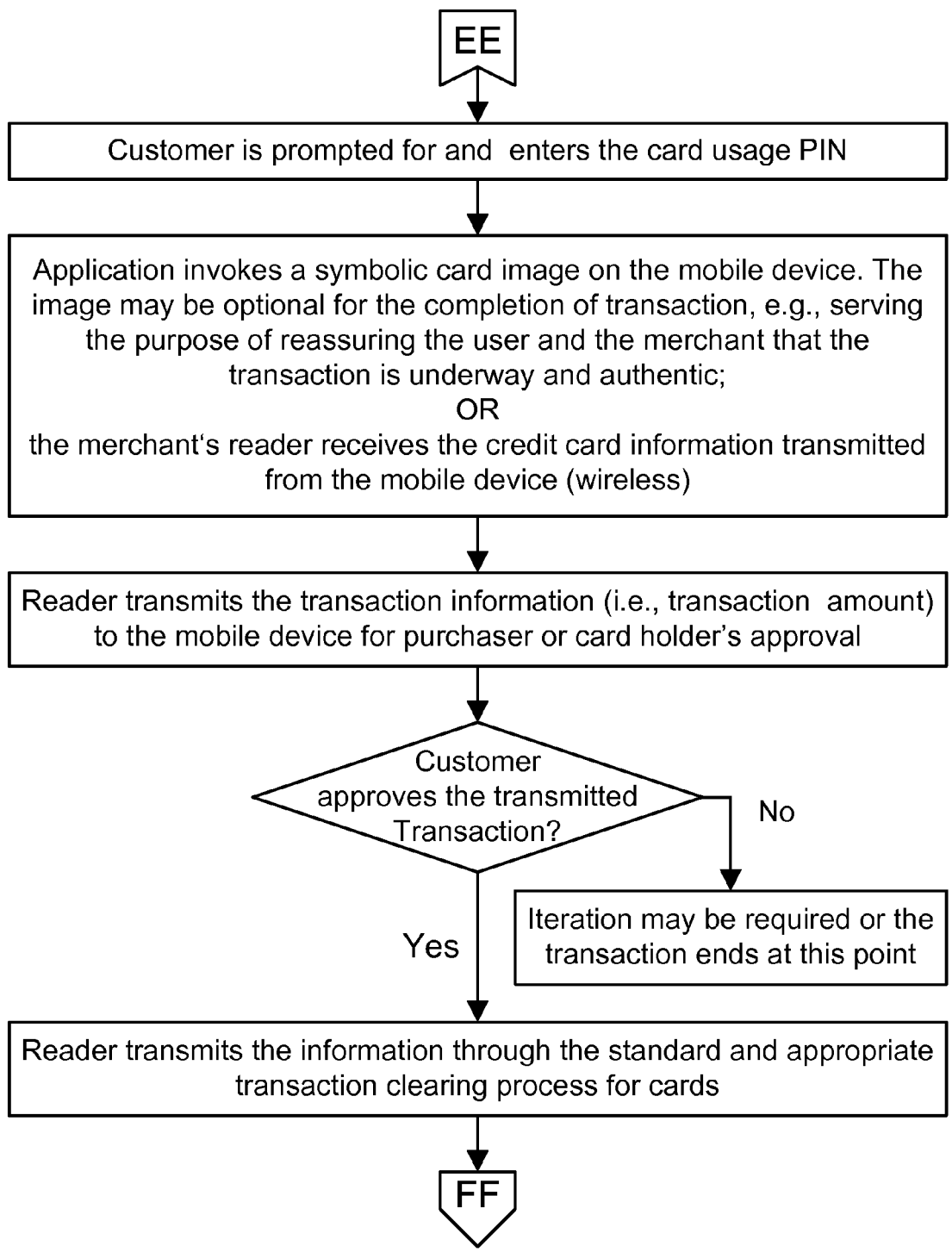
Figure 4D:
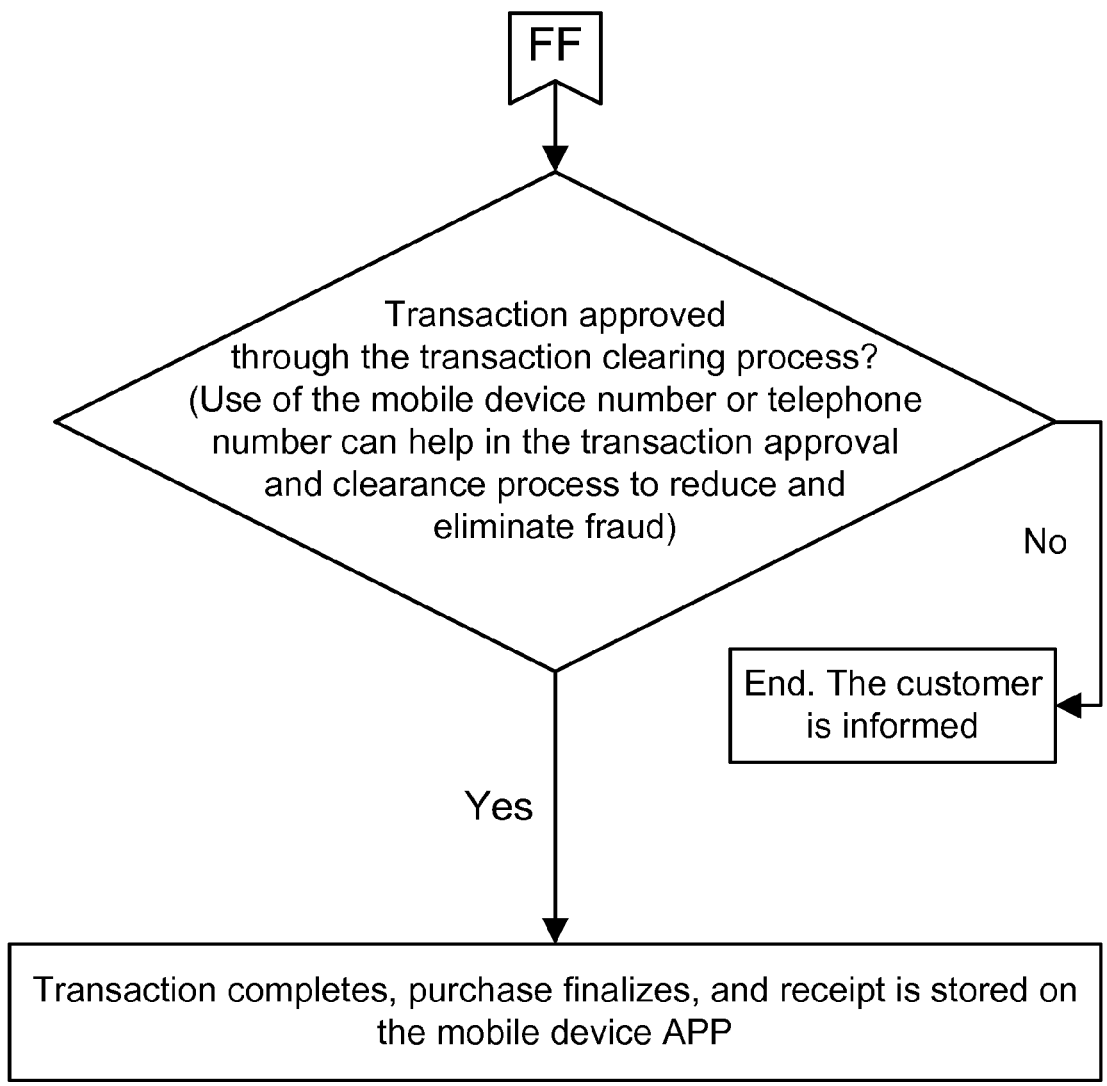

As shown in FIG. 4a, the mobile device, phone, PDA, computer, laptop, game device, GPS device, smart phone, computing or communication device, e-book reader, or electronic calendar shows the issuer information, card/account number, name, expiration date, card processor/intermediary, and other relevant card, user, and bank information, on its screen/display, which may include a 1 or 2 dimensional barcode or marker or patterns or images or symbols, for both humans and bar code reader/image scanner/camera/device/OCR (optical character recognition/reader)/pattern recognition module, to read, scan, analyze, and understand.

Figure 13:
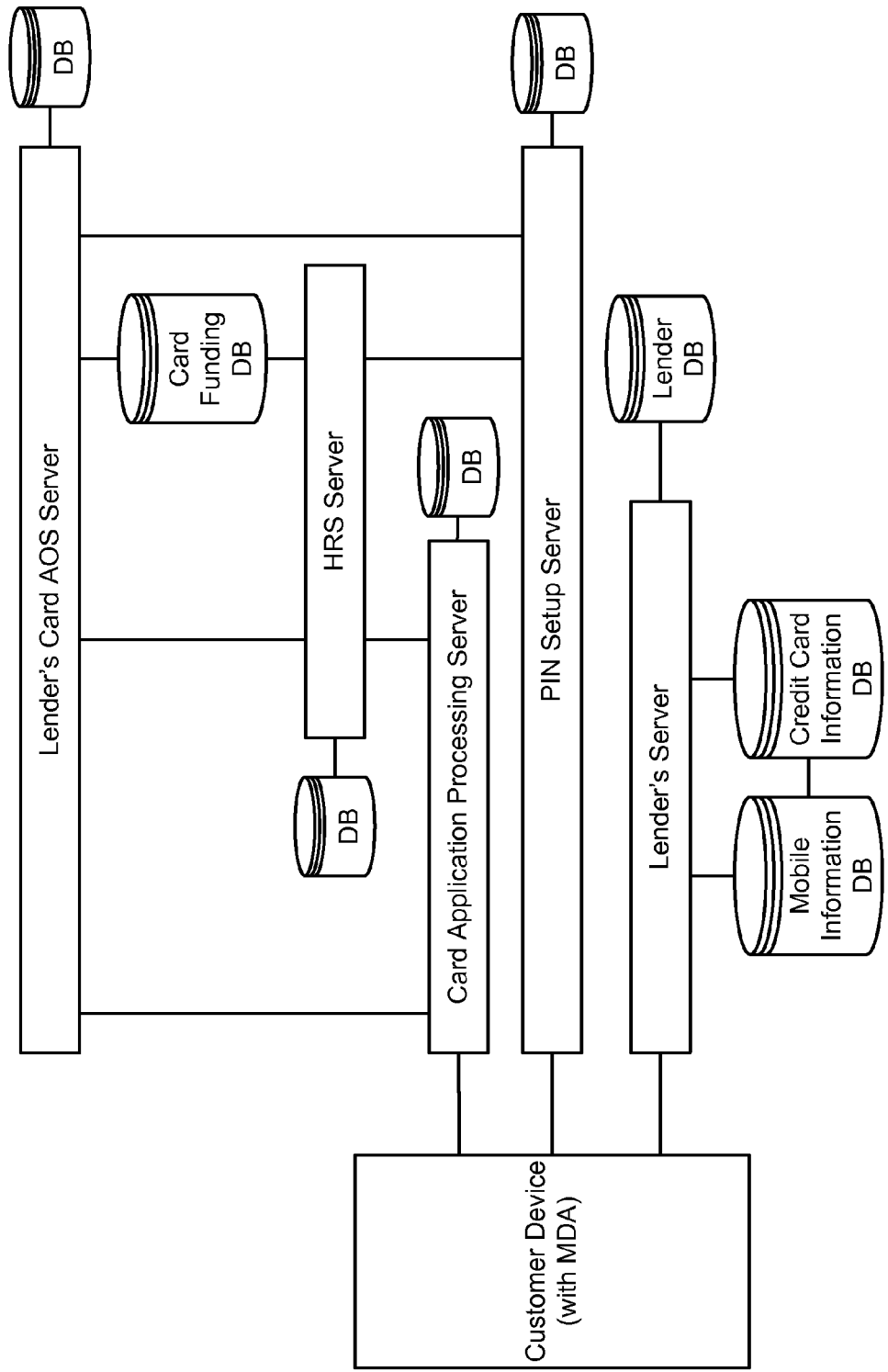
FIG. 13 shows an example of a system for Section 1.

As can be seen in FIG. 13, customer device (with MDA) is connected to PIN setup module/server/unit/device (with a DB), which is connected to lender's card AOS and HRS (with DBs). The customer applies for a card (card application), which when approved, it gets funded (if applicable). Card application processing unit/module/server is also connected to AOS and HRS servers/modules. MDA is connected to lender's server (e.g. lender's main office, with a DB), which is connected to mobile information database and credit card information database.

Pre-Selection Process on Mobile Devices for all Lending Products

This is shown in FIG. 2, FIGS. 2a-b, as an example. The lender's customer in this preferred embodiment either demonstrates interest in a specific lending product, by pushing the touch screen button (link), specific to the lending product, or is prompted by the lender on the mobile device app (MDA), if such interest exists and answers "yes" to the prompt. If a pre-selection fee exists, the customer must be notified, agree to pay the fee, and choose the preferred and available method of payment, such as credit card, or from checking account. Regardless of the means of the interest becoming known to the MDA, two possible cases exist: 1) MDA already has information on pre-selection of the customer or 2) it does not have such information. If the answer is "no", the MDA checks with the lender's internal databases and probes if a pre-selection exists for the customer, and if the answer is "yes", then the MDA retrieves the necessary information related to the pre-selection from the lender's databases.

If no pre-selection exists, either on the MDA or on the lenders' internal databases, the lender may decide to follow instant pre-selection procedures, typically used in conjunction with lender's other marketing and origination channels. Furthermore, the lender may decide to ask the customer if the customer is interested in being pre-selected and provide a list of advantages of such pre-selection. If the customer is interested in such pre-selection, then the lender will have to go through a process of obtaining such pre-selection for the customer. Lenders, in order to save development costs, typically, decide to utilize the existing infrastructure for pre-selection and leverage the current process that exists for other marketing channels. However, the lenders may decide to set up a new infrastructure specifically dedicated to the mobile channel and dedicated to pre-selections.

Depending on the extent of the relationship the lender has with the customer, lenders typically decide to use customer's existing credit and other relevant information, or decide to use and leverage third-party suppliers of credit information, or a combination of these 2 sources. Both paths and also the combined path are used here, for different embodiments. Regardless of which path or the combination of the 2 paths that the lender decides to take, customer must meet all pre-selection criteria, which can vary in their depth and scope. If the customer does not meet the selection criteria, the customer may or may not need to be notified, depending on the prevailing regulations and the lender's business practices. If the customer does meet all the criteria and a pre-selection, offer can be made, or as explained previously, a pre-selection offer already exists (that mobile device app (MDA) has access to), then the customer is notified of the availability of the offer.

If the customer decides to peruse of the pre-selection offer, the lender may want to notify the customer of the next step to take, which would be to actually apply for the lending product, described under "Lending Product Application (LPA) Process on Mobile Devices for All Lending Products" section. If the offer is generated new for the customer, and did not exist previously in lender's databases, the lender may decide to store the newly generated offer until its expiration for future reference or use.

Figure 3A:
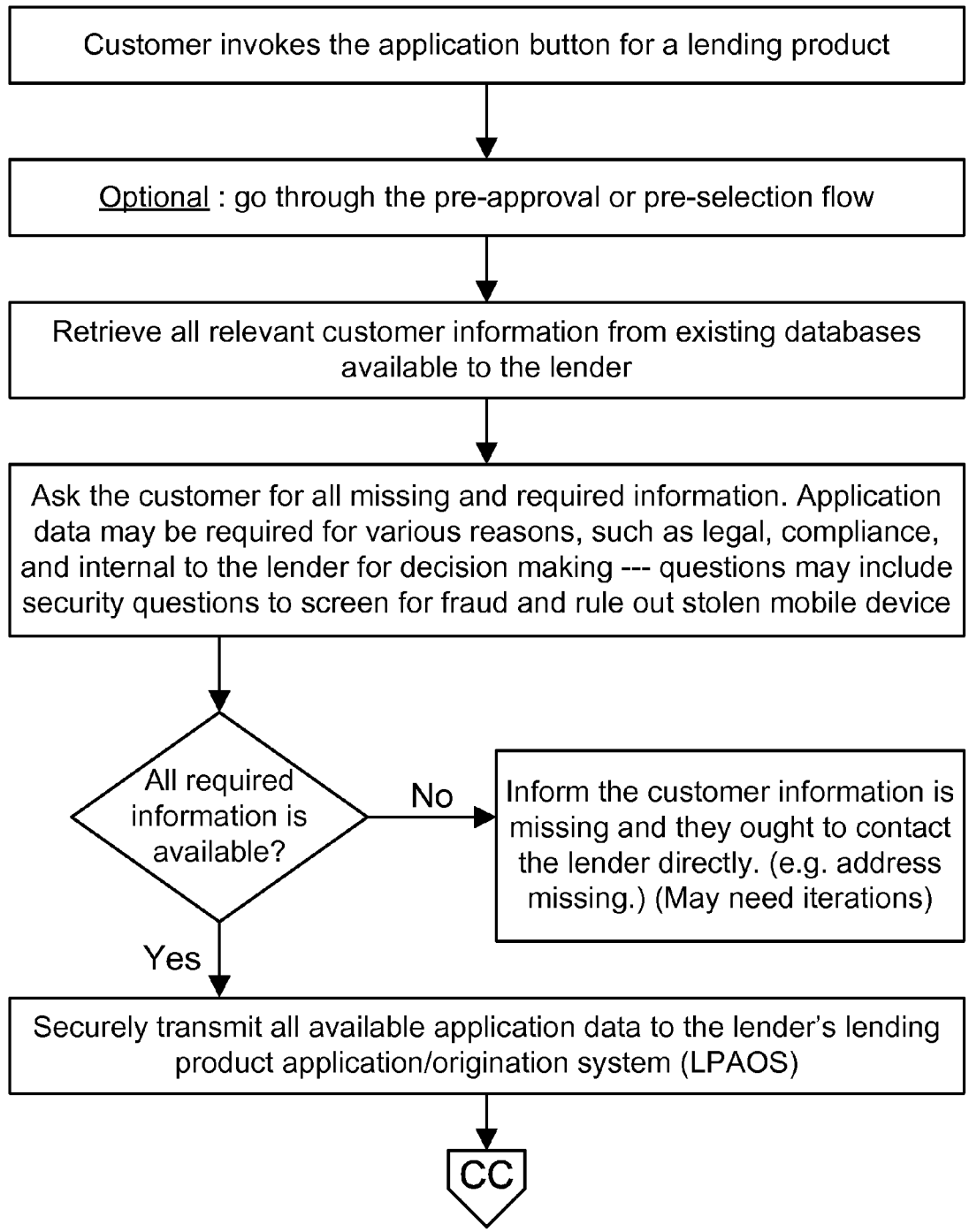
FIGS. 3a-3c show the "Application Process on Mobile Devices for All Lending Products", as an example.
Figure 3B:
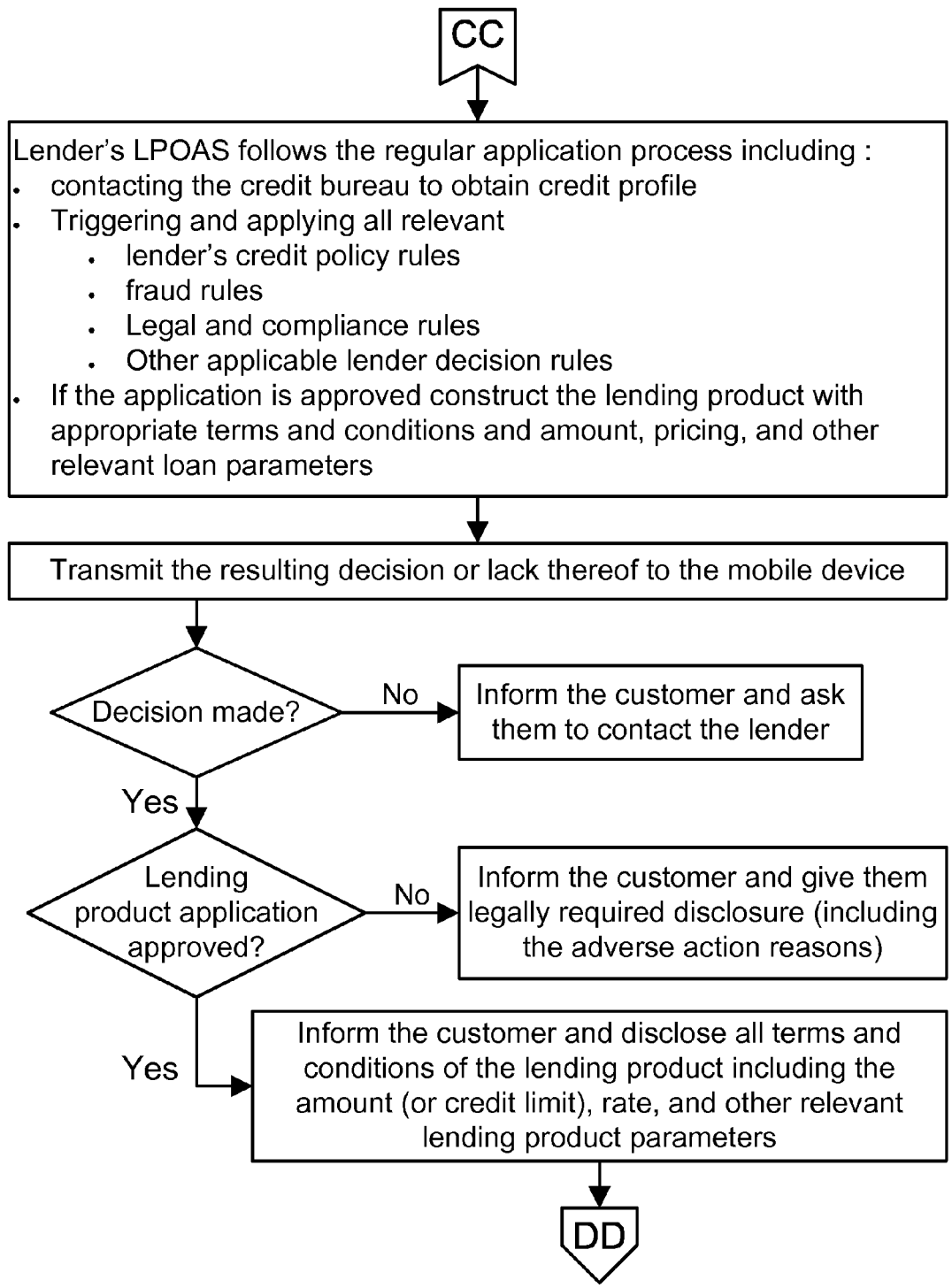
Figure 3C:
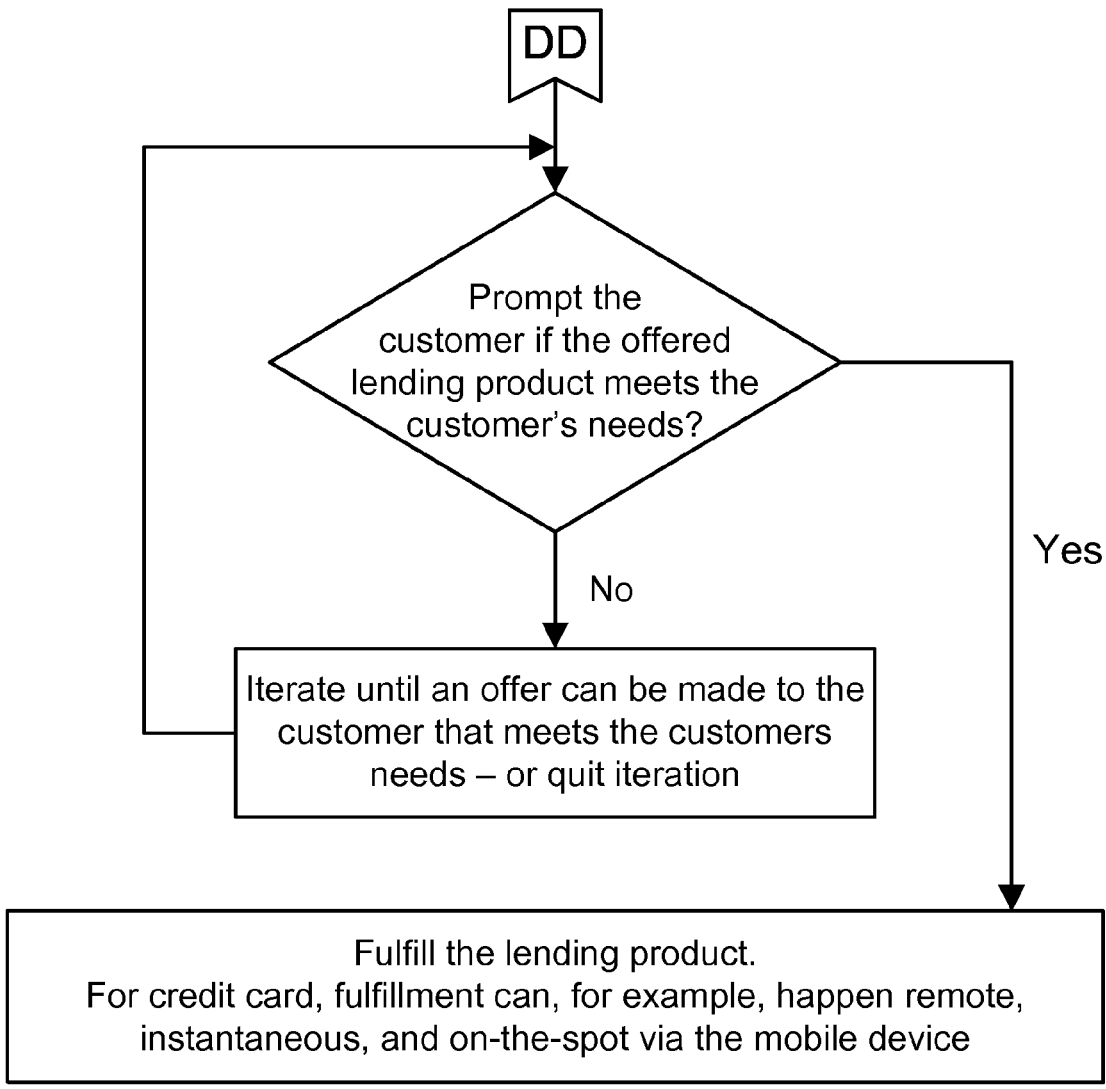

Lending Product Application (LPA) Process on Mobile Devices for All Lending Products This refers to FIGS. 3a-3c, as an example. This process typically begins by the customer invoking the touch screen button for lending product application (LPA) for the specific lending product that the customer is interested in, on the lender's mobile device app (MDA). If a lending product application (LPA) fee exists, the customer must be notified, agree to pay the fee, and choose the preferred and available method of payment, such as credit card, from checking account, or possibly added to the financed amount, if the loan is originated. Depending on the availability and a link of this process to the pre-selection process, the lender may decide to invoke the pre-selection process described under "Pre-approval Process on Mobile Devices for All Lending Products" section. (See FIG. 3a.)

Regardless of availability of pre-selection to the customer, at this point, for existing customers, MDA needs to access lender's internal databases, to retrieve all relevant information, or alternatively, have the internal systems of the lender determine which data fields are missing that the customer needs to provide. (See FIG. 3a.) Regardless of where those missing fields are determined (the MDA or lender's internal systems), the MDA needs to have access to those required and missing fields. If the customer has co-borrower(s), the same information for those individuals must be either retrieved from the internal databases or provided by the customer. To minimize fraud, the lender may decide to allow co-applicants on for the lending product application (LPA) process to only customers that have a deep relationship (e.g. with many accounts and many years, and at good standing in all of them) with the lender, or where a relationship between the customer and the co-applicant(s) already exists and recorded in the lender's internal databases. A list of possible fields needed for an application is provided in FIG. 5. This list, however, is not complete and varies depending on the lender's requirements (just serves as an example). Based on all the information the MDA has access to, if there are missing fields, the MDA needs to prompt the customer to provide those missing fields. (See FIG. 3a.)

Once all the pieces of information needed for the lending product application (LPA) are obtained, the lender's lending product application/origination system (LPAOS) must receive the information and process the lending product application (LPA), as it does other lending product applications (LPA) coming through other channels. (See FIG. 3a.) LPAOS are typically very complicated systems with a number of integration and link ports to other systems and databases.

In this embodiment, we assume the lender leverages the lender's existing LPAOS, to process the lending product applications (LPA). However, the lender may decide to implement a simplified or duplicate LPAOS specific to the lending product applications (LPA) for mobile channel either on lender's internal systems or on the MDA itself. However, given the expenses involved in setting up such systems, this embodiment may not be most lenders' first choice, in some situations. The LPAOS processes all the information and data fields provided for the lending product application (LPA) and retrieves incremental required information from third party sources (such as, but not limited to, credit bureau reports from credit bureaus). The LPAOS then triggers and applies all the encoded lending rules to the information that may relate to lender's own credit policy, fraud prevention, legal, compliance, or other applicable rules. (See FIG. 3b and FIG. 12.) The lender also may decide to treat the pre-selected offers more favorably. As part of processing the lending product application (LPA), if applicable, the LPAOS will construct a suitable product based on customer's requirements and needs and the lender's own credit and other criteria. Such product construction includes at the minimum relevant terms and conditions, loan amount or credit limit, other applicable fees, and also pricing (rate of the lending product). (See FIG. 3b and FIG. 12.)

Figure 12:
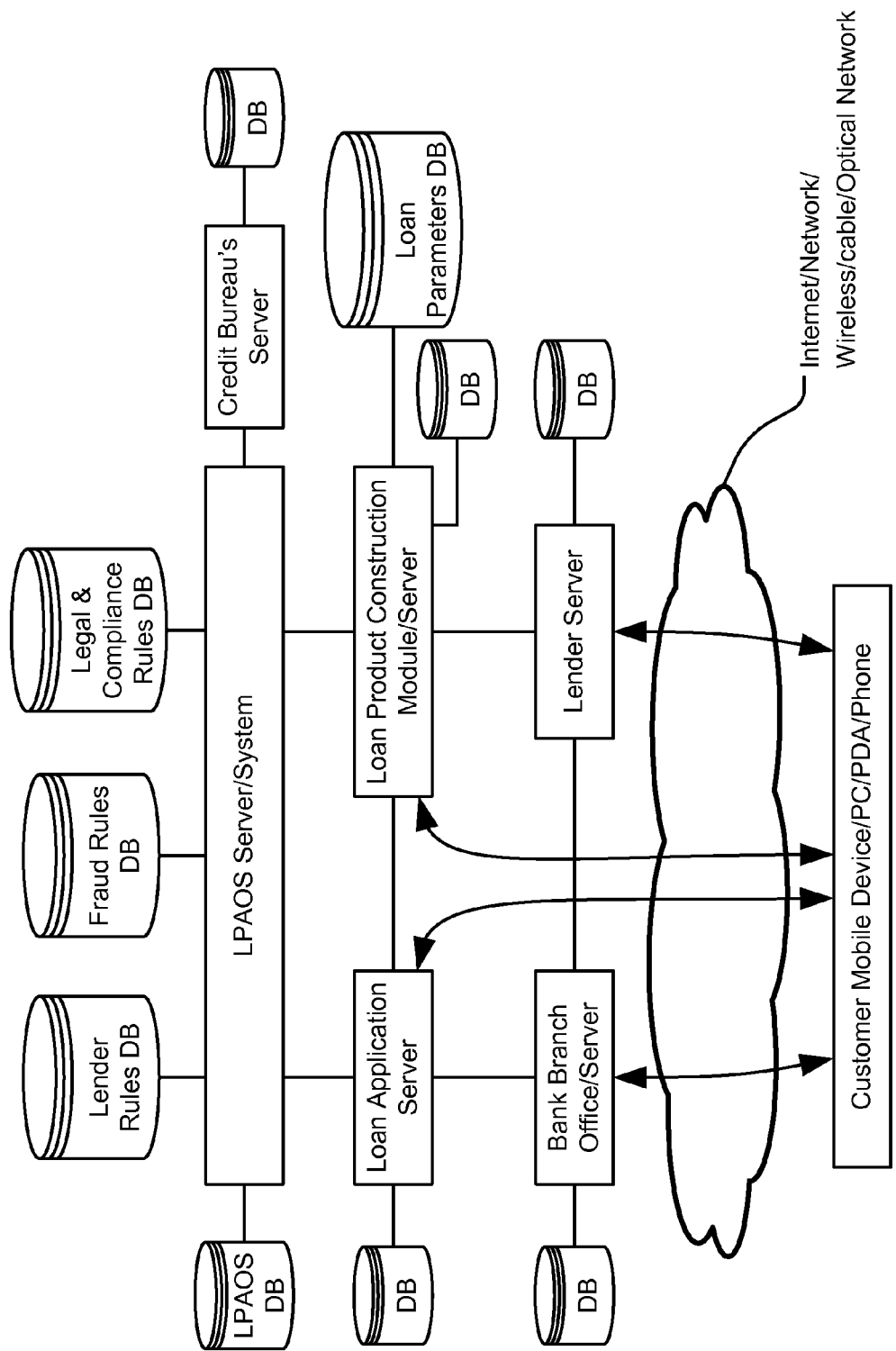
FIG. 12 shows an example of a system for Section 1.

As can be seen in FIG. 12, different rule databases and credit bureaus supply information to LPAOS (which has a DB or database), which constructs the loan products based on loan parameters (in the database, table, list, or formulas), to notify and inform the customer and lender's main office, for a loan application applied for, through/at the local bank branch, customer's mobile device or PC, bank remote terminal/ATM machine or kiosk in the mall, bank server, Internet, web site, secure network, private network, or wireless network/carrier/tel. company/service provider/network company/cable company, directly or indirectly.

Once the lending product application (LPA) process on the LPAOS is complete, the LPAOS then transmits the results to the MDA. (See FIG. 3b.) If a decision cannot be made, given the information that the customer has provided and the lender has access to, the customer is notified and informed of potential next steps to take, such as, but not limited to, contacting the lender via phone or other channels. If, however, a decision has been made and it is a decline or rejection of the lending product application (LPA), the customer must be notified and given adverse action reasons. (See FIG. 3b.) Depending on legal requirements, such notices may have to be sent in writing to the customer and all co-applicants. Such notifications may be also required in case of counter-offers (loop or iteration process, repeating those steps again). (See FIG. 3c.) If the decision is an unconditional approval, the customer is informed of the decision and the terms of the offered lending product and furthermore is advised of the next steps in the fulfillment process. (See FIG. 3c.) Same is true about conditional approvals, with the exception being that the lender needs to inform the customer of all applicable conditions of the lending product. (See FIG. 3b and FIG. 3c.) Similarly, for lending product counter-offers, notice is sent to the customer, including all the applicable terms and conditions.

Once the offer is presented to the customer, the MDA will prompt the customer if the lending product meets the customer's needs. If "yes", then the information is transmitted back to the lender's internal systems (for example, LPAOS). If "no", the MDA may have to offer to the customer choices of parameters that can be changed in the loan. As an example, the term of the loan may be changed from 5 years to 6 or 4. As another example, the customer may want to increase the amount the customer had requested earlier for the loan from, say, from $25,000 to $30,000, since e.g. the customer wants to buy and finance a more expensive vehicle. The MDA may, for example, in the case of different loan durations, determine the monthly installment payments for those scenarios and ask the customer to choose one. In some circumstances, the decision whether or not to offer the lending product with the newly selected parameter(s) must be made on lender's internal systems (such as, LPAOS). In other embodiments, enough coding has been done on the MDA, where the decision can be made locally by the MDA. Iterations may be needed until the customer is satisfied with the product, in a logical loop, for repeating the same process, until the loop is exited.

In all embodiments, the lender may decide to offer the customer to save an application, to return to it later. Also, if the customer needs to change certain parameters later on, the MDA will have to accommodate for such changes, by letting the customer retrieve the application or the approval/counter-offer, and let the customer work with it and change those parameters, if necessary.

Finally, the customer is ready to fulfill the lending product. See "Mobile instantly generated credit/debit/prepaid card fulfillment and usage" section for instant fulfillment of the application of specific lending products. For all other lending products, the customer may have to be advised to follow steps that require other (e.g. non-mobile) channels.

More on "Mobile Instantly Generated Credit/Debit/Prepaid Card Fulfillment and Usage" Section:

Please refer to FIGS. 4a-d (FIG. 4), as an example. This embodiment relates to the first-time use (corresponding to a wireless mobile issuance) and future uses of credit card, debit card, and pre-paid card (collectively referred to as "Card") on a mobile wireless device via a lender's app (referred to as mobile device app—MDA). An embodiment of this invention can function under various scenarios where (1) the mobile device app is the sole (and by default the first) method of usage of the Card, (2) the first and one of various methods of usage, (3) one of the various but not the first method of usage, and (4) where multiple mobile devices are means of usage.

Regardless of whether or not other devices and means are used for fulfillment and usage of the Card, in order for the lender to grant permission for a customer to use a mobile device for the first time as the method of usage for the Card, the lender and the customer must establish security measures to prevent fraud. This step may involve establishing one or more of the following measures: personal identification numbers (PINs), passwords, and security questions and answers. One or more of the same verification methods may be used in the future verification of future uses of the credit on the mobile device, along with the identifying numbers of the mobile device (such as phone number, identification serial number, or the SIM card number). The security information must be transmitted from MDA to the lender's host receivables system and/or servicing systems (and any other system that such information is housed in).

If the Card requires prefunding (for example, for pre-paid cards), the funding must have taken place prior to the first time issuance or fulfillment and usage on the MDA. Such funding can be typically done with a check, or link to a checking or savings account.

At this point in time, the Card information required for conducting business, purchasing, and transferring cash is transmitted to the mobile device app (MDA), and the customer is informed that the Card is ready for use.

The remainder of this section discusses the case where a user wishes to use the MDA to actually make a purchase with the Card inside a store. MDA prompts the customer to provide the required security information that was entered in the previous steps of setting up the Card within the MDA. Once the security information has been verified, an image illustrating the ongoing credit card transaction pops open on the mobile device screen. The image can display a Card with all the relevant information that typically is displayed on a plastic Card, plus potentially additional fields on the back of the card (such as the extra 3- or 4-digit security code). A dial-button may be required to prompt the customer for the mode of transaction that will take place: 1) in-store, 2) online, or 3) cash withdrawal. Once the customer chooses the in-store mode of transaction, the MDA and the merchant's reader are ready to resume the transaction via conventional wireless communications, such as but not limited to, NFC (near-field communications). One of the optimal ways for the transaction to transpire is for the reader to send the relevant transaction information to the MDA exhibiting the merchant's name, the transaction amount, and potentially the details of the invoice (such as, the name of the purchased item). Once this information is shown on the screen of the MDA, the customer (Card-holder) can decide to accept or reject the transaction. This way, if more than one Card transaction is transpiring with multiple Card-holders, the correct transaction connects with the right MDA. Another embodiment of the system to address this issue would require that we have a queuing of the transactions, so no 2 wireless transactions occur simultaneously, leading to erroneous results. Multiple iterations may be required to finalize the merchandise or service being purchased and the transaction amount.

In yet another embodiment of the system, once the Card information is transmitted to the reader, the remainder of the transaction, such as additional verification (e.g., providing Zip code) or signature on the reader or paper slip, can transpire, as per existing processes set up for plastic Cards. This specific embodiment will reduce the production expenses both for the mobile device app (MDA) and the merchant's card reader.

Once the customer approves the transaction, MDA transmits the information to the merchant's reader and the reader transmits the information further through the regular and standard transaction clearing channels that Card transaction ordinarily are cleared through. Two clear cases emerge here. First, if the transaction is approved, the transaction concludes by the merchant receiving the payment information and the customer receives the merchandise and an electronic or digital copy of the invoice or receipt is stored on the MDA for future reference for the customer. If the transaction is rejected, either the vendor can inform the customer or the MDA can actually provide more descriptive details about the decline reasons. For example, the MDA can inform the customer that there is suspicion of fraud and the customer needs to contact the lender immediately if the customer wishes to conduct the transaction with the MDA Card right away. Or, the MDA can provide specific over-limit information to the Customer, for example: "The current remaining open line on the credit card or the available funding on the pre-paid card is $235, and the transaction amount is $340". This kind of error message is not available to plastic card users. Thus, it is more informative and more advantageous for the user and all other parties involved.

Note that FIG. 5 is an example of a list of selected variables potentially required for specific lending products, as to the teaching given above. The "Application Process on Mobile Devices for All Lending Products" refers to FIGS. 3a-3c, or FIG. 3, as an example. FIGS. 4a-d (FIG. 4) refer to "Fulfillment and Usage Process on Mobile Devices for Credit/Debit/Pre-Paid Cards (collectively referred to as Cards)" process, as an example. FIG. 1 shows "General Schematic for Lending in Consumer Financial Products", as an example. "Pre-Selection or Pre-Approval Process on Mobile Devices for All Lending Products" is shown in FIG. 2 (FIGS. 2a-b), as an example.

Please note that FIG. 11 shows an example of a system for implementing method of FIG. 2. Similarly, FIG. 12 refers to FIG. 3, and FIGS. 13-14 refer to FIG. 4.

Figure 15:
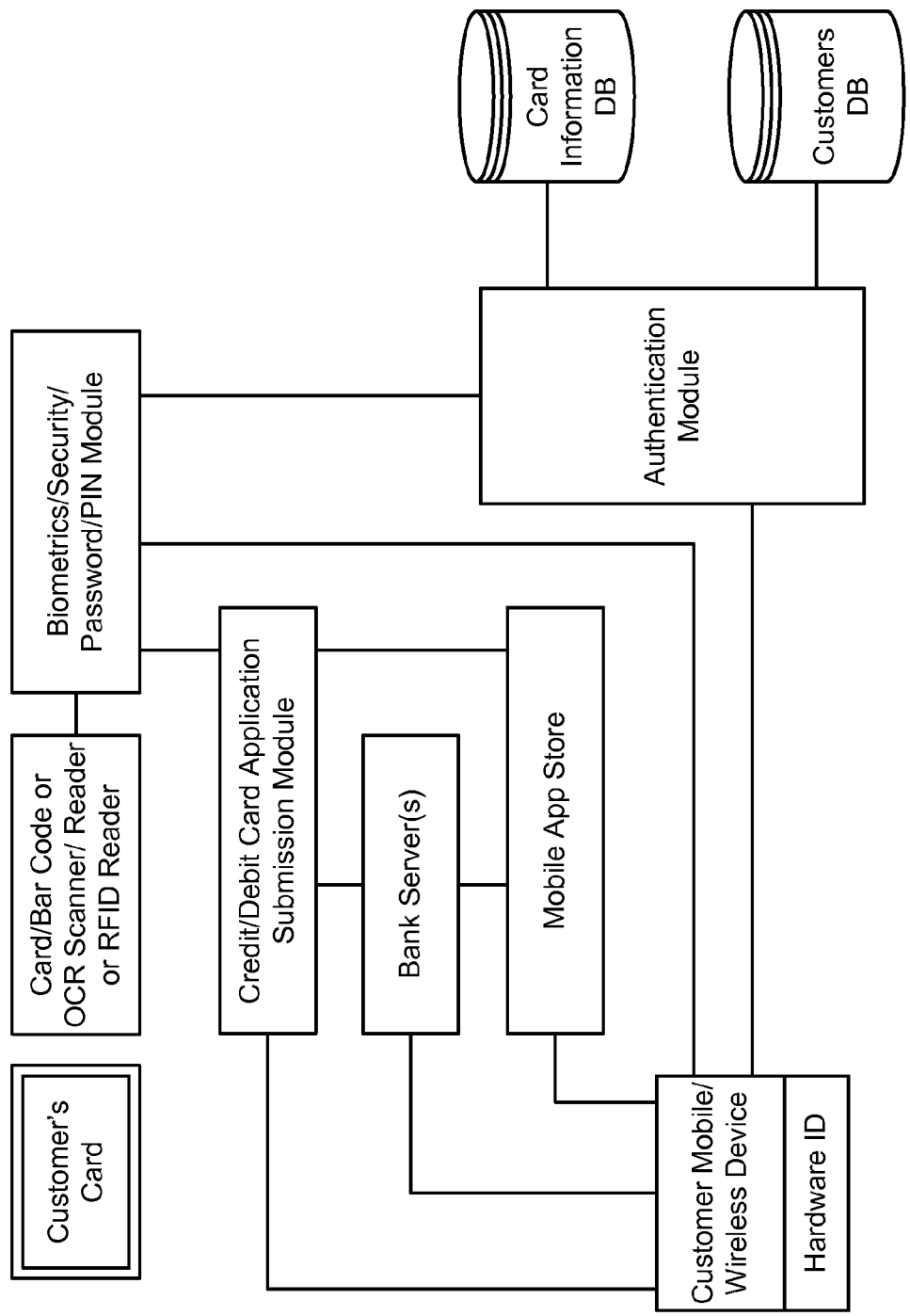
FIG. 15 shows an example of a system for Section 1.

An Embodiment for Mobile Phones:

Let's look at FIG. 4a, as well as FIG. 15, as a guide for this embodiment. Here, we deal with a mobile smart phone instantly generated credit/debit/pre-paid card application (mobile device application or MDA). The financial institution application is loaded on the phone set, with buttons or menu on the screen, to choose between "credit card" or "debit card" options, as an example. Then, a security module or password is invoked to verify the user. Then, the screen of the smart phone, e.g., displays financial institution information, plus bar code or 2D bar code, name of card holder, credit card number, and expiration date, among other useful information.

Thus, the steps are:

The user goes to the application of her bank, on her smart phone.

She invokes the button for "credit card" or "debit card".

If there are more than 1 Card to select from, in cases where the customer has multiple cards with the lender, the customer is given the option to choose one to use.

An application generates the image of the specific card selected, with all the necessary information for the reader to read, e.g. OCR or scanner or bar code reader.

A specific reader reads the information, matches against the database, and charges the credit/debit accounts, accordingly.

To prevent fraud/reduce the fraud, the application matches, for example, the phone number and hardware ID number against the ones on the record for the account.

One can also implement a passcode/PIN, for security.

One can also extend this concept to prepaid cards, with an extra step of purchasing the card. The consumer wants to obtain the card fast, with no preapproval needed, to get some dollar amount from e.g. her bank checking account, which can be refilled later. That is, e.g., the customer initially has to purchase and fund the card with money from her checking account. Later on, for future uses, the card is produced as an image, and available dollar amount is displayed, as well.

The application for the credit card can be integrated into the whole process of invoking the card for display on the phone and immediate usage by the customer. Once the customer applies for the credit card, the bank goes through its normal process of underwriting and origination, and once approved, the card is displayed with the available credit limit to the customer, who can invoke the card, as explained above.

This is a big value for customers and banks, since the application, issuance, and usage become simultaneous, and the customer does not have to wait for the card to arrive in the mail, once they apply for it. They can also use that for on-line purchases.

As shown in FIG. 15, the customer's device (with a hardware ID, e.g. SIM card ID number, for cell phones), first, contacts mobile App Store, for proper software. Then, it applies for a credit/debit card application, which goes through authentication, using biometrics and other security information (e.g. password, picture, PIN, or signature), to be added to the customers' list/database. The customer's card or badge or chip, through barcode reader, RFID reader, card reader, magnetic reader, scanner, reader, OCR, laser scanner, pattern recognition scanner/analyzer, or optical reader, is connected to the biometrics/security module/device/apparatus/subsystem.

Section 2: Financial Products for Protection of Consumers

In this section, we are going to address the following embodiments (as referenced in FIG. 16, as an example): "Financial Products for Protection of Consumers, against Increasing Interest Rates in Variable and Adjustable Interest Rate Products".

Presently, a number of products provided by lenders to consumers have variable or adjustable interest rates that reset periodically based on a variable rate interest rate index, such as:

11th District Cost of Funds Index (COFI)
London Interbank Offered Rate (LIBOR)
12-month Treasury Average Index (MTA)
Constant Maturity Treasury (CMT)
National Average Contract Mortgage Rate
Bank Bill Swap Rate (BBSW)
PRIME or Prime rate Should these rates increase over time, the consumer may be exposed to an undue hike in their payments. As an example, let's say a consumer has $6,000 on their credit card account that charges PRIME+6%. Presently, PRIME is at 3.25%, making the minimum required monthly interest payment equals to approximately $6,000×(9.25%/12)=$46.25. Should PRIME double to 6.5% (in other words, increase by 3.25%), over time or perhaps in a short period of time, the payment will go up to $6,000×(12.5%/12)=$62.5, corresponding to a 35% increase in interest payment. The annual increase in the interest payment is $195, which is a relatively large increase for a consumer.

Another example would be an adjustable rate home equity line of credit (HELOC) that will reset with a LIBOR benchmark. HELOC accounts are interest-only for a fixed period of time. If the balance is $50,000 with 1-Year LIBOR currently at 1%, for example, and a spread of 4%, then it requires the borrower to pay $208 per month in interest-only payments. Should LIBOR increase to 4%, for example, the monthly payment will increase by 60% to $333. Clearly a shock to the borrowers is present. Due to elevated levels of interest rate and the consumer's potentially worse credit situation, refinancing at the end of the fixed term can also be challenging for the consumer, should the rates increase at the time of refinancing.

Current Offerings

Presently, a number of products, such as credit cards, provide no protection at all, where the cap of the interest rate is set by state usury laws, if any. Other products, such as most home equity lines of credit, provide a one-time option to the borrower to lock the fixed rate at that point in time where the fixed rate is so much higher that precludes the borrower from protecting themselves from upward movements in interest rates.

Our Invention, to Solve the Problem Above

Lenders offer the financial product proposed in this invention to borrowers of floating, variable, or adjustable interest rate loans, lines of credit, or other forms of borrowings that are benchmarked against an index as outlined above. The product provides an option to secure fixed rate financing (at a predetermined rate, which is fixed, known, and agreed upon, from the beginning) for a given balance of the debt financing (be it all or part of the actual borrowing), for a fee or as part of originating and servicing the loan offering. The following table outlines the features of this product and the types of loan it can apply to, as one embodiment:

For example, Table 1 shows the Underlying Lending Product:

| | Underlying Lending Product |
|---|---|
| Collateral | Any or none, including real-estate (in other words for both secured and unsecured lending) |
| Lien Position | First, second, or any other and in case of unsecured lending (none) |
| Term | Term of the loan or the line of credit |
| Credit type | Installment or revolving credit |
| Payment type | Straight amortizing, interest only, or negative AM (amortization) |
| Interest rate | Floating, variable, or adjustable (not fixed) (e.g. prime + delta) |

For example, Table 2 shows the Interest Rate Option Product:

| | Interest Rate Option Product (IROP) |
|---|---|
| Term | As agreed upon between the lender and borrower but up to the term of the loan (see above) |
| Fixed rate | As offered by the lender and accepted by the borrower - depends on the product pricing |
| Balance | 1. As per customer demand or<br>2. The outstanding balance on the account<br>3. Not to exceed the credit limit on the revolving products (provisions in the product offering may have to be made, if the credit limit is increased during the term of the IROP). |

| Interest Rate Option Product (IROP) | |
|---|---|
| Remuneration (Pricing Options) (4 ways to pay, by consumer) | 1. One-time upfront payment<br>2. Increase in the Interest Rate of Underlying Lending Product<br>3. Offered part and parcel to the Underlying Lending Product offering by the lender<br>4. Financed as part of the financed amount, e.g., charged to the credit card |
| Main Feature | The customer has the option to refinance the Balance of the Underlying Lending Product at the Fixed Rate any time before the Term of IROP expires in exchange for the Remuneration |
| Termination | Can be at<br>1. The end of the Term of the Interest Rate Option Product or<br>2. The end of the Term of the Underlying Lending Product or<br>3. The unscheduled or early full pre-payment of the Underlying Lending Product or<br>4. The default or delinquency of the borrower<br>5. The option of the borrower to end the Interest Rate Option Product |

For example, Table 3 shows the table shown above for Credit Card example:

| Underlying Lending Product - Credit Card | |
|---|---|
| Collateral | None |
| Lien Position | None |
| Term | None - except for the expiration of card (2 years from now) |
| Credit type | revolving credit with a credit limit of $10,000 |
| Payment type | Interest only + a minimum principal payment of 1% |
| Interest rate | PRIME + 6.5% |

For example, Table 4 shows the table shown above for Credit Card example:

| Interest Rate Option Product - Credit Card | |
|---|---|
| Term | 1 Year |
| Fixed rate | 12% |
| Balance | For example, the lower of $6,000 as per customer demand (but not to exceed $10,000) or the outstanding balance of the card as per statement |
| Remuneration (Pricing Options) | 0.5% increase in the rate = $6,000 × 0.5%/12 per month = $2.5 (option 2 in Table 2 above) |
| Main Feature | The customer has the option to refinance the $6,000 at 12% any time before the 1-year period expires |
| Termination | Earlier of<br>1. 1 year from the date of the purchase of the option<br>2. Date when customer wishes to cancel the option<br>3. The default or delinquency of the borrower |

For example, Table 5 shows the table shown above for Home Equity Line of Credit (HELOC) example:

| Underlying Lending Product - HELOC | |
|---|---|
| Collateral | Real-estate property (single unit family house) |
| Lien Position | Second |
| Term | 10 year revolving |
| Credit type | revolving credit with a fixed limit of $75,000 |
| Payment type | Interest only with no required principal payment until the end of the term |
| Interest rate | PRIME + 1.0% |

For example, Table 6 shows the table shown above for Home Equity Line of Credit (HELOC) example:

| Interest Rate Option Product | |
|---|---|
| Term | 1 Year |
| Fixed rate | 7% |
| Balance | Customer or borrower chooses to acquire the option for $50,000 of the credit limit |
| Remuneration (Pricing Options) | $1,000 upfront fee that can be financed by tapping into the credit line (Options 1 or 4 in Table 2 above) |
| Main Feature | The customer has the option to refinance up to $50,000 of borrowings on the line at 7% any time before the 1-year period expires |
| Termination | Earlier of<br>1. 1 year from the point of purchasing the option<br>2. Date when customer wishes to cancel the option (the lender may refund a pro-rated or non-pro-rated portion of the remuneration mentioned above)<br>3. The default or delinquency of the borrower |

Therefore, a consumer has a safety net and sense of security against the large increases in the monthly payments, which is very attractive to the consumers. Therefore, for a bank or financial institution offering such a financial product and offering, the bank or financial institution can distinguish itself from the rest of its competitors, thus, increasing its customer base drastically, causing growth and more profitability in its business.

This helps consumers hedge against unexpected increases in interest rates and monthly payments that they may not be able to afford, so that they can lock at some threshold or maximum, as a worst case scenario, for a peace of mind for consumers, as a pre-determined situation (s) that is predictable and more comfortable/manageable/affordable for a consumer. This also helps reduce bankruptcy and foreclosures or forced auction of the house, for example, which is very costly for banks and consumers, with no delays at courts and less uncertainty for all parties involved.

Figure 16:
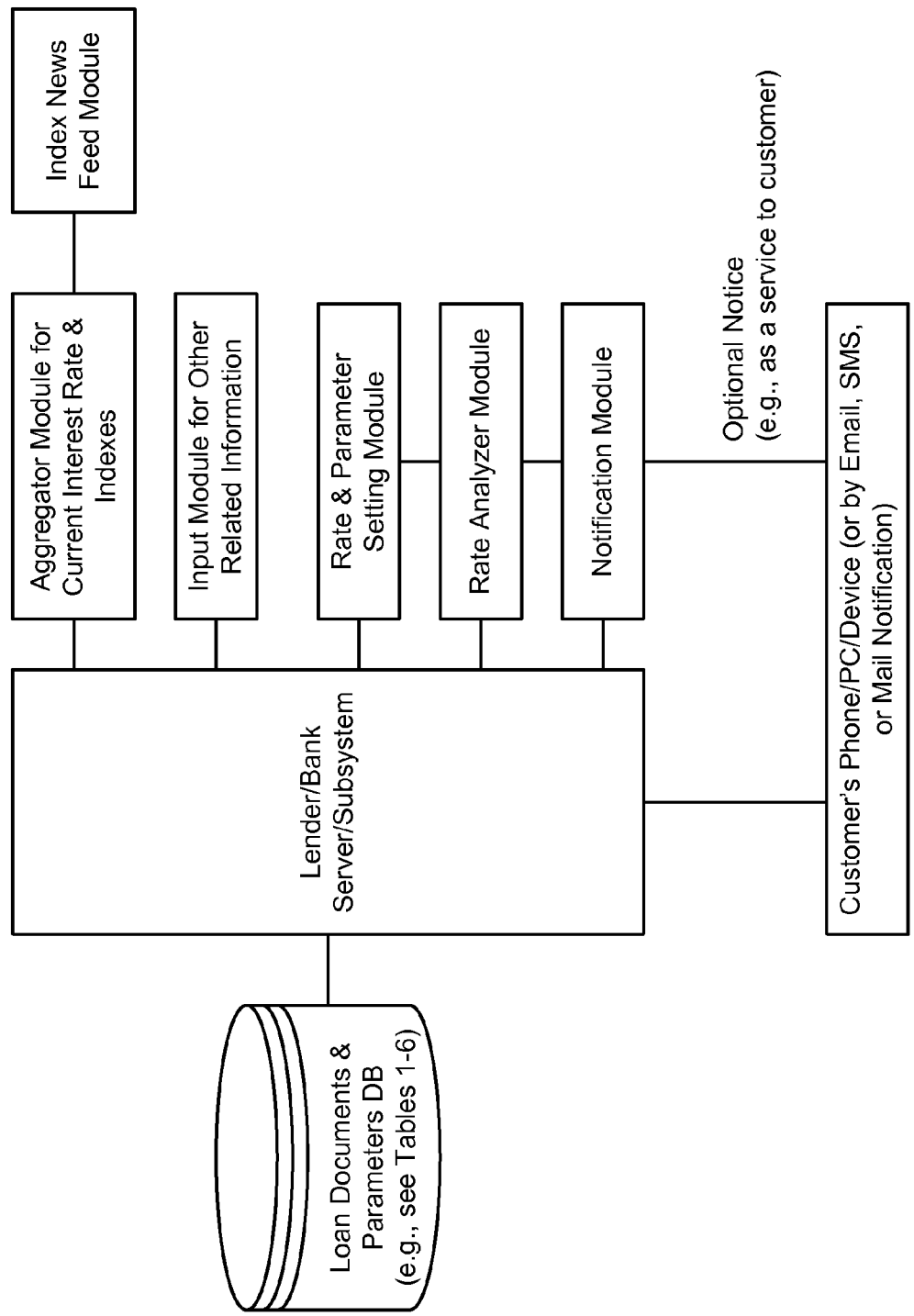
FIG. 16 shows an example of a system for Section 2.

Currently, such a product does not exist for individuals, e.g. credit cards or home equity line of credit. This will protect consumers greatly, and also will reduce the risks and expenses for the banks Please note that each of Tables 1-6 show only examples of this embodiment. The data structure shown on those Tables are typical parameters needed for implementing this invention. Also, please refer to FIG. 16, for a system implementing and using such a data structure and parameters. Please note that FIG. 17 refers to the system when consumer or customer initially decides to get/apply for the original loan from the lender, bank, card company, or financial institution, as an example. However, FIG. 16 refers to an example of a system when some time in the future, an "interest rate event" (or other events) happens that triggers one or more provisions of the original contract or loan agreement (as mentioned above), so that the interest rate (e.g.) gets adjusted accordingly, based on the original contract or loan agreement provisions. The initial trigger can come from the customer herself, to initiate or request or demand such an interest rate event, as shown in FIG. 16. The interest rate event can also start based on an outside parameter, monitored directly by the lender, without consumer intervention or input or knowledge.

As shown in FIG. 16, the lender gets the parameters from the original loan document, with market index feed from an aggregator, plus other relevant information about economy/forecasts/analysis, to analyze and set or calculate the interest rate, for the next phase of the loan, which can optionally notify the bank customer, about her loan.

As shown in FIG. 17, the consumer applies for a loan from a lender, which uses the current indexes and rates database. The lender evaluates the risk, using the interest rates futures and forecasts (e.g. from analysts and market data). Then, the lender constructs the lending product set with current and future parameters database, regarding current and future rates, in case of "interest rate triggering events", if applicable and/or exercised by the consumer. The interest rate triggering events refer to conditions and events/time periods in which they satisfy the provisions of the original loan agreement/contract/apparatus/product, so that the rate is adjusted automatically, or based on the consumer's option/request/demand, and upon such request by consumer or original borrower, without refinancing or renegotiating the loan terms in the future. (e.g., see Tables 1-6 for various loans/instruments/products.) The result goes back to the consumer device, and can be iterated/looped back, for offer/counteroffer/re-offer/adjustment on terms/requests, between lender and consumer/customer.

A Note on the Interest Rates:

The stepwise rate reduction for fixed term installment loans, as an example, can be discussed as follows (e.g. please refer to FIG. 17). Let's assume:

We assume monthly payment, but it can be extended to biweekly or semi-monthly loans, too. This is a conventional calculation, available from many sources, e.g. Internet or Wikipedia or Mathforum.org:

T=term in months
r1=initial annual APR
r2=secondary annual APR
K=period after which the interest rate is reduced from r1 to r2
M=payment, e.g. M1 and M2
P=principal, e.g. P0

Then, we have, based on the initial principal, P0:

$$M_1 = \frac{P_0 \times r_1}{12 \times \left(1 - \left(1 + \frac{r_1}{12}\right)^{-T}\right)}$$

After K payments, we have:

$$P_1 = \left(P_0 - \frac{M_1 \times 12}{r_1}\right)\left(1 + \frac{r_1}{12}\right)^K + 12 \times \frac{M_1}{r_1}$$

$$M_2 = \frac{P_1 \times r_2}{12 \times \left(1 - \left(1 + \frac{r_2}{12}\right)^{-(T-K)}\right)}$$

(if (r2<r1), then (M2<M1)), meaning that, without changing T, the original term of the loan, if we reduce the interest rate, the resulting installment payment will decrease.

As explained in this Section (above), this product is useful for people with little or no credit history, or poor credit history, so that they can build their credits back, and later reduce their rates, by moving from high risk category to low risk category, when performing as a reliable customer for a specific predetermined period of time, but without any new application for loan or any new approval, as long as the predetermined conditions (mostly related to timely payments) are met. This gives a chance to a person with no or bad credit history to rebuild or build a good credit, and get some benefit immediately, based on a loan approved and originated, e.g., years ago, which is a contract or agreement capturing those provisions at the beginning, e.g. many years ago.

Moving from high risk category to low risk category happens when, e.g., the person has had a good payment pattern, with no delinquencies, or the person has an improved credit profile, or the person now has a longer employment history (that may have to be verified).

The whole concept above may be non-contractual, as well. In other words, it can be an option for the lender to lower the rate, or prescriptive, according to a set of criteria, e.g. FICO score above 660, or no more than 2 delinquencies, or no delinquencies at all with the lender or any other lenders.

Section 3: Relationship-Based Score

Figure 18A:
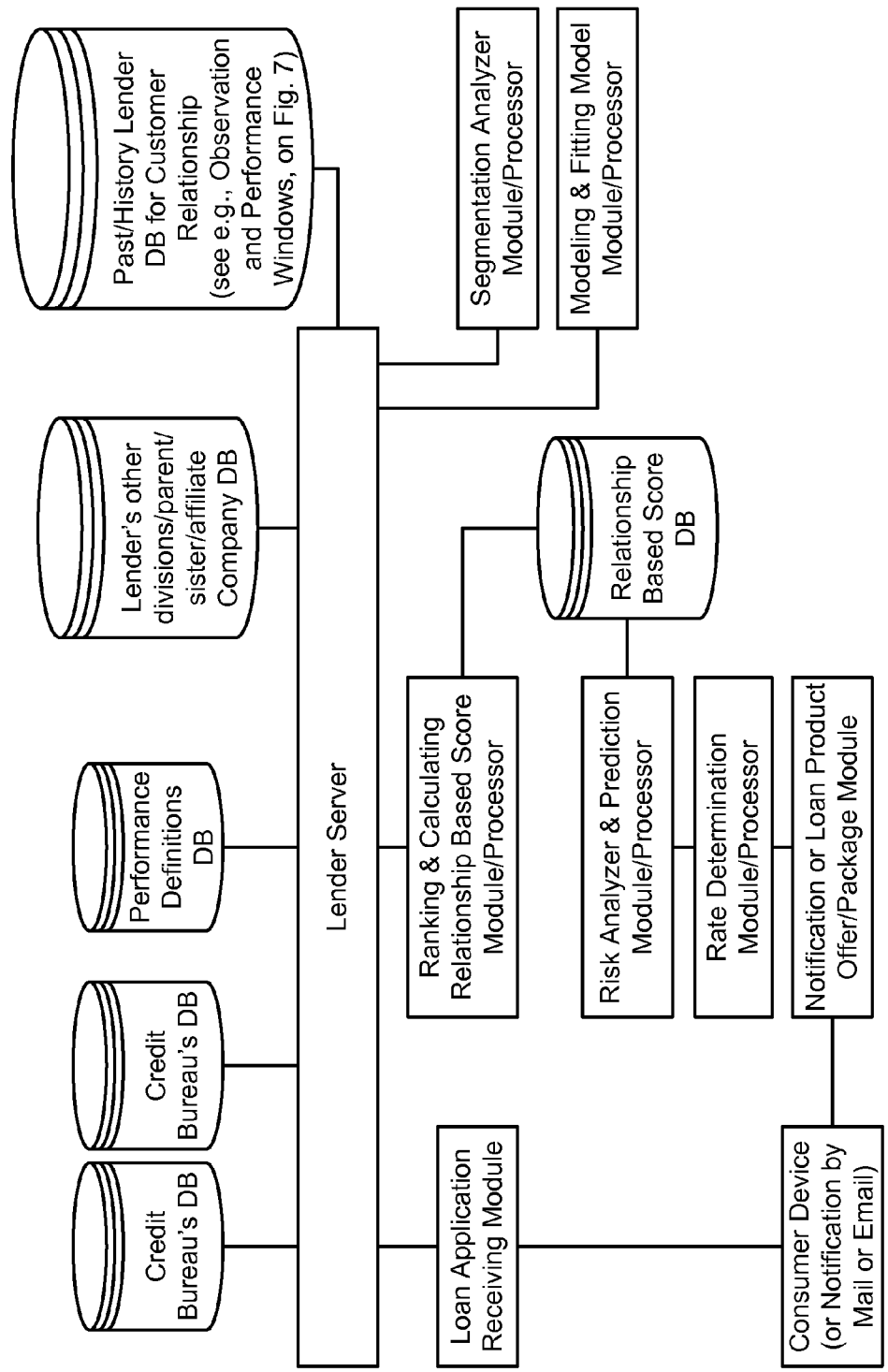
FIG. 18a shows an example of a system for Section 3.
Figure 18B:
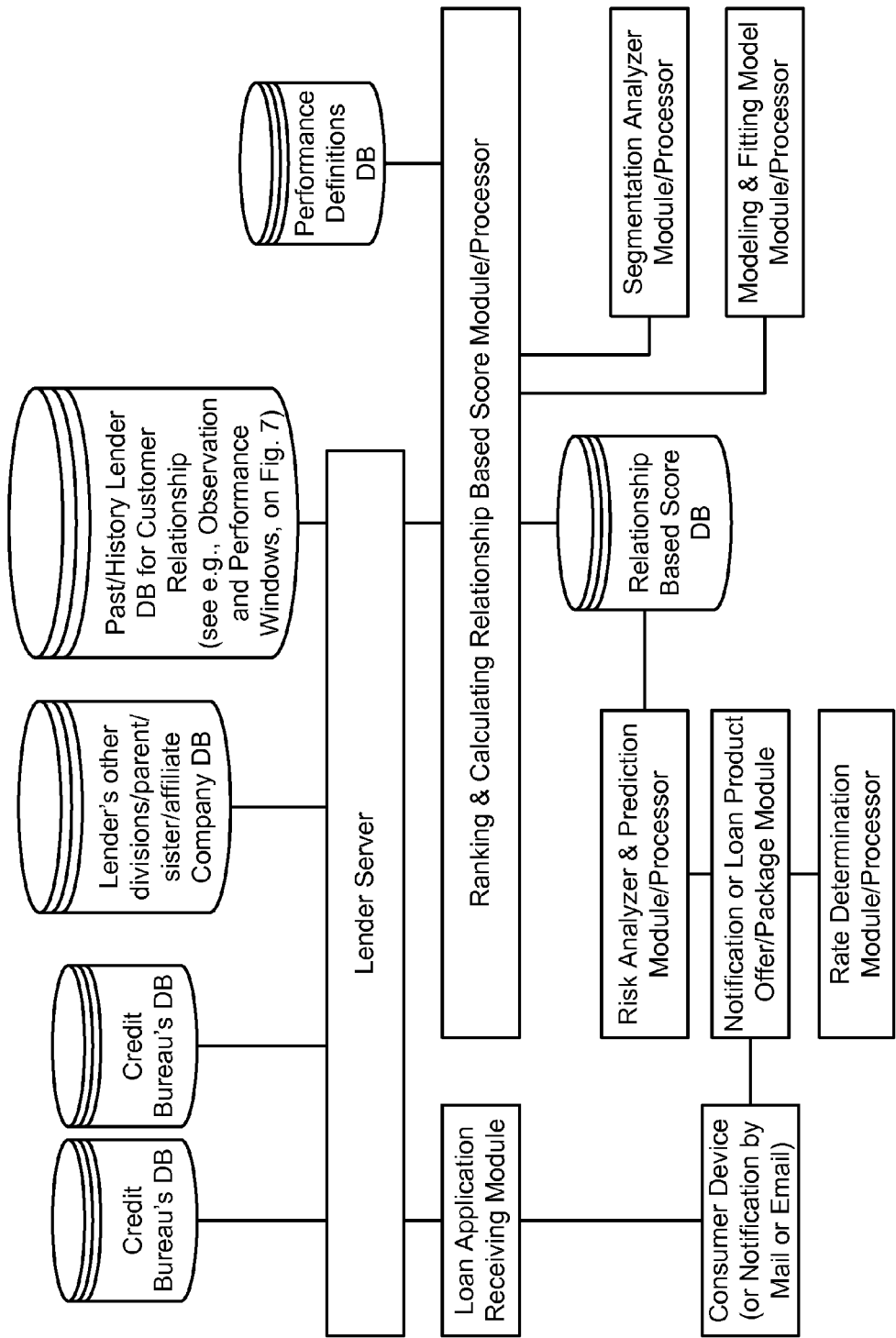

In this section, we teach "A Credit Score Based on Borrower's Relationship with the Lender (Relationship-Based Score)", with an example shown in FIG. 18 (both FIGS. 18*a* and 18*b*). This can be for Consumer Lending, or this can be extended to small-business and commercial lending, as well.

All credit scores rank order borrowers in terms of the borrowers' probability of default in the future. In other words, a higher score usually indicates a lower probability of default over a specific period of time (next 12 months, for example). Typical credit scores (pooled based on all or numerous lenders' data or custom based on a specific lender's data) rely exclusively on credit attributes pertaining to such variables as (1) length of credit history (time on file), (2) recent delinquencies, (3) past derogatory incidents, (4) bankruptcy filings, (5) number and frequency of recent credit inquiries, (6) the number of active, open, or historical trade-lines, (7) utilization of open revolving credit lines, and other such credit attributes.

Such scores have gained popularity in the 90s and until today. Smaller lenders tend to rely on pooled credit scores, and larger lenders (since they have the appropriate expertise, access to data, and the right scale) tend to develop custom scores and rely on both pooled and custom scores for their business. Most scores tend to be specific to a lending product; for example, a custom score developed for a specific large lender can be for the lender's credit card application and origination program. However, there are some scores that focus on the credit worthiness of the borrower across all lending products. The best known credit score which happens to be a pooled score and generic to all lending products is FICO, developed by FICO (www.fico.com).

Credit scores (pooled or custom) have numerous applications in the lending industry, such as, but not limited to, automated (system) and manual (by a human) decisions for credit applications and product originations, pre-selection (pre-approval, invitation-to-apply, and pre-screen), account management for revolving credit product, collections and recovery in case of delinquency and default, product pricing (in the form of rates and fees), and whether or not a specific treatment of an account or a customer should be reviewed by a human. Credit scores in the area of account management for both installment and revolving credit products are referred to as behavior scores.

All pooled credit scores (product specific or borrower centric) exclusively use credit attributes as independent variables for model development. The custom scores, however, predominantly use credit attributes as variables to the model. A few variables and attributes focusing on the customers, and their relationship with the lender, may be used as segmentation or independent variables in the custom score model. (Please note some lending and banking literature refers to independent or segmentation variables as characteristics.) Currently, no credit score uses customer and relationship attributes exclusively or predominantly as input variables. Such customer and relationship attributes measure (A) the depth (volume and balance of business), (B) breadth (how many products), (C) length (how long), and (D) the quality (e.g., activity or recent delinquencies) of relationship the lender or its affiliate financial companies have with the customer or (E) other relevant customer data (for example, marketing segments) to assess the customer's probability of default and payment performance in the future.

The fragmented nature of lending industry in the United States has resulted in the lack of use and popularity of such customer and relationship centric scores. Most customers and lenders tend to focus on a specific lending product that maximizes the customer's and lender's gains and on the value for that specific lending product rather than on a holistic view of the entire relationship. As the fixed costs of lending increase (for regulatory and other reasons) and profit margins shrink, due to the ensuing consolidation, the few remaining players will have to differentiate themselves by offering innovative products and focusing on relationship banking to add value to their customers. That is where a relationship-based credit score will be of tremendous value both the lender and the borrower.

Another reason why relationship-based scores have not become popular and are not in use is that all lenders upon taking adverse action against a customer or borrower must issue rigorous and analytically driven reasons as to why the action took place. Examples for adverse actions are a decline or rejection of a credit application or reduction in credit limit or suspension of a revolving line of credit. If an adverse action is taken based on a low relationship score and the low score is due to the customer's low or sparse level of relationship with the lender, the lender would be hard-pressed to present a plausible reason to the customer for such rejection, and furthermore, such rejection is not viable from a sound business perspective. It would be unreasonable and illogical for the lender not to want to do business with a potential customer or borrower, just because the customer has no or low business relationship with the lender. In the body of this invention and its various embodiments, we present ways of applying the score while addressing and circumventing this fundamental drawback.

The main issue with excluding customer and relationship attributes from a credit score that ranks future probability of defaults and assesses payment behavior of the customer is that a host of variables are excluded as input variables to the modeling process. Whereas the credit attribute variables (e.g. see categories (1) through (7) listed above) exhibit statistical correlation, the business relationship variables in categories (A) through (D) have little or no correlation to the credit attributes. When mathematical models are developed using uncorrelated or less correlated variables, and the resulting score has higher power of differentiation between future Goods and Bads, borrowers and accounts likely to perform well and poorly, respectively. Furthermore, the resulting score, even though it predicts the same dependent variable (probability of default in this case), since it spans a different uncorrelated set of independent variables, adds to the lender's power of predicting the dependent variable and opens up opportunities that existing scores and models have currently no means of accessing and leveraging.

This invention is related to the development and application of credit (probability of default) scores that are based on a customer's relationship and other non-credit attributes and variables. Score development process is well documented and described in the lending industry literature and publications. However, as mentioned earlier, such credit scores focus exclusively or predominantly on credit attributes as independent and segmentation variables.

In one embodiment, unlike some of credit scores based on credit data that are developed for a specific lending product, the Relationship-Based Score is for all the lending products and quantifies the customer's probability of default on any or all lending products.

Figure 6:
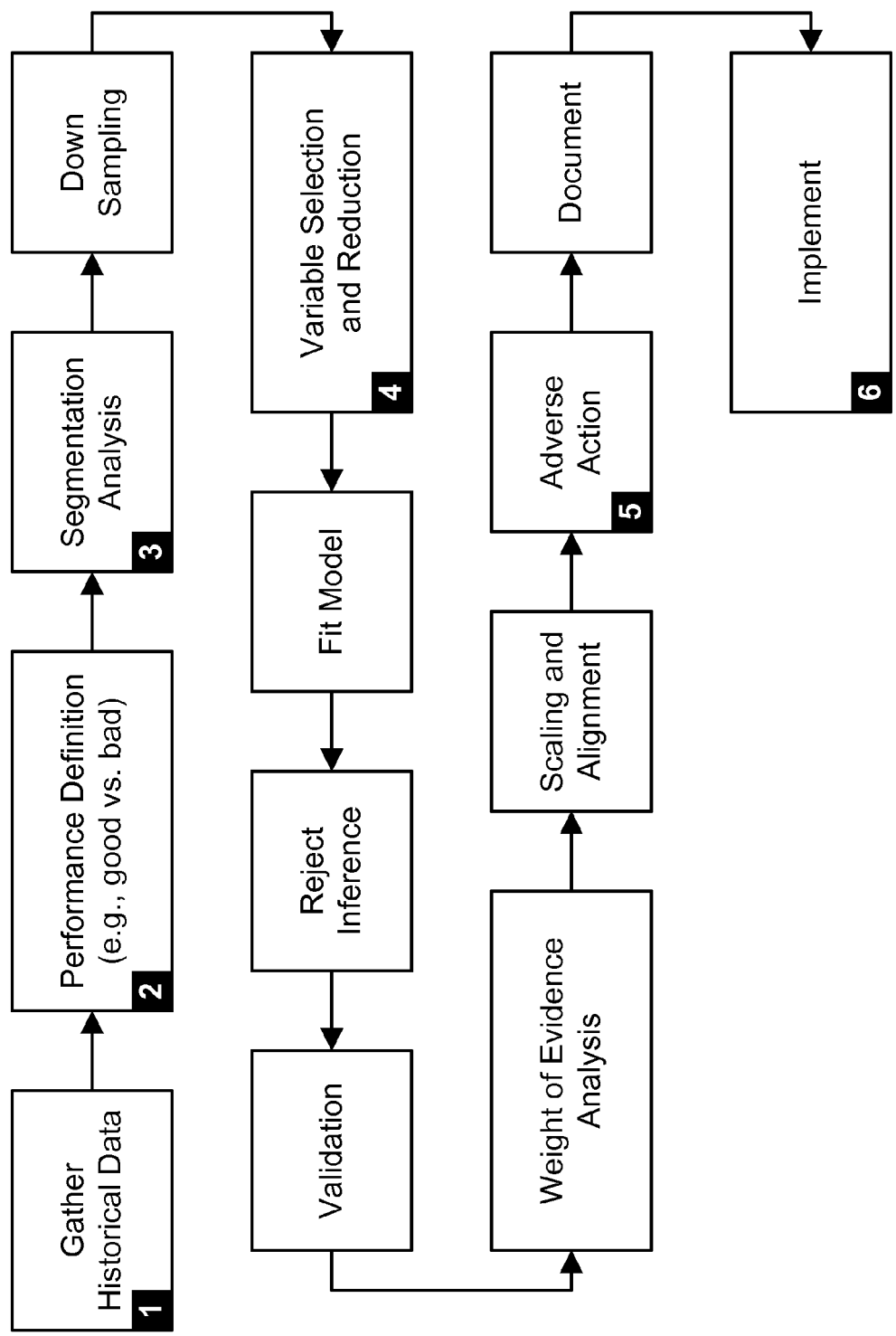
FIG. 6 illustrates the typical development process that a lender may deploy to develop a Relationship-Based Credit Score.

FIG. 6 illustrates the typical development process that a lender may deploy to develop a Relationship-Based Credit Score. This specific invention focuses on new ways of performing Steps 1 through 6 in FIG. 6, as they pertain to deployment of relationship and customer attributes in the model. The remaining steps that are not numbered need not change from the standard credit score development processes using credit attributes as input variables. The reason being that these steps are either purely analytical (i.e., involve quantitative analysis with varying levels of complexity), such as down-sampling, reject inference, model fitting, weight of evidence analysis and scaling and alignment, or are very generic in nature, such as, validation and documentation (as detailed in FIG. 6). In either case, those steps (that are not numbered) do not materially vary from prior art to the current invention.

The goal of the invention and all its embodiments is to develop a score and implement it successfully using relationship and other non-credit variables and attributes according to the process laid out in FIG. 6. Before we begin with the summary description of the invention, a few terms common in industry for credit score development need to be reviewed here, namely the Observation and Performance Windows. The Observation Window represents the point(s) in time at which the customer is observed for predicting his or her future behavior. The Observation Window is when the customer or applicant is observed for derivation of the credit score or when the actual statistical prediction is generated. In other words, we are observing a specific point in the past and determining, based upon all the information available at that point in time, what the key factors are to predict the customer's future payment performance.

Depending on the availability or sparsity of lender's data, the Observation Window may be 6 to 12 months in length. Other embodiments may have Observation Windows that are shorter or longer depending on the conditions mentioned earlier. To increase the predictive power of the score and reduce correlated inputs, in some embodiments, the developers may choose every account a customer has held to be observed only once. However, other accounts the customer has held in the observation window may get captured in the input data for the customer. The Performance Window is the period that determines the performance the model is designed to predict and is used to determine which accounts are good versus bad credit risks. The length of the Performance Window depends on and is typically correlated with the duration of the lending product, and also if the account is current or past-due.

For example, the longer the duration of the product, the longer is the performance window. An installment car loan may require a 12 to 18 month performance window, whereas a credit card may require 24 to 36 months. Furthermore, customers that are current (not past due) are likely to be scored differently from those that are past due at the point of scoring (see segmentation). The main difference in the data needs is that the current accounts will need a wider Performance Window (of one to three years, for example) and past due accounts establish their Good vs. Bad behavior in a narrower time window (say, e.g. 6 months). Please see FIG. 7b for more explanation, as an example.

Finally, the lender may decide in some embodiments to use consistent Observation and Performance Windows, regardless of which product is being considered, and focus exclusively on the customer's performance in the Performance Window. Please see FIG. 7a for more explanation (unstaggered Performance Window), as an example. Whereas in other embodiments, the lender may decide to use Observation and Performance Windows of different durations for different products considered. Please see FIG. 7b for more explanation (staggered Performance Window), as an example.

Two kinds of combinations of Observation and Performance Windows are practiced, and both can be used in different embodiments of this invention. Diagram 2 illustrates the 2 types: staggered and un-staggered Performance Window. Even though both models of observation and performance windows are practiced in industry and can be used for the various embodiments of the score in this invention, the staggered version is analytically more consistent, since it monitors the performance of all observations equally long.

Step 1. Gather Historical Data: (as Detailed in FIG. 6)

Gathering historical data (Box 1) requires collection of (A) customer's past performance with the lender and the lender's affiliates within a Performance Window, as defined earlier, and (B) customer's past relationship and non-credit attributes, as Observed within the Observation Window, as described earlier.

Step 2. Performance Definitions:

Performance definition (Box 2) warrants careful attention. Definitions of Good, Bad, and Indeterminate must be established for each product that the lender wants included in the scope of the score. Good in general means a customer makes regular and agreed upon payments. Bad, on the other hand, means the customer does not make the payments on borrowed lending products as per agreement and expectation, and furthermore has resulted in a charge-off, or is very likely to lead to a charge-off scenario, where the lender has already incurred or is highly likely to incur credit losses on the principal related to the lending product. If in some embodiments, the relationship score is developed for a specific lending product or a specific subset of the lender's products, the definition of Good, Bad, and Indeterminate has to be established for those products only. However, if for other embodiments, the relationship score is for the customer as a potential borrower of all lending products the lender offers and encompasses the whole relationship, all product histories the customer has had with the lender in a given Observation Window must be included. In other embodiments, the lender may decide to use one and the same definition for Good, Bad, and Indeterminate for all lending products, and in others each product may retain its own product-specific definition. In the following section, we offer some specific recommendations for those definitions as they related to one of our embodiments.

Finally, the customer may have numerous products captured in the Observation Window, whose performance is monitored in the Performance Windows. Customer may be Bad in all, some or only one of the products monitored in the Performance Window. Since the object of score is prediction of default, it makes more sense in the recommended embodiment to view a default on any single lending product as Bad. However, in other embodiments, the developers of the score may choose to require defaults on all or a majority of the lending products in order to define the customer as Bad.

Step 3. Segmentation Analysis:

The premise of segmentation (Box 3) is that the independent variables or attributes have a different relationship with credit risk or probability of default (dependent variable) for different segments or sub-populations. By identifying the appropriate sub-populations, the characteristics that are most predictive in isolating risk are optimized for that group. In other words, fundamentally different customer segments perform fundamentally differently and will have different variables best defining their performance characteristics.

The segmentation of the population both for developing the model and also actual scoring depends on the business model of the lender. A few general considerations:

- For some embodiments of segmentation, the customers that at the time of being scored (Observation Window) are not past due should be separated from those are past due, since the performance patterns and characteristics of these populations are materially and fundamentally different.
- In some embodiments, to increase the power of prediction of the score requires excluding certain populations from the score (in industry referred to as assigning an exclusion score to the customer). We provide 2 examples of such exclusion segments:
  1. Customers who are severely delinquent (2, 3 or more payments past due at the point of scoring or for the development phase within the Observation Window) may be excluded in most embodiments, since lenders typically do not lend more to someone who is already 2 or 3 payments past due on another lending product.
  2. In some embodiments, where relationship is the primary and only focus of the score (versus in other embodiments where other customer attributes are also included as independent variables), prospects or those who are new to the lender and all its affiliates (in other words, neither the lender nor its affiliates have any past relationship), with the customer, no meaningful Relationship-Based Score can be assigned to the customer.
- In some embodiments, another segment to be carved out and separately modeled, to add strength to the model, is those that are new to the lender, but have existing relationships with the lender's affiliates. For such a segment, independent variables that relate to the overall relationship will be dominant, whereas the relationship variables related to the bank are non-existent.
- If prospects (potential customers who have no existing relationship with the lender or any of its affiliates) are not excluded, as per earlier bullet, since other non-relationship attributes and variables are being considered, in some embodiments, such prospects may be placed in their own segment, but only non-relationship variables, such as demographics and employment data, can be used as independent variables to the model.

The remainder of the population that is neither excluded nor segmented, as per earlier recommendations, is segmented according to the business model that best describes the lender and its affiliates. If in certain embodiments, the score is not specific to a product and is related to the customers and their overall business relationship with the lender and its affiliates, product segmentation is not recommended. If the lender knows of certain demographics or sub-populations that have a materially different performance, they ought to be placed in a different model for segmentation. As an example, let's say the lender knows those people who have a life insurance product with the lender's affiliate, ceteris paribus, perform much better than everyone else. Then, this population should be placed in their own segment.

There are a number of analytical or statistical methods to segment the population prior to developing the individual models for each segment that in some embodiments may be used. A potential list is provided here:

1. Clustering
2. Logistic regression
3. Boosting (meta learning)
4. Decision trees (for example, CHAID)

Methods 2 and 3 are capable of doing the all-else-equal analysis (ceteris paribus), whereas 1 and 4 typically are not and need to be used with more expertise and in-depth knowledge of the business.

Step 4. Variable Selection and Reduction:

This step follows the standard practices known in industry and is typically executed in conjunction with the following step of fitting the model. Any linear or nonlinear regression technique or other data mining techniques for a binary outcome, such as logistic regression, can be used to fit a model. Either step-wise or by trial and error, a set of suitable independent variables is used that fits the performance behavior of the specific segment best, and gives it the highest predictive power. In this case, however, instead of a standard set of credit variables or attributes, a set of relationship and other non-credit variables or attributes is used. Regardless of embodiment, the goal of the exercise is to obtain the best (most predictive) score that can be developed for each segment.

Step 5. Adverse Action:

Due to legal and regulatory constraints, when a score is used for declining a credit application or reducing the credit limit of or suspending a revolving credit product, adverse action reasons must be used that give the customer understandable reasons as to why the credit application is denied. For Credit-based scores, these reasons are almost exclusively due to the poor payment and credit behavior of the borrower. Since a Relationship-Based Score is mostly based on a relationship that a customer has with the lender, and less so based on their past payment performance, most lenders would not want to decline customers because of the low Relationship-Based Score. The notable exception to this would be those that have had performance issues with the lender or its affiliates. However, as explained earlier, the purpose of this score is to predict credit default as a function of non-credit variables. Therefore, no independent variables or attributes in regards to having been being bad with the lender are included in the models and can be used to provide adverse action reasons. Such variables are used by other pooled and custom credit scores and may be dropped as independent variables from a relationship-based score development.

As far as performance-related independent variables are concerned, in some embodiments, those of lender's affiliates may be included in the analysis. To the extent the influence of the performance-related piece of the score is material and the score is lower than a given threshold, adverse action reason can be given to that effect. The reason would state, that customer has had performance issues with the lender's affiliates in the past, and that is sufficient reason for declining the credit application. In some embodiments, if the customer falls into one of the exclusion scores mentioned in Step 3 (delinquent or severely delinquent), the current performance of the customer with the lender is poor and adverse action reasons can reflect that.

Step 6. Implementation—Applications of the Relationship-Based Score:

The Relationship-Based Score can be applied in a number of credit decisions, credit policy, collection, and lending product pricing matters. In selected embodiments, lenders may choose to use one or more of the following potential applications areas:

1. Systematic approval of applicants who ordinarily (w/o the Relationship-Based Score) would be declined, solely based on the credit-based scores, if their Relationship-Based Score exceeds a certain threshold.

2. Systematic decision of routing to manual under-writing of those borderline cases, where due to their positive relationship, the customers have with the lender manifested in the form of a high Relationship-Based Score, an approval may be warranted, but needs to be manually examined by a human.

3. Use of the score by human underwriters, in cases routed to them (see item 2 above) based on set guidelines of exceeding a certain threshold, whereby looking at the holistic picture of the credit, debt service capacity, and relationship of the customer with the lender, a decision can more effectively be rendered.

4. Account management for revolving credit products. The following examples of account management may be used in selected embodiments:

a. The open credit lines are constantly monitored by the lenders and frozen for certain risky customers, should a customer exceed a certain threshold in their Relationship-Based Score, the freeze in line can be deferred to a later time.

b. Or should the score be below a certain threshold the freeze can be accelerated.

c. High Relationship-Based Scores may be used to grant customers higher over-limit balances than warranted solely based on credit-based scores.

d. Suspension of the account (soft—removed once cured—or hard—not ever lifted—freezes) can be deferred for High Relationship-Based Scores.

5. Collections activity: a high score can preclude the customer from aggressive, early, or pre-emptive collections actions, and a low score can accelerate those collection actions.

6. Pricing: a high Relationship-Based Score can lead to more favorable pricing, since the credit loss expectations for customers with better Relationship-Based Score, ceteris paribus, are lower, more favorable pricing or lower rates are warranted and justifiable.

7. Preferential treatment: customers with high Relationship-Based Scores can be placed in special buckets, to be treated more favorably than other customers. Waiting (shorter) periods on phone lines, early replies on emails to customer service, and better rewards for credit cards are a few examples of such preferential treatments.

Most, if not all, of these applications require the lender to conduct business (credit and financial) analyses that are customary to the lending business in order to establish appropriate thresholds for preferential treatments. In some embodiments, the lender may decide to divide the population to quantiles (ordered data into essentially equal-sized data subsets) and give the above mentioned preferential treatments to certain top quantiles. Establishing which quantiles get the preferential treatments may also involve those credit and financial business analyses.

More Details about Relationship-Based Score

Now, we describe more embodiments about the Relationship-Based Score: (Please refer to FIG. 19 and FIG. 18, for an example/some details.)

Step 1. Gather Historical Data:

Gathering historical data relates to all relevant relationship and other non-credit (customer) variables and attributes in the appropriate Observation Window. Such customer and relationship attributes measure (A) the depth (volume and balance of business), (B) breadth (how many products), (C) length (how long), and (D) the quality (e.g., activity or recent delinquencies) and profitability of the relationship the lender or its affiliate financial companies have with the customer, or (E) other relevant customer data (for example, marketing segments). Such attributes may be used in various embodiments as segmentation or independent model variables.

An important note is due here on the use of credit history of the customer specifically with the lender. In some embodiments, the lender may decide to include such historical credit performance variables as to be used both within the scoring models and for segmentation. However, there are 3 caveats that need to be carefully considered. First, the score is meant as a credit score relying on no-credit attributes and characteristics. Including lender-specific credit variables may add to the strength of the model, but is contrary to the purpose and spirit of the score. Second, all lender-specific credit attributes are typically gathered by custom and pooled credit scores that rely on credit attributes as independent variables. Finally, related to the previous point, recall that the separation of credit attributes from this score gives it low correlation with other credit scores and adds to its strength. Adding back credit attributes as independent variables, even if they relate to the lender's relationship with the customer, diminishes this strength. Having stated all that, in some embodiments, the lenders may decide to include some lender specific attributes related to lending products, as independent variables. We list a sample subset under category F in the table below.

TABLE 7

A sample list of such variables along with their respective category is provided. (Please see the definitions for categories given above, for A-E and F.)

| Attribute or Variable | Likely Impact on Score (higher value means:) | Category |
|---|---|---|
| 1. Number of active products with the lender | Better | B |
| 2. Number of active products with each of the lender's affiliates | Better | B |
| 3. Cumulative number of past and existing products with the lender | Better | B |
| 4. Cumulative number of past and existing products with each of the lender's affiliates | Better | B |
| 5. Length of relationship with the lender (in months) | Better | C |
| 6. Length of relationship with the lender's affiliates (in months) | Better | C |
| 7. Average balance in deposit accounts (checking, saving, and certificates of deposit) | Better | A |
| 8. Ratio of credit balance to deposit balance (in other words, how much has the customer borrowed from the lender versus how much has the customer deposited with the lender) | Worse | A |
| 9. Utilization of revolving credit products the lender offers to the customer (for each product, product category, or in total) | Worse or Unknown | A |
| 10. Recent performance with lender's affiliates, e.g., non-payment on a property and casualty insurance policy or non-payment on a life insurance annuity | Worse | D |
| 11. Premiums paid for various services rendered by the lender | Better | A |
| 12. Attributes quantifying the relationship with the lender's affiliates, such as: | | |
| 12.1 Balance of assets under management with the lender's asset management affiliate for retirement and non-retirement accounts, | Better | A |
| 12.2 Balance of securities invested in brokerage accounts (retirement or otherwise) with the brokerage firms affiliated with the lender | Better | A |
| 12.3 Premiums paid for various services, | Better | A/D |
| 12.4 Liability coverage for various property and accident insurance products with lender's insurance affiliates. | Better | A |
| 12.5 Dividends, rewards, or other payments received by the customer from the lender or its affiliates | Better | A/D |
| 13. Specific customer groupings and segmentation used by the lender pertaining to the lender's business typically used by marketing groups. | Unknown | E |
| 14. Channel preference of the customer, such as, internet, phone, or branch office | Unknown | E |
| 15. Employment data: type of employer, type of employment, months with the employer, monthly income | Unknown | E |
| 16. Residential status: own, rent, live with parents, etc. | "Own" is usually better | E |
| 17. Family status (married, single, divorced, and widowed) | Unknown | E |
| 18. Gender | Unknown | E |
| 19. Geographical location: Zip code, state, or region of residence | Unknown | E |
| 20. Other demographic information that may be relevant to the bank's relationship with the customer, such as age group, or other legally admissible variables | Unknown | E |
| 21. N or more days past due delinquent in the past M months on any lender's product (N can be any number of days but depending on product 30, 60, or 90 are industry practice) - (M can be any number of months, but 6, 12, and 24 are typically practiced) | Worse | F |
| 22. Number of credit inquiries with the lender in the past N months (N can be 6, 12, and 24) | Worse | F |
| 23. Total aggregate lender exposure ($) | Unknown | F |
| 24. Total aggregate lender unsecured exposure ($) | Unknown | F |

Gathering historical data also relates to performance data of previous lending products the customer has with the lender in the appropriate Performance Window. Such performance data gathering relates to the definition of performance described next.

Step 2. Performance Definitions:

Industry practices for definition of Good, Bad, and Indeterminate performance apply and are typically chosen by the lenders, based on their past experience with the product. In this case, since the score is for the customer as a current or potential future borrower, historical performance of all past products that the customer has had with the lender in the Observation Window may be used in some embodiments. A sample table is provided for various products that may be used in some embodiments, as Table 8 below.

TABLE 8

A sample table for various products that may be used.
Performance Definition for a Given Lending Product

| Current Customer Segment | Current Accounts | Past Due Accounts |
|---|---|---|
| Performance Window | 30 months or less | 6 months or less |
| Good | Never 30 days or more past due | |
| Bad | Bankrupt, Charged-off, or ever 90 days past due | |
| Indeterminate | Not Good or Bad | |

Please note that for the "Bad" category, above, the number of days past due for the definition of bad depends on the nature and duration of the product (for example, for revolving credit or installment loan products 90 or 60 days, respectively) and also how many days past due the lender charges off the product (credit card 180 and auto 120, for example).

As discussed under segmentation (Step 3), customers that are current (not past due) are likely to be scored differently from those that are past due at the point of scoring. The main difference in the data needs is that the current accounts will need a wider performance window (of many years), and past due accounts establish their Good vs. Bad behavior in a narrower time window. The Good, Bad, and Indeterminate classification illustrated in this table (above), Table 8, is only a sample, serving a selected detailed embodiment of the invention. The actual classification depends on the lender, the lending product, and various other business considerations. In one embodiment, all products that the lenders offer and the relationships customers have with the lender must be included in the historical data, in order to develop the Relationship-Based Credit Score based on the full picture of the relationship.

Please note that FIGS. 7a and 7b show observation window and performance window, for all observations and various t's, respectively, as mentioned in the descriptions above, for various situations. For FIG. 7b, the performance window is variable/moving, with different start and finish, or various periods. However, for FIG. 7a, the performance window is the same for all observations. FIG. 6 illustrates the typical development process that a lender may deploy to develop a Relationship-Based Credit Score, as described in details above.

As shown in FIG. 18, lender uses various credit bureaus and data from other divisions/sister companies/affiliates, as well as its own database/history, to evaluate the loan application received from the consumer, using segmentation and ranking, based on performance definitions, to model and fit the model, to come up with a relationship-based score. The relationship-based score is used for risk analysis and rate determination (pricing), to offer/notify the corresponding loan product to the consumer, via her device/phone.

Figure 19:
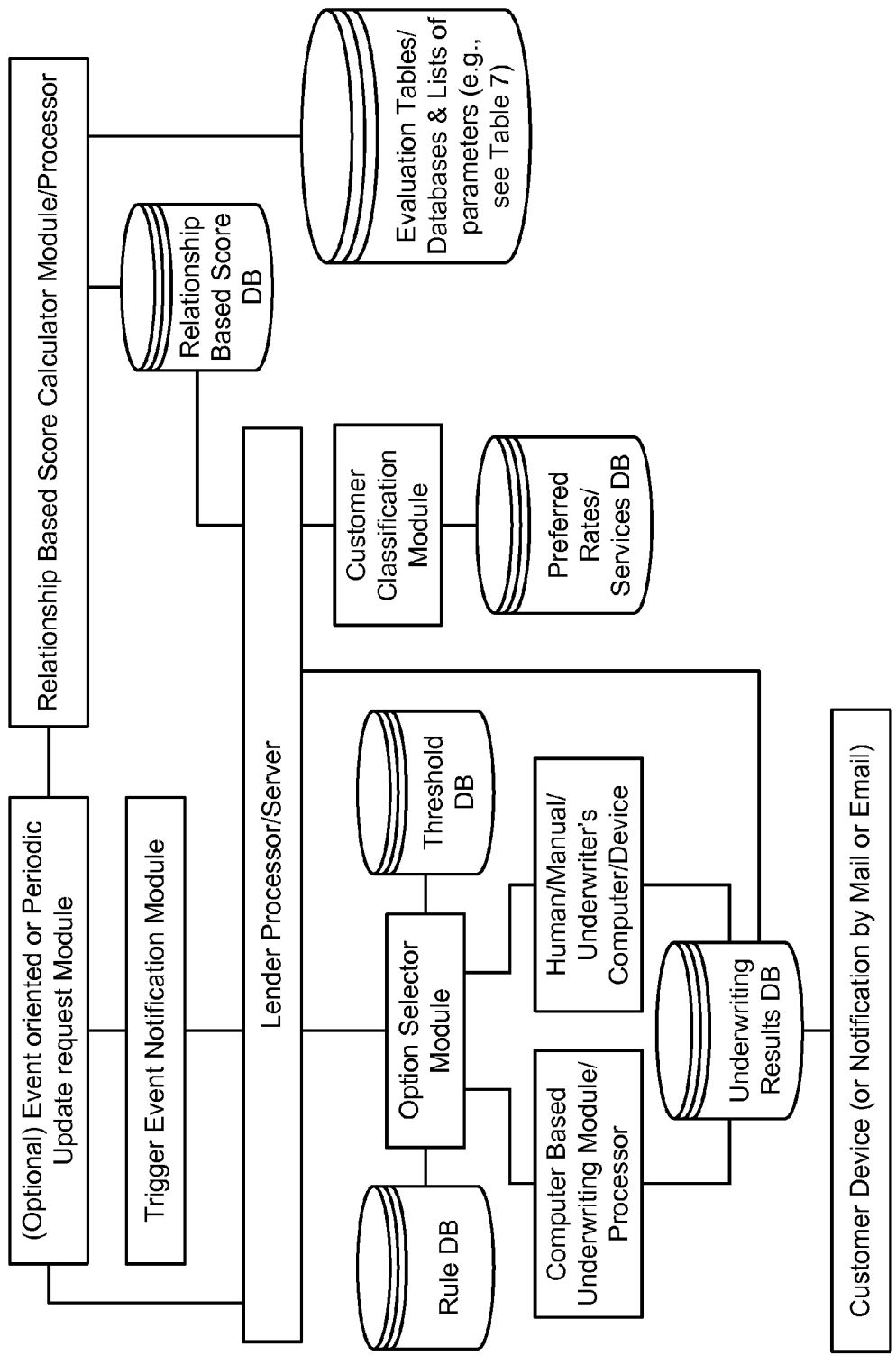
FIG. 19 shows an example of a system for Section 3.

As shown in FIG. 19, the evaluation tables are used (with other parameters) (e.g. see Table 7), to calculate relationship based score for a lender. The calculation or recalculation is triggered by the lender, customer, event, time period, periodically, or some other threshold/index/parameter value/fluctuations in the market. The lender generally uses the computer to evaluate and rate/score the applications. However, for marginal cases, or grey areas, the lender uses manual method, i.e. human underwriters, to evaluate those cases, based on the rules and thresholds. The result is sent to the consumer, and the consumer is classified accordingly, e.g. as a preferred customer, for a better rates and lower fees for loans and services, from the lender. (Note that the human underwriters also feed the results in the same system for continuation of the process, as described above.)

Contractual or Pre-Determined Rates Based on History & Relationship Score

Now, we describe a financial product where the interest rates (or the changes in rates, or behavior of the rates, or the range of the rates, or the formula for the rates, or reduction in the rates) are predetermined, e.g. as a contract between the consumer and e.g. a bank, at the beginning, so that the consumer can count on it, as what the result would be in the future.

In general, conventionally, the credit cards have variable rates, but they are not the same as the product we are describing here. In our case, we offer an installment loan, e.g. at a rate of Y percent. However, the rate goes down, e.g. to Z percent, if one of the following event happens, as an example (or stays low as long as some predetermined conditions are satisfied, or e.g., will go up if some other conditions are satisfied, for a period of time, or forever, or as long as some conditions are satisfied):

- The consumer paid all the payments for his/her loan on time for the past 12 or 24 months.
- The consumer was a good customer to the bank, with high score as a customer, and a long relationship with different divisions or affiliates of the bank.
- The consumer got a promotion in his/her job, with 35 percent higher salary now.
- The consumer finished his/her loan payments for his/her car, which means that he/she has more disposable income or higher debt service capacity, now, compared to the time that he/she applied and got the residential (house) loan, originally.

The logic behind this is that, e.g. if somebody is applying for a loan, originally, there is a risk associated with that consumer, with respect to that loan and the bank/lender. The higher the risk of default and non-payment by the consumer, the higher the rate should be, to justify the risk for the lender or bank. However, it is shown that, statistically, if e.g. somebody pays her mortgage and other contractual payments on-time for a few years, the probability of default decreases materially. Thus, the rate can be adjusted based on that condition, contractually, at the beginning, without any refinancing fees or refinancing or new contract or new application or any new negotiation or any new applicable rate at the time of this decision based on the market rates or indices.

So, it would be less risk for the bank, knowing that the consumer has been a good and reliable customer. It also gives more peace of mind and confidence to the consumers, with less chance of defaults and less uncertainty for future, which is better for consumer. So, the loan activities increase, with healthier results, and less defaults, which is costly for all parties involved, directly or indirectly, including health of economy in general, and construction industry in specific. So, it will be a win-win situation for all, and any bank offering such a product will be very much appreciated and noticed by consumers, which is good for the bank's business, growth, and profitability. (Please note that this product does not exist for e.g. home loans, at present time.)

In general, having loyal customers (and long-term or multiple relationship, with consistent results for the bank) is very profitable and reassuring, making the bank more successful, in general. So, this product makes the benefits of some of that success back to the consumer, for a win-win situation.

Of course, the reverse can also be added to the original agreement, e.g. when the consumer has a lower salary 5 years from now, as an option, as another product, so that the lender can or may adjust the rates based on the new data 5 years from now, per original agreement, based on the formula, agreement, table, curve, or schedule, agreed upon, beforehand. This last option is generally more attractive to the lender.

Other Embodiments Based on Relationship Score

Here, we describe other embodiments based on the Relationship Score. It is a loan product approval method by a lender, which comprises the following steps, as an example: (e.g. see FIG. 18*b*)

- a lender computing device receives a loan application, regarding a customer, from a lender application receiving device;
- the lender computing device receives credit information regarding the customer from one or more databases of various credit bureaus;
- a ranking and calculating device assigns a first weight to the credit information;
- the ranking and calculating device receives performance definitions from a performance definitions database;
- the lender computing device receives past relationship information as a client, regarding the customer, from one or more of the lender's own or affiliate companies' databases;
- a segmentation analyzer assigns which segment the customer should be assigned to (e.g. assesses the customer's probability of default and payment performance in the future);
- a modeling processor fits variables within a given model, to describe the customer's financial situation and dependability;
- the ranking and calculating device assigns a second weight to the past relationship information, based on the performance definitions;
- the ranking and calculating device receives data from the segmentation analyzer and the modeling processor;
- the ranking and calculating device combines the data received from the segmentation analyzer and the modeling processor, with the first weight, the credit information, the second weight (and in some embodiments, more important weight), and the past relationship information, to assign a relationship-based score to the customer (e.g. taking a weighted average);
- based on credit information scores and relying on the relationship-based score for the customer, a loan product package processing device either approves the loan application, regarding the customer, or rejects the loan application;
- in case of approving the loan application, a rate determination device assigns a current interest rate to the loan application; and
- the loan product package processing device notifies the customer about the approval or rejection of the loan application.

Here are more embodiments:

The loan application is related to one or more of the following lending products: automobile, motorcycle, bike, RV (recreational vehicle), marine, boat, airplane, equipment, business, factory, unsecured installment loans, credit card, mortgage, home equity installment, or home equity line of credit, as shown in FIG. 5.

The loan product package processing device considers one or more of the following: income, own or rent, housing expenditure, collateral type, collateral value, requested amount, down payment, estimated closing cost, or other relevant information about the customer, as shown in FIG. 5.

The loan product approval method further comprises: down-sampling data, variable selecting and reducing, rejecting inference, validating data, analyzing weight of evidence, scaling and aligning data, and applying adverse action, as described in FIG. 6.

In one embodiment, the performance window for all observations is the same. In one embodiment, the performance windows are staggered, as shown in FIGS. 7*a* and 7*b*.

In one embodiment, one or more future interest rates are assigned, for the loan agreement, which may have one or more corresponding conditions, to kick in or trigger the new rate(s), which can be done using one or more of the following methods (as shown in FIG. 19):

periodically.
based on a predetermined or trigger event.
based on a predetermined market index.
based on a random variable. or
based on random time intervals.

In one embodiment, the customer is classified, in terms of a preferred interest rate, to become eligible for a specific tier of the customer classification and corresponding interest rate(s) or ranges. Basically, the more dependable the customer, the less risk for the bank, and the bank can afford to offer a lower interest rate for a loan taken, higher interest rates for the customer's saving and checking accounts, discounts, gifts, awards, bonuses, extra services, waived fees, or lower fees or bank charges (as shown in FIG. 19).

In one embodiment, this process is adjusted, e.g. with new rates, periodically, or based on customer's request, or based on an event, such as customer's rating and financial situation, e.g. bankruptcy, changing job, retirement, or divorce (e.g. as shown in FIG. 19). This can work as an insurance/peace of mind for customer, hedging against disaster events or unexpected or somehow expected events.

Section 4: Application of Credit Report for a "Binding" Pre-Approval for Lending Products Here, in this section, we deal with Application of Credit Report for a "Binding" Pre-Approval for Lending Products, as, for example, related to consumer lending. (Please see FIG. 20, as an example.)

Figure 8:
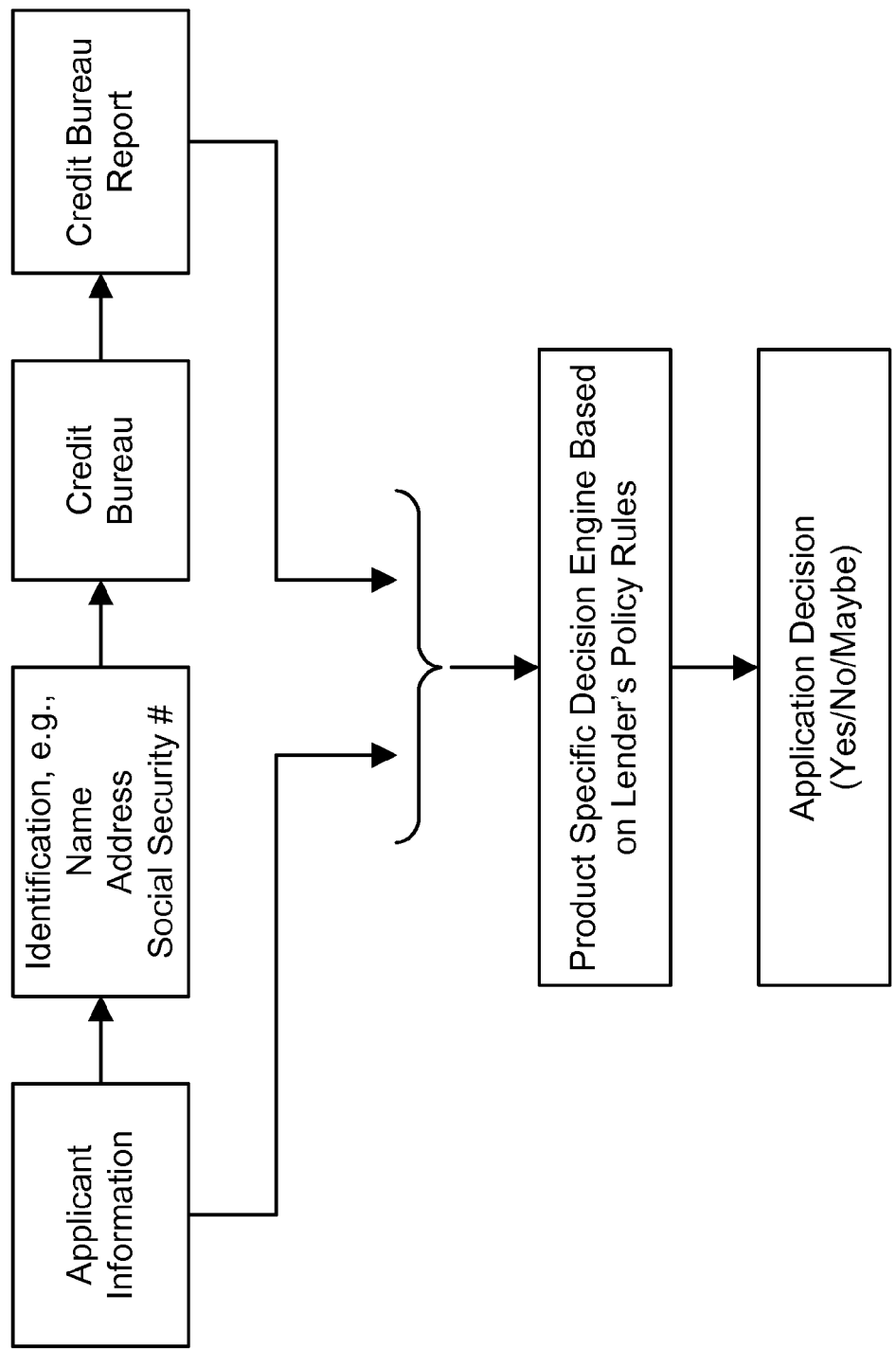
FIG. 8 illustrates the process for present situation when credit applicants apply for lending products.

FIG. 8 illustrates how presently when credit applicants apply for lending products, lenders typically send their information (primarily, name, social security number, and address) to one or more nationally recognized credit bureaus. Those bureaus in turn retrieve the applicant's credit report from their databases and send it back to the lender. Based on the information contained in the credit report and other relevant application and applicant data, the lender executes the decision rules engine, specific only to the lending product for which the applicant applied. The decision rules engine renders a decision (rule-based), which is typically communicated to the applicant (e.g. Yes, No, or Maybe). (See FIG. 8, e.g.) (For example, see also FIG. 21.) The report is then stored for legal and regulatory reasons for future reference or also analysis by the lender, if needed. For example, for an embodiment, 75 percent of the application decisions are done by computer, and 25 percent of them (e.g. "Maybe" category) are done manually, for borderline situations, for manual underwritings, as people are still deemed to be better than computers for decisions about borderline situations.

For human intervention situations, the data still goes in and out of the human's computer (or terminal device, with user interface device), and the rest of the system and procedure stay the same as the fully automated system and apparatus described in this disclosure.

Figure 9:
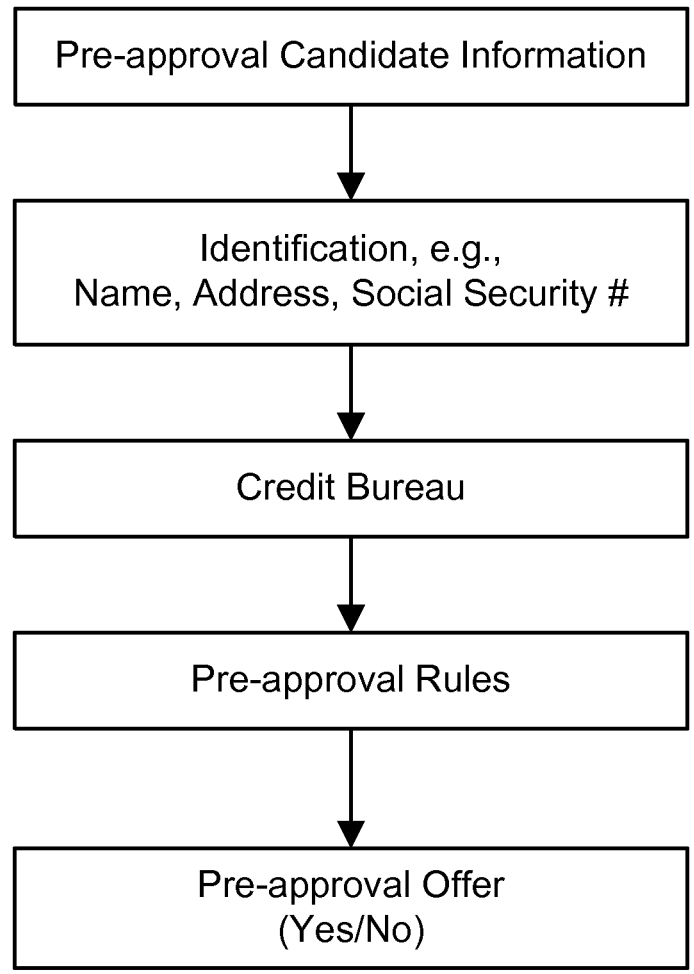
FIG. 9 illustrates a high-level review of such a pre-selection or pre-approval process.

In a process which is typically disjoint from the lending product application process described above, lenders select prospects or potential future customers. This selection process results in a pre-selection offer that has various names and titles, such as, pre-approval, invitation-to-apply, or pre-screen. FIG. 9 illustrates a high-level review of such a pre-selection or pre-approval process. The lender sends a prepared list of potential pre-approval candidates (or prospects) with their relevant information (name, social security number, and address) either directly or through intermediary businesses to a credit bureau where a set of credit criteria (similar but not identical to those used for making the credit decision on the actual application) are applied to the credit report of the prospects. Based on the outcome of this pre-screening process, i.e., if the prospect passes all the applicable rules (meets all the pre-selection conditions), a notice (email or letter, for example) of conditional pre-selection is sent to the prospect. It must be noted that pre-selection rules may be applied by the lender, the credit bureau, or both in order to establish the prospect's eligibility for the offer. Since the candidate's income is not available at the pre-selection stage, and hence, all applicable credit policy rules (decision rules) are not and cannot be applied at this point in time, the pre-approval offer is not final. An actual application must be filed by the prospect, in order for both the lender and the customer to determine if the prospect truly meets all the criteria for being approved for a lending product.

Note that the pre-selection process does not result in a prospect's full bureau report, but the lending product application process produces the report giving the lender a full view of the applicant's credit profile at the time of application. Furthermore, in order to qualify for the product, the applicant for a lending product provides more information (such as, income or rent payment) to the lender than the lender has for the prospects at the time of submission of the pre-selection to the bureau.

The customer who applies for a lending product is an ideal candidate for more business with the lender, especially if the customer is approved for that specific product. As an example, if a customer applies and is approved for an auto loan, he or she may be an excellent credit card-holder with the lender qualifying for special low interest rate balance transfers. Currently most lenders (1) do not focus on relationship lending, (2) have disjoint decision processes and application systems for their various lending products, (3) have different business units deal with different lending products in a silo format, and (4) do not view the credit report used as part of an application process for a specific lending product as a marketing tool to expand the business relationship with the customer.

Actually reason (2) above is probably the main technical challenge why this invention is not practiced and (3) provides the organizational context. Applications for the different lending products are processed on different disjoint application processing IT systems, and linking them would typically require an investment. Furthermore, the businesses or units or divisions for each lending product category in large lenders (that can benefit from this kind of invention) work separately, with their own business objectives to reach. In a future relationship-focused banking universe, this shortcoming will have to be overcome.

Figure 10:
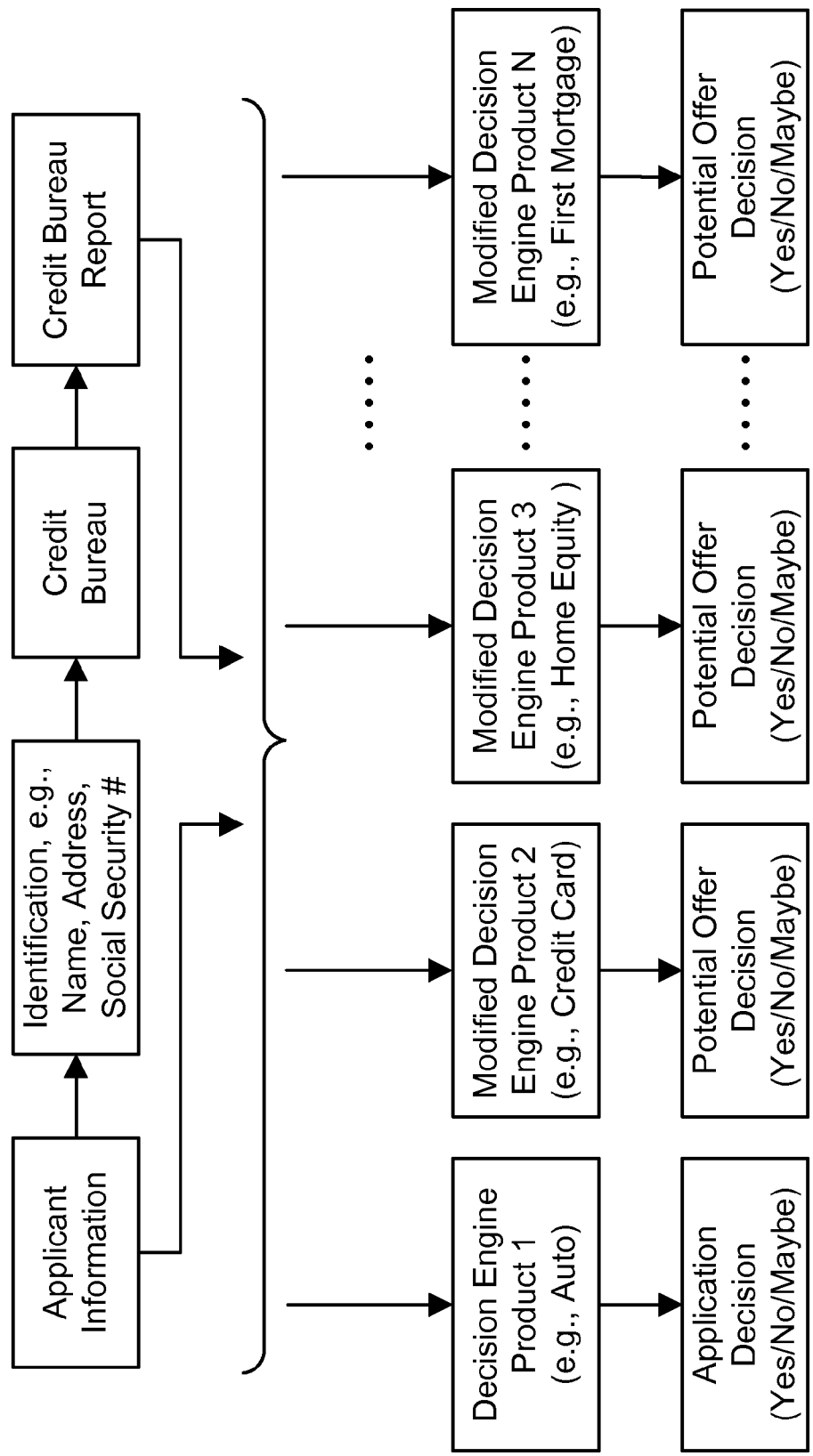
FIG. 10 illustrates a process that describes one embodiment of the invention, with decision engines (credit policy rules) executed for all other products offered by the lender.

Our Solution:

Since all the applicant information (including income and bureau information) is available at the point of application for a specific lending product, decision engines (credit policy rules) can be executed for all other products offered by the lender. FIG. 10 illustrates a process that describes one embodiment of the invention. The credit report is used for the application process on the specific lending product for which the customer has applied. Simultaneously, the decision engines for other lending products that the lender offers are also executed on customer's bureau report for other applications and applicant information.

The decision engines for those other lending products need to be slightly modified in two ways. First, even though applications for different lending products require mostly common pieces of information and data, other pieces of information may not be common. For example, the credit card applicant typically does not specify how much in credit limit they need, but borrowers for auto loans and mortgages do specify how much they would like to borrow to purchase the car or the house. Since this information (loan amount) is not available for some loans, two ways of dealing with this exist.

In some embodiments, the lender may decide to make some assumptions on the loan amount. For example, assume or guess that the borrower might be interested in a $25,000 auto loan or a $200,000 home and see if the borrower can qualify for the lending product. In yet another embodiment, the lender would let the decision engine determine how much loan the borrower can afford. (See e.g. FIG. 10) Lenders typically have payment to income and debt to income ratio requirements for the loans, in order to assess the borrower's debt burden, and if the borrower can afford to make the payments. Whereas debt to income refers to the aggregate minimum required monthly payments on the borrower's all debts divided by the borrower's gross (pre-tax) income, payment to income specifically refers to the loan being applied for.

As an example, a customer has gross monthly income of $4,000 and the payment-to-income ratio for the auto loan for the customer under consideration is 10%. Then, the borrower can afford a monthly payment of $400. Also, let's say the borrower has other debt burdens (such as, credit card, student loan, and a mortgage, all visible from the credit report) amounting to $1,000 per month. The debt-to-income ratio for this customer cannot exceed 40%. Therefore, the maximum monthly debt service according to this criteria is 40%×$4,000=$1,600. The customer already has to service $1,000 per month, leaving the customer with $600 per month for the auto loan. However, the decision engine will yield the lower of the monthly payments of $400 (from payment-to-income) versus $600, from debt-to-income. By making some other basic assumption on the term of the auto loan (for example, 5-year auto loans are most common loans) and interest rate that the customer qualifies for, and the maximum monthly payment the customer can afford, the maximum loan amount can be determined. Modifications of this sort need to be made to the decision engines to use them for this invention.

The second way the decision engine needs to be modified is to turn the application into a pre-selection, and not a true application. The typical decision engine produces a decision (e.g., approve/decline/counter-offer, or Yes/No/Maybe, respectively). The modified decision engines in this case produce a pre-selection offer where the customer is offered a choice of a lending product, where the positive result of the application (approval) is known with near certainty. The engine needs to be modified to reflect this difference.

Once all the modified decision engines have produced their approval, firm offers of credit can be made for all the lending products with very few caveats and terms, mostly concerning the collateral value and condition as related to secured lending. This kind of caveat is placed on credit offers even at the point of actual application. Since the collateral is not known and defined at this point, some constraints need to be placed on its valuation and nature (especially, as it relates to any loan-to-value constraints the lender may want place on the collateral). For an automobile loan, for example, the lender can place a loan-to-value constraint of 120% and a constraint of being not older than 7 years. For a home equity line of credit, for example, the lender can place a cumulative loan-to-value constraint of 90% and a constraint of being a single family dwelling.

This way, the consumer has more choices and options in front of herself/himself (with more motivation and opportunity to buy more or borrow more from the same financial institution), and the banks have happier and more satisfied consumers, with more offerings and products (See FIG. 10, e.g. for offers, decisions, and counteroffers.), with higher success rates of approval and loans obtained, without spending duplicate cost/time (to approve the same person for a different product or loan). Overall, this makes the process more streamlined, with more successful loans, which is better for overall economy and financial health of the small businesses or individual borrowers.

Figure 20:
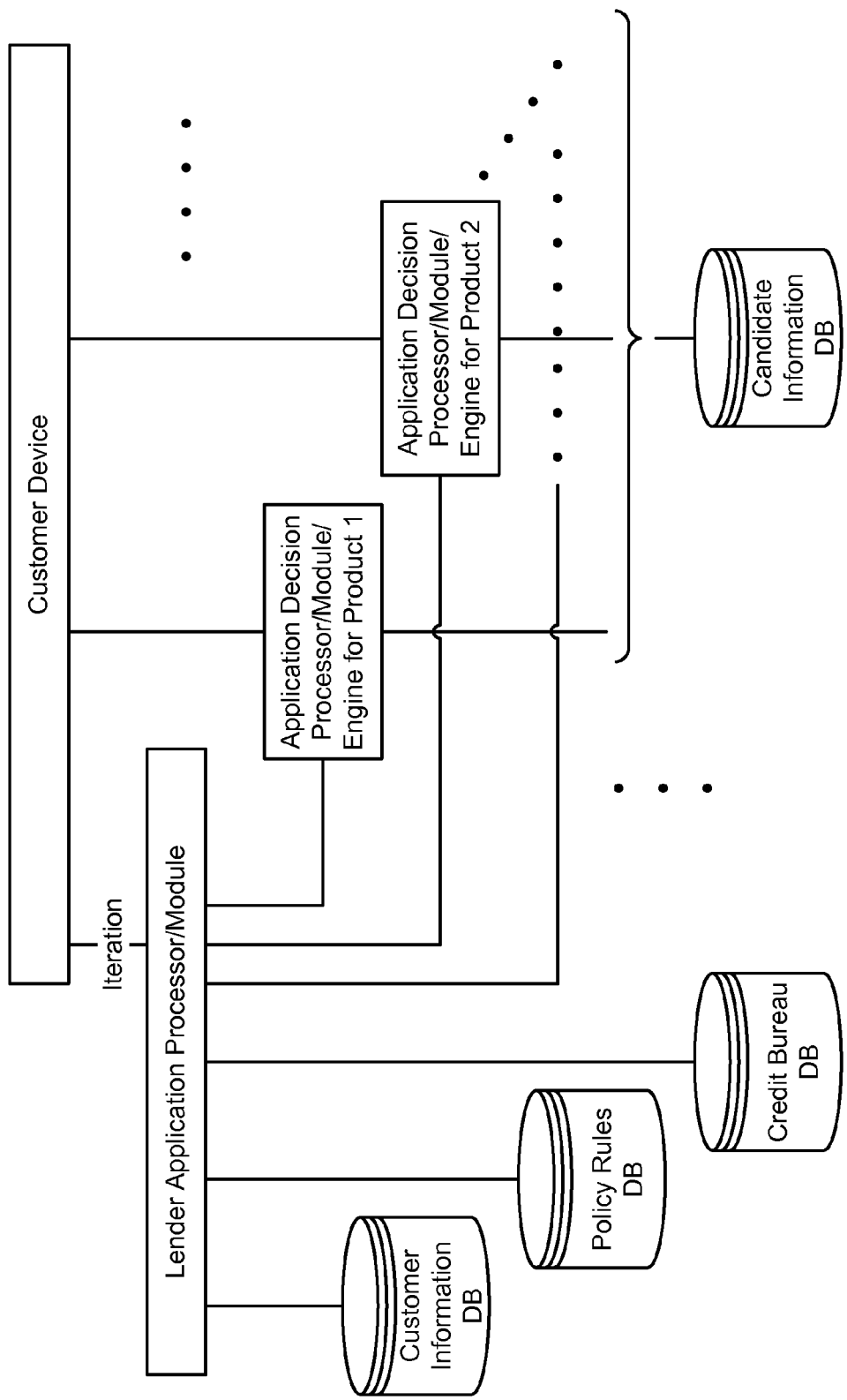
FIG. 20 shows an example of a system for Section 4.

As shown in FIG. 20, the lender uses the policy rules, customer information, and credit bureau reports, to decide and process an application for a product 1 and a product 2 (or more products, or multiple financial products), with results going back to the consumer, and also recorded in a candidate information database.

Figure 21:
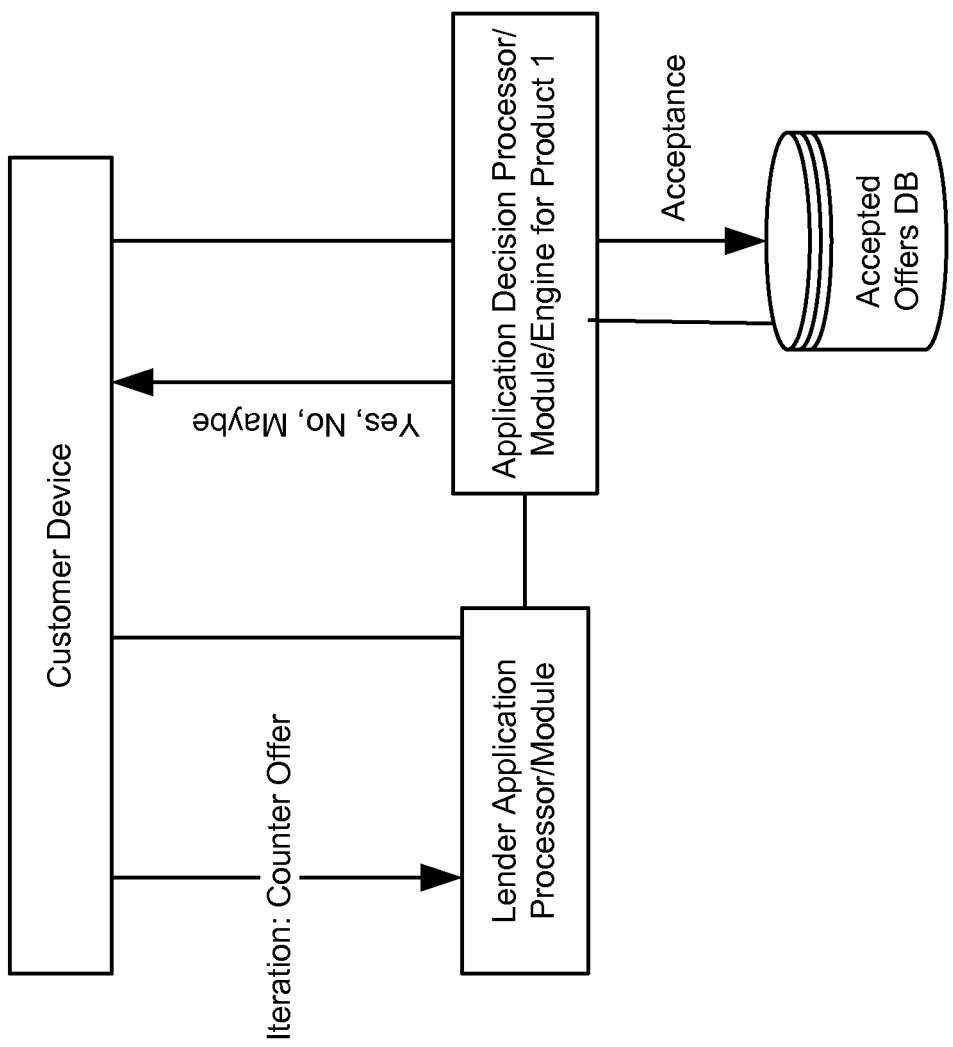
FIG. 21 shows an example of a system for Section 4.

As shown in FIG. 21, the lender decides about an application for loan for different multiple products, using decision rule engines, to get result of the decision to the customer, as "Yes", "No", and "Maybe", and also recorded in a database. "Maybe" can be evaluated further in more iterations, or by a human analyst, instead of computer and machine processors, to become either "Yes" or "No", as the final result/outcome/answer. In addition, in FIG. 21, the consumer can also apply or negotiate again, as counteroffer, re-offer, or iteration/loop, to compromise or accept an offer, going back and forth.

Section 5: Deposit Slip Purchase

Here, in this section, we deal with the Deposit Slip Purchase. Let's consider the following situation: A consumer goes to a bank or any device (e.g. his own tel. or computer, at home or while mobile, or an ATM machine), to deposit money or check or other instruments into his/her account, e.g. into a checking account. Sometimes, a bank does not have any local branches in the specific city or country, then e.g. this can be done through the participating local stores or merchants or any signed up agent, e.g. grocery store chains, e.g. Sears or Walmart, which have many branches in different locations, acting as a proxy for the bank with no local branch.

Thus, the local merchant (for a fee or percentage, or goodwill, as an advertisement) can accept the cash from the consumer, and send the money directly to the out-of-state or remote bank, which can also charge or subtract its own fee from that amount, directly. Then, the deposit slip is issued and activated, which can be used on-line, as a credit (or cash out), for example, using a security method or module, e.g. using barcode or code or PKI or password or biometrics, by a barcode reader or camera analyzing the one or 2-dimensional bar codes, from one's computer, mobile phone, communication device, camera, or the like.

Generally, customers can deposit non-cash items via mail, fax, scan, or mobile device, deposited to their account. Cash deposits are usually a big challenge for remote lenders, since the customers have to convert their currency bills or coins into a check or instrument that can be deposited into an account. There are 2 methods here, as an example:

Method 1:

Deposit slips offered for purchases

Banks make fixed denomination deposit slips available to select participating retail or reputable outfits/merchants/agents/third parties, or those who have enough credit and trust/business backing and insurance/reliability/credibility.

Customer buys the deposit slips from a merchant, once the deposit slip (with its bar code, identification tag, RFID tag, chip integrated tag, optical or radio wave tag, smart card tag, microprocessor tag, or any other tag) is activated. (See, e.g., FIG. 22.)

To finalize the transaction, the customer takes the slip and uses the bank's web site to enter the deposit slip into his/her account. (See, e.g., FIG. 23.)

Any of the above methods (e.g. mail, fax, scan, text, email, or mobile deposits), in combination, can also be used to deposit the slip into an account.

Method 2:

Customer purchases a money order from a provider of money order for his/her desired denomination, using the cash at hand.

Provider may have to be known or certified or contracted or accepted or verified or may have an agreement with the lender, so that the pricing structure and handling fees for provider are clear and known to all parties in the transaction, so that the provider can clear and get funding for all the issued instruments, periodically, for the last period, e.g. monthly, at the end of the month.

The customer deposits the money order into his/her account with one of the above methods (e.g. mail, fax, scan, text, email, or mobile deposits).

The bank may decide to reimburse the customer for this fee, subject to an optional monthly cap.

If the deposit follows an automated method, such as, scan, text, email, or mobile picture transmission, the receiving processor may have to detect the issuing entity of the money order, as an approved one, for the customer to be eligible for the fee reimbursement.

For the manual methods mentioned above, such as mail or fax, the human on the receiving end of the remote bank can establish the issuing entity and record it in the system, such that the reimbursement can take place.

This is very scalable for the banks with low number of branches or remote banks or Internet-based banks, to save cost, and increase profitability, plus attracting more customers, with current cash deposit problems, which can be solved with our method mentioned above. This will be the wave of the future banking business, as well, which will grow more, as more functions are automated or computerized.

Figure 22:
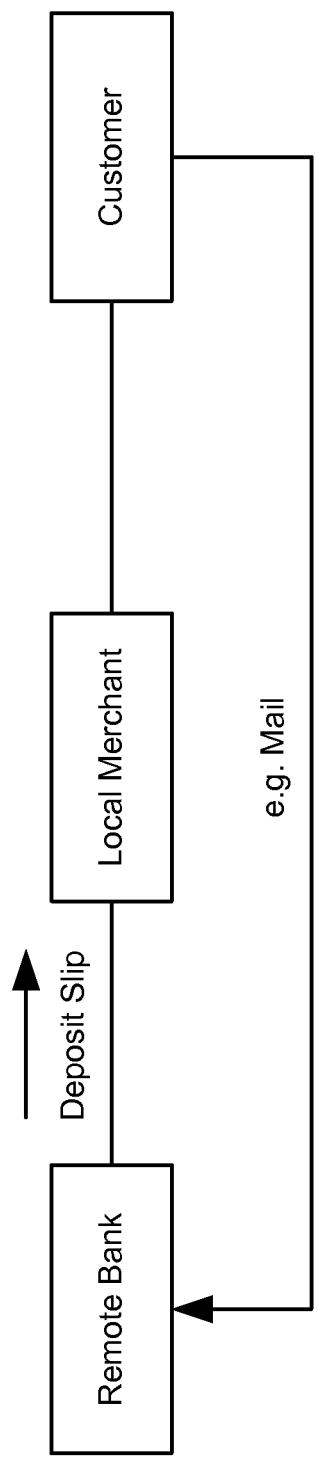
FIG. 22 shows an example of a system for Section 5.
Figure 23:
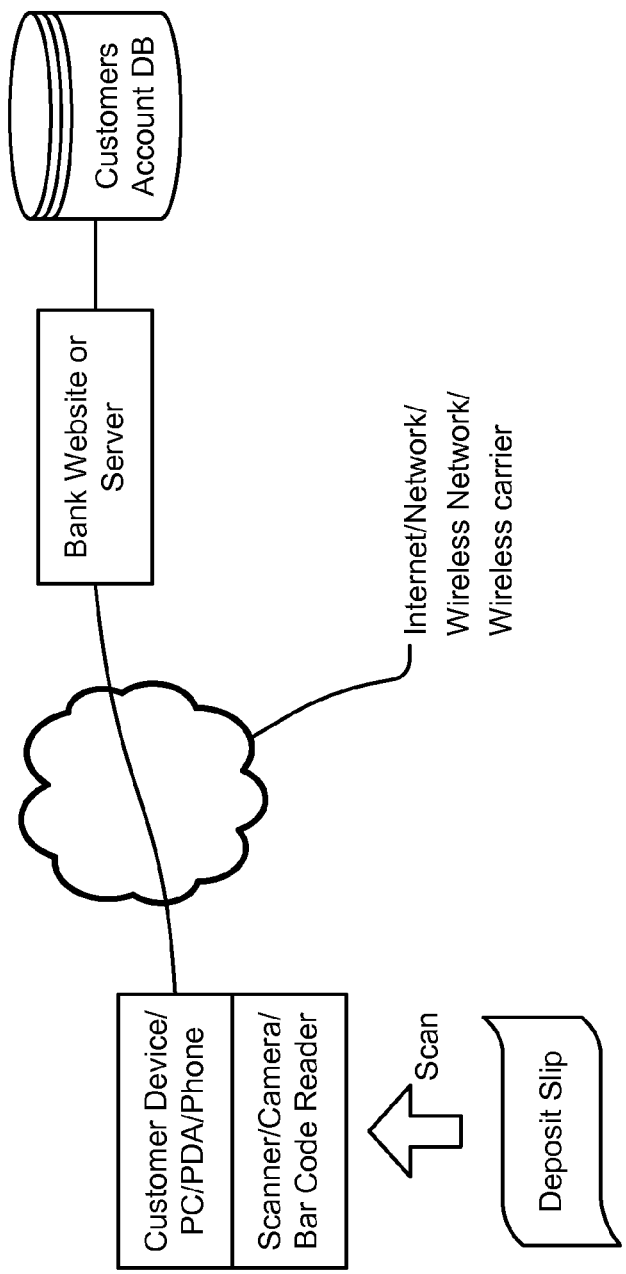
FIG. 23 shows an example of a system for Section 5.

As shown in FIG. 22, the remote bank sends the deposit slips to local merchants, to be sold to a local customer, with a margin of profit for handling for merchant. The customer can mail the documents to the bank, or as shown in FIG. 23, she can scan the document (or take a picture of), and deposit the money to her account, through bank's web site/Internet, e.g., using a bar code reader, or using a code encrypted/encoded in an image, for security, or use PKI for authentication for bank and consumer or merchant, as digital signature, signing off on the deposit slip, to authenticate the slip and authority of the bank/merchant.

Section 6: Reducing Frauds on Credit Cards

To reduce fraud, banks need more photo ID and biometrics or PKI or steps to transact for a consumer, which is very inconvenient and time consuming for the card upgrades or card usage during purchases for a consumer. To encourage participation and volunteer acceptance of fraud prevention techniques, e.g. to be added to the credit cards, e.g. as a extra ID or biometrics, or as an extra step of verification for the consumer to go through each time for each purchase at the store or on Internet, to reduce fraud, and reduce the cost of banking/transactions, the lender can offer lower rates for such preferred customers, so that more customers will participate in such programs, despite the inconveniences associated with them.

Figure 24:
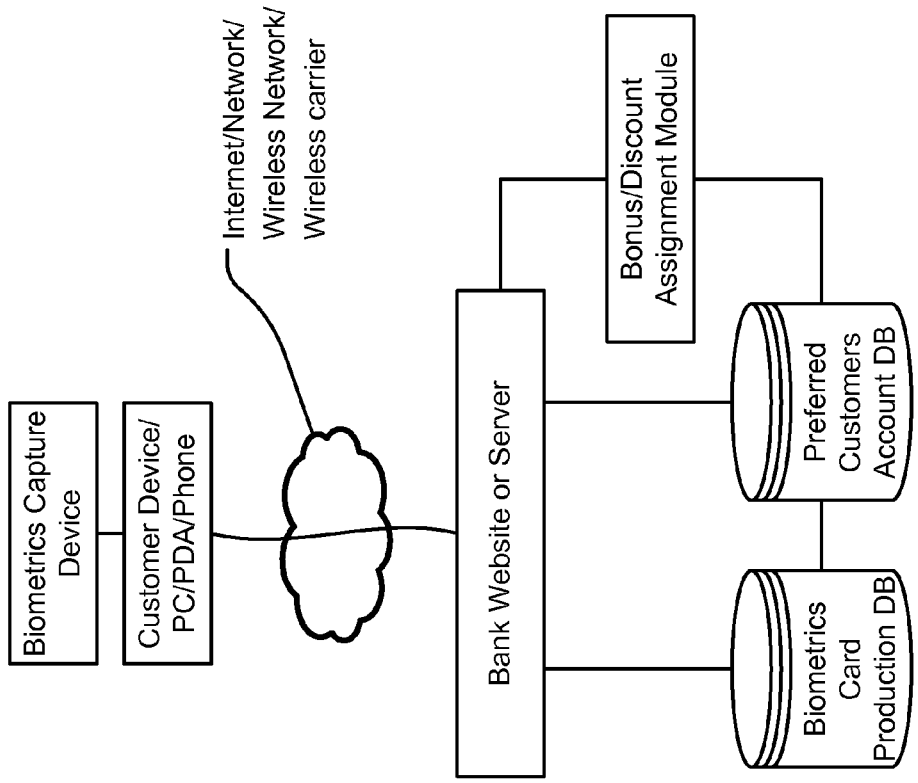
FIG. 24 shows an example of a system for Section 6.

In fact, the bonus, e.g. as a lower rate offered, offered to the customers, is the result of the saving for the bank, due to less fraud/less cost for the bank, which came from volunteer participation of the consumers, who opted for such higher standard of security and verifications, to reduce risk for the banks, for which they get some benefits back from the banks (See, e.g., FIG. 24.)

The incentives for consumers (as preferred customers or high-security customers) can be lower or no fees for transactions or interchanges, or no minimum or higher minimum threshold for balance of checking accounts, or lower interest rates charged by the banks for different offerings, or any fees waived or reduced by the bank, or lower wiring fee or other service fees (or zero fee), or any similar offerings, that can be contracted and advertised by the bank (predetermined benefits), to attract current or future customers and to encourage them to join high-security programs, e.g. putting ID pictures or biometrics or password or PKI information on magnetic strips or on the card itself, as humanly-visible data or encoded/encrypted data, for reader/computer to capture/read/ analyze/compare/verify/authenticate.

As shown in FIG. 24, a customer goes on a bank web site, and gets approved as a preferred customer for the bank, which entitles the customer to bonuses and discounts from the bank/ better services from the bank, which the consumer will receive, e.g. the coupons, or email with the site address to download and get the coupons on line, or certificates through email or mail for cash rewards or gift certificates. In return, the consumer/customer will capture and transmit the biometrics data requested by the bank, to the bank, for processing, recording, and capturing on the card magnetic or storage unit, e.g. encoded on the magnetic strip, or numbers written or design/figures shown, on a credit card, for higher degree of security and less fraud in usage, as described above.

Figure 25:
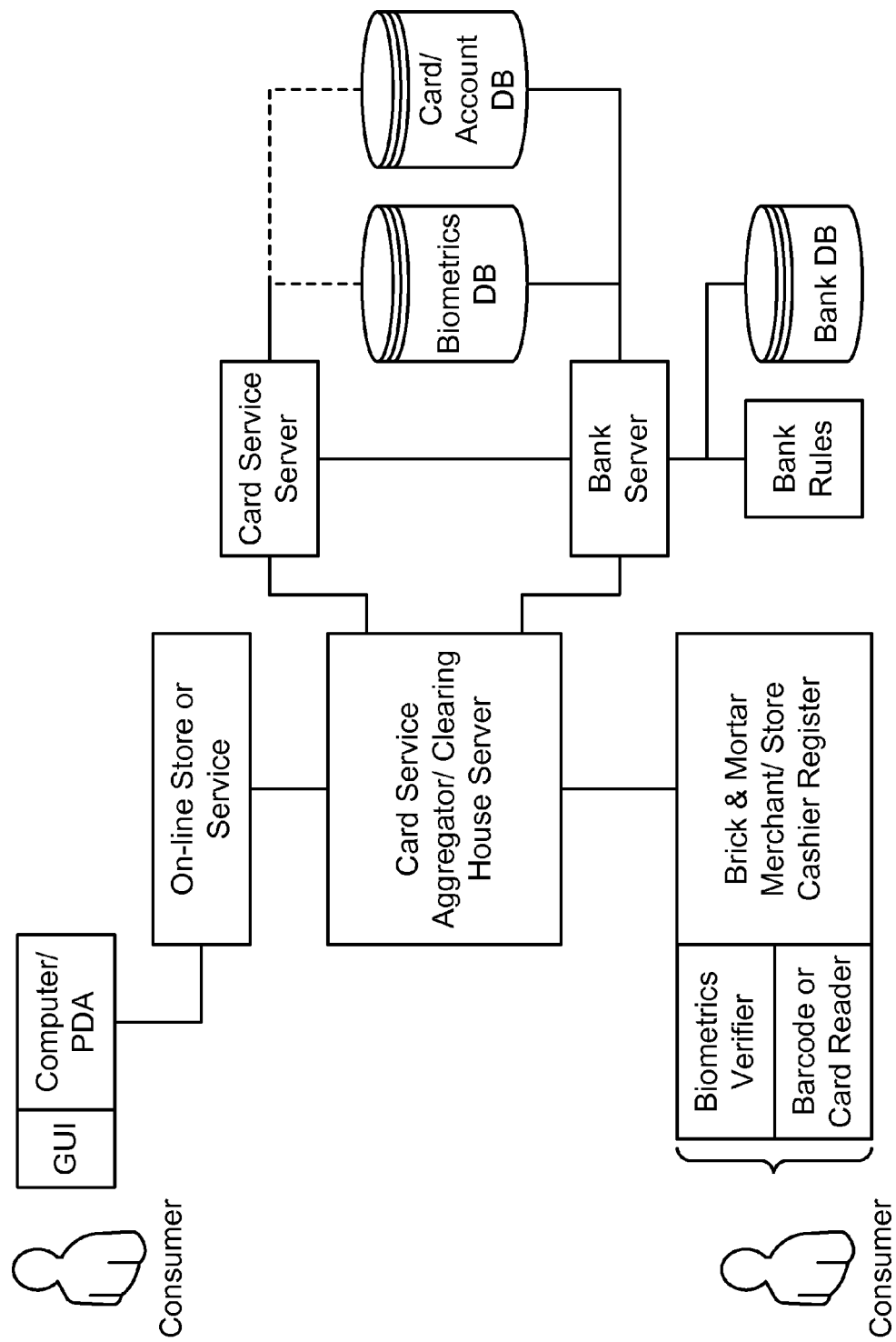
FIG. 25 shows an example of a system for all Sections.

General Notes for all Embodiments Above:

As shown in FIG. 25, for all the embodiments in this invention, a consumer can use her computer or go to a store (e-store, having a GUI or user interface (a hardware or a device), or brick and mortar regular store, having biometrics verifier or barcode or card reader), through an aggregator, connecting to a card service or bank, to authenticate through card information and biometrics, plus bank rules, e.g. to charge a card for a transaction or purchase.

Figure 26:
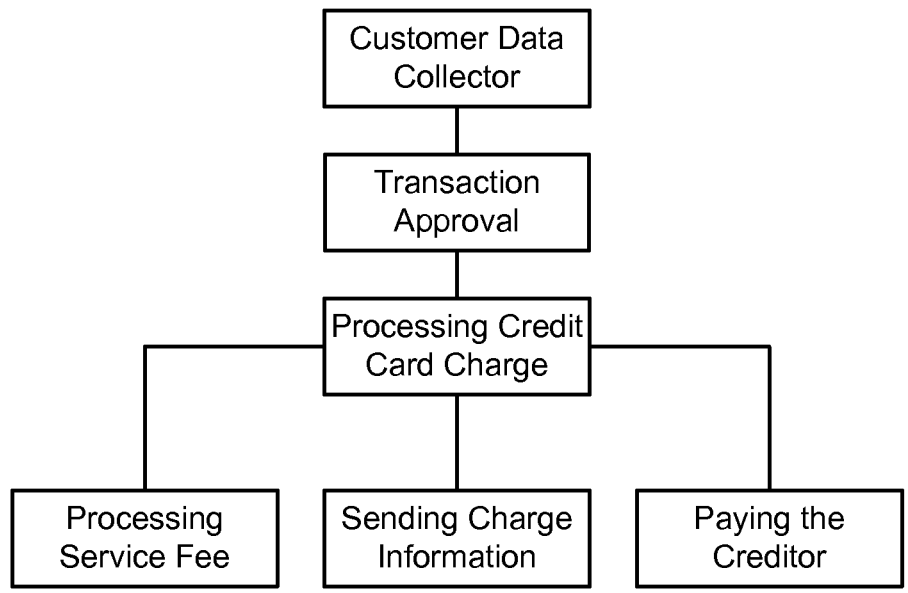
FIG. 26 shows an example of a system for all Sections.

As shown in FIG. 26, for all the embodiments in this invention, a consumer's data gets approved and processed for the credit card company or issuer, with an associated processing fee, with the charge information transmitted and the creditors get paid, accordingly.

Please note that, in general, any teaching here for "preapproved" also applies to "pre-selection", including everything in specification, text, and figures.

Please note that there are 2 usages for the word "application" in our disclosure above: One is "lending product application", and the $2^{nd}$ one is the mobile device application/ software/code, loaded on the phones or smart phones, as an example. The different usages are clear from the context.

For all teachings above/here, the concepts taught for lender also apply to card issuer, merchant bank, bank, mortgage issuer, and financial institution (i.e. they can be interchanged and replaced with each other). The same is true for phrases loan, financial product, consumer loan, car loans, home loans, credit card loans, student loans, and bank loan.

Please note that for all the teachings of this patent application, the concept of smart phone or phone here also applies to game platforms/consoles, interactive devices, display devices, monitors, multipurpose computers, GPS devices, map finders, pagers, radios, one-way broadcasters, two-way communicators, communication devices, cell phones, wireless devices, wired devices, processors, microprocessors, communication devices, computers, tablets, PDAs, laptops, computing devices, simulation devices, or other similar gadgets that can function the same, e.g. communicate with others, e.g. with a user interface or GUI.

Please note that all the teachings above for communications between 2 points or multiple points can be done by wire, cable, optical, laser, sound, electromagnetic waves, RF, microwave, wirelessly, pulse data, packets, Internet protocols, analog, digital, modulated, encrypted, encoded, with header, without header, intermodulated, mixed, phone, cell phone, mobile device, PDA, broadcasting, pager, one-way, two-way, WiFi, BlueTooth, Internet, network, private network, secure network, mixed or combination of networks, and in any format. The connection between 2 points may be direct or indirect, logical or electrical, or through intermediary, or another device in between.

Please note that for all the teachings above, the word "processor" (a device) (which is non-human for our entire disclosure) can be interchanged with one or more of the following: microprocessor, computer, computing processor, microcomputer, computing device or apparatus, computing subsystem, computing module, module (a device, not a software), calculating device, analyzing device, logic design circuit, computational circuit, digital circuit, functional circuit, mathematical or logical operation circuit, or analog circuit. Please note that for all the teachings above and throughout this disclosure, all of the terms mentioned in the current paragraph refer to a device or hardware.

Throughout this disclosure, the following refer to a hardware or device: repository, storage, database (or DB), store (either referring to a computer(s) or server(s) hosting a web site, or a brick-and-mortar building), App store (referring to a computer server or host server or computer(s)), computer, server, system, subsystem, module, terminal, network, Internet, interface, UI (user interface), GUI (graphical user interface), display, PC (personal computer), PDA (personal digital assistant), reader, scanner, processor, input module, engine, tablet, GPS, biometrics verifier, cashier register, clearing house (referring to a computer server or host server or computer(s)), aggregator (referring to a computer server or host server or computer(s)), and data collector.

Every module or device or system or subsystem or server or database or storage or memory unit here in our teachings may have one or more of the following included or attached to it (without showing all the details in the figures, to simplify the figures): a processor or microprocessor, server, PC, computer, PDA, smart phone, pager, GPS, wireless communication module, one or more memory units or RAM or ROM or storages or databases or temporary buffers, display, keyboard, user interface, GUI, mouse, input device, voice command recognition unit, cable, fiber optics, laser, optical communication module, magnetic device, acoustic device, wireless device, RFID, wired device, Bluetooth, WiFi, antenna(s), dish, array of antennas, satellite or cell reception or transmitter device, wireless interface, Internet or network interface, security interface, biometrics interface, printing interface, voice recognition interface, OCR and handwriting recognition interface, or any other interface or formatting devices.

Please note that all the teachings in this disclosure for division of a company also apply to sister company, affiliate, parent company, subsidiary, joint venture, or mother company.

All the tables shown in this disclosure show a data structure, which can be stored on a storage media (hardware) or a computer hard drive (device) or on a server (device).

Note that these alternative methods of communications and notifications apply to all other embodiments. Sometimes, the lender requires more information or documents from the customer, which can be either sent in person, or by mail, fax, telex, wire, optical method, wirelessly, sound waves, electromagnetic waves, satellite, cell phone, cable, email, text messages, SMS, or smart phone/communication devices, computers, tablets, PDA, or laptops.

Please note that the diagrams, flow charts, or methods shown in the figures or described in the text can be processed in an automated or computer system as a work flow or batch processing technique.

Any variations of the teaching above are also intended to be covered and protected by the current patent application.

The invention claimed is:

1. A loan product approval method by a lender, said method comprising:
   a lender computing device receiving a loan application, regarding a customer, from a lender application receiving device;
   said lender computing device receiving credit information regarding said customer from one or more credit bureau databases;
   wherein said credit information comprises one or more credit scores;
   a ranking and calculating device assigning a first weight to said credit information;
   said ranking and calculating device receiving performance definitions from a performance definitions database;
   said lender computing device receiving past relationship information regarding said customer, from one or more of said lender's databases;
   assigning a second weight to said past relationship information, based on said performance definitions;
   a segmentation analyzer performing segmentation analysis based on a first sub-population of potential loan applicants;
   said segmentation analyzer performing segmentation analysis based on a second sub-population of potential loan applicants;
   wherein said first sub-population of potential loan applicants corresponds to a first characteristic of said customer;
   wherein said second sub-population of potential loan applicants corresponds to a second characteristic;
   wherein said first characteristic of said customer is predictive in isolating risk for said first sub-population of potential loan applicants;
   optimizing said first characteristic of said customer for said first sub-population of potential loan applicants;
   wherein said second characteristic is predictive in isolating risk for said second sub-population of potential loan applicants;
   optimizing said second characteristic for said second sub-population of potential loan applicants;
   performing a second segmenting step based on an observation window and a performance window for specified periods of time for people with past-due accounts, versus people with not-past-due accounts;
   wherein said observation window represents points in time at which said customer is observed to generate statistics for predicting said customer's future behavior;
   wherein said performance window represents points in time which determines risk on said customer's account;
   wherein said observation window and said performance window are staggered with respect to each other, and wherein a beginning of said observation window is different from a beginning of said performance window, and an end of said observation window is different from an end of said performance window;
   wherein said performance window is wider in time for accounts which are not past due, as compared to past-due accounts;
   said lender computing device down-sampling said potential loan applicants;
   said lender computing device selecting credit variables based on said down-sampled potential loan applicants;
   said lender computing device applying a regression technique, to reduce a number of said credit variables;
   a modeling processor fitting a first credit model, based on said reduced number of said credit variables, for said first characteristic;
   said modeling processor fitting a second credit model, based on said reduced number of said credit variables, for said second characteristic;
   using a rejection inference technique to improve said first credit model;
   using a rejection inference technique to improve said second credit model;
   validating said improved first credit model, based on test data points;
   validating said improved second credit model, based on test data points;
   using a weight of evidence analysis to modify said improved first credit model;
   using a weight of evidence analysis to modify said improved second credit model;
   based on said modified improved first credit model and said modified improved second credit model, combining four parameters to calculate a relationship-based score for said customer;
   wherein said four parameters comprises said first weight, said second weight, said credit information, and said past relationship information;
   approving or disapproving said loan application for said customer, by a loan product package processing device, based on said relationship-based score for said customer and said one or more credit scores for said customer;
   assigning an interest rate to said loan application by a rate determination device based in part on said relationship based score for said customer and a current market interest rate; and
   notifying said customer about an outcome of said loan application.

2. The loan product approval method by a lender as recited in claim 1, wherein said loan application is related to one or more of the following: automobile, motorcycle, bike, RV, marine, unsecured installment, credit card, mortgage, home equity installment, or home equity line of credit.

3. The loan product approval method by a lender as recited in claim 1, wherein said loan product package processing device considers one or more of the following: income, own or rent, housing expenditure, collateral type, collateral value, requested amount, down payment, estimated closing cost, or information about said customer.

4. The loan product approval method by a lender as recited in claim 1, wherein performance windows for observations are the same.

5. The loan product approval method by a lender as recited in claim 1, wherein performance windows are staggered.

6. The loan product approval method by a lender as recited in claim 1, said method further comprising: assigning one or more future interest rates.

7. The loan product approval method by a lender as recited in claim 1, said method further comprising: assigning one or more future interest rates, with corresponding conditions.

8. The loan product approval method by a lender as recited in claim 1, said method further comprising:
said ranking and calculating device taking a weighted average.

9. The loan product approval method by a lender as recited in claim 1, said method further comprising: updating said relationship-based score for said customer, periodically.

10. The loan product approval method by a lender as recited in claim 1, said method further comprising: updating said relationship-based score for said customer, based on a predetermined or trigger event.

11. The loan product approval method by a lender as recited in claim 1, said method further comprising: updating said relationship-based score for said customer, based on a predetermined market index.

12. The loan product approval method by a lender as recited in claim 1, said method further comprising: updating said relationship-based score for said customer, based on a random variable or based on random time intervals.

13. The loan product approval method by a lender as recited in claim 1, said method further comprising: classifying said customer, in terms of a preferred interest rate.

* * * * *